United States Patent
Black

(10) Patent No.: US 7,117,172 B1
(45) Date of Patent: Oct. 3, 2006

(54) METHODS AND SYSTEMS FOR MANAGING FINANCIAL ACCOUNTS

(75) Inventor: David B. Black, Ridgewood, NJ (US)

(73) Assignee: Corecard Software, Inc., Norcross, GA (US)

( * ) Notice: Subject to any disclaimer, the term of this patent is extended or adjusted under 35 U.S.C. 154(b) by 0 days.

(21) Appl. No.: 09/522,750

(22) Filed: Mar. 10, 2000

Related U.S. Application Data

(60) Provisional application No. 60/123,886, filed on Mar. 11, 1999, provisional application No. 60/123,976, filed on Mar. 11, 1999, provisional application No. 60/123,977, filed on Mar. 11, 1999.

(51) Int. Cl.
*G06F 17/60* (2006.01)

(52) U.S. Cl. .......................... 705/35; 705/30

(58) Field of Classification Search ................ 705/30, 705/35; 709/101, 207
See application file for complete search history.

(56) References Cited

U.S. PATENT DOCUMENTS

| | | | |
|---|---|---|---|
| 4,503,499 A | 3/1985 | Mason et al. | |
| 4,673,802 A | 6/1987 | Ohmae et al. | ............... 235/379 |
| 4,727,243 A | 2/1988 | Savar | .......................... 235/379 |
| 5,535,322 A | 7/1996 | Hecht | |
| 5,551,023 A | 8/1996 | Alonso | |
| 5,581,691 A | 12/1996 | Hsu et al. | |
| 5,604,896 A | 2/1997 | Duxbury et al. | |
| 5,630,131 A | 5/1997 | Palevich et al. | |
| 5,692,132 A | 11/1997 | Hogan | ......................... 395/227 |
| 5,710,921 A | 1/1998 | Hirose | |
| 5,717,868 A | 2/1998 | James | ......................... 395/235 |
| 5,721,913 A | 2/1998 | Ackroff et al. | |
| 5,724,584 A | 3/1998 | Peters et al. | |
| 5,761,661 A | 6/1998 | Coussens et al. | ............... 707/9 |
| 5,764,226 A | 6/1998 | Consolatti et al. | |
| 5,802,499 A | 9/1998 | Sampson et al. | ............. 705/35 |
| 5,826,241 A | 10/1998 | Stein et al. | .................... 705/26 |
| 5,878,215 A * | 3/1999 | Kling et al. | ................. 709/207 |
| 5,893,090 A | 4/1999 | Friedman et al. | ............... 707/3 |

(Continued)

FOREIGN PATENT DOCUMENTS

DE 019701697 A1 * 7/1998

(Continued)

OTHER PUBLICATIONS

J.. C. Robertson, F. G. Davis, Auditing, Third Edition, 1982, p. 297.*

(Continued)

*Primary Examiner*—Charles R. Kyle
(74) *Attorney, Agent, or Firm*—Tiep H. Nguyen; Mannava & Kang, P.C.

(57) ABSTRACT

Processing systems and methods receive events, such as a transaction to an account, and converts the events into messages. Each message then invokes one or more rules which are executed by a rules engine. The execution of these rules may invoke the execution of additional rules. After all rules have executed, the account associated with the event is updated, such as by projecting the account. The rules have their parameters defined in a repository so that the parameters can be easily changed without any need to recompile. The processing systems receive authorizations and other transactions and runs in real-time as transactions arrive. As a result, balances are updated continuously and accounts are read and updated only when there is activity. Hierarchy is user configurable, including multiple hierarchy to any depth. System operations are controlled by rules and their parameters and most modifications can be accomplished without access to source code.

18 Claims, 9 Drawing Sheets

U.S. PATENT DOCUMENTS

| | | | | |
|---|---|---|---|---|
| 5,918,216 | A | 6/1999 | Miksovsky et al. | 705/35 |
| 5,940,813 | A | 8/1999 | Hutchings | 705/43 |
| 5,963,926 | A | 10/1999 | Kumomura | 705/41 |
| 5,987,422 | A | 11/1999 | Buzaski | |
| 6,014,666 | A | 1/2000 | Helland et al. | |
| 6,018,627 | A | 1/2000 | Iyengar et al. | |
| 6,028,997 | A | 2/2000 | Leymann et al. | |
| 6,032,134 | A * | 2/2000 | Weissman | 705/40 |
| 6,038,550 | A * | 3/2000 | Rosenwald | 705/35 |
| 6,076,074 | A | 6/2000 | Cotton et al. | |
| 6,115,690 | A * | 9/2000 | Wong | 705/7 |
| 6,128,602 | A * | 10/2000 | Northington et al. | 705/35 |
| 6,151,583 | A | 11/2000 | Ohmura et al. | |
| 6,160,549 | A | 12/2000 | Touma et al. | |
| 6,170,002 | B1 | 1/2001 | Ouchi | |
| 6,225,998 | B1 | 5/2001 | Okita et al. | |
| 6,226,623 | B1 | 5/2001 | Schein et al. | |
| 6,230,309 | B1 | 5/2001 | Turner et al. | |
| 6,233,726 | B1 | 5/2001 | Bowman et al. | |
| 6,249,905 | B1 | 6/2001 | Yoshida et al. | |
| 6,253,369 | B1 | 6/2001 | Cloud et al. | |
| 6,272,555 | B1 | 8/2001 | Gish | |
| 6,327,362 | B1 | 12/2001 | Hull et al. | |
| 6,493,685 | B1 | 12/2002 | Ensel et al. | |
| 6,640,244 | B1 * | 10/2003 | Bowman-Amuah | 709/207 |
| 6,847,942 | B1 * | 1/2005 | Land et al. | 705/30 |
| 2003/0120571 | A1 * | 6/2003 | Blagg | 705/35 |

FOREIGN PATENT DOCUMENTS

| | | | |
|---|---|---|---|
| JP | 02002005196 A | * | 1/2004 |

OTHER PUBLICATIONS

Brock H. Accounting Principles and Applications, Mcgrew Hill, 1981, pp. 268, 328, 512-513.*

Peachtree Using Accounts Receivable and Invoicing, Peachtree Software, 1989, pp. 5-51 to 2-52, 3-23 to 3-29, and 8-11 to 8-13.*

Schawms's Outline of Theory and Problems of Principles of Accounting I, New york McGraw Hill Professional, 1999, pp. 98-118.*

International Search Report in PCT patent application No. PCT/US00/06264, search results mailed Jan. 18, 2002.

Cugola, G. et al., "Exploiting an event-based infrastructure to develop complex distributed systems," proceedings of the 20th International Conference on Software Engineering, Kyoto, Japan, Apr. 19-25, 1998, pp. 261-270.

Murthy, V.K. et al., "Distributed object models, mobile computing and electronic commerce," proceedings of workshop on architectural and operation systems, 1998, Los Alamitas, CA, pp. 134-143.

Andreoli, J. et al., "XPECT: a framework for electronic commerce," IEEE Internet Computing, Jul.-Aug. 1997, IEEE, USA, vol. 1, No. 4, pp. 40-48.

Tenenbaum, J.M. et al. "Eco System: an Internet Commerce Architecture," IEEE Computer Society, U.S.A., vol. 30, No. 5, May 1997, pp. 48-55.

International Search Report in PCT patent application No. PCT/US00/06388, search results mailed Apr. 9, 2002.

Sarin, "Object-Oriented Workflow Technology in InConcert," Proceedings of COMPCON '96, 1996 IEEE, pp. 446-450.

Hsu et al., "Work-Flow and Legacy Systems," 4465 BYTE, vol. 19(1994), Jul., No. 7, Peterborough, NH, US, pp. 109-116.

Ghosh, S. "NOVADIB: A novel architecture for asynchronous, distributed, real-time banking modeled on loosely-coupled parallel processors." Decision Aiding for Complex Systems. Charlottesville, VA., Oct. 13-16, 1991, Proceedings of the International Conference on Systems, Man and Cybernetics, New York, IEEE, US, vol. 1 _, Oct. 13, 1991, pp. 2061-2066, XP010054597 ISBN: 0-7803-2033-8 the whole document.

PCT/US00/06265 filed Mar. 10, 2000, International Search Report dated Mar. 12, 2002, by European Patent Office International Search Authority.

* cited by examiner

METHODS AND SYSTEMS FOR MANAGING FINANCIAL ACCOUNTS

RELATED APPLICATIONS

This patent application claims priority to, and incorporates herein by reference, now abandoned provisional patent application Ser. No. 60/123,886, Ser. No. 60/123,976, and Ser. No. 60/123,977, all filed on Mar. 11, 1999. Also, this application is related to co-pending utility patent application filed on Mar. 10, 2000, entitled "Methods and Systems for Performing Workflow" and co-pending utility patent application filed on Mar. 10, 2000, entitled "Methods and Systems for Developing Applications and for Interfacing with Users."

FIELD OF THE INVENTION

The present invention relates generally to methods and systems for managing accounts and, more particularly, to methods and systems for managing financial accounts, such as credit card accounts, which allow, for instance, real-time account information and increased flexibility in defining terms of the account.

BACKGROUND OF THE INVENTION

Practically no individual can escape from being associated with an account of some type. More likely than not, an individual does not have a single account but has accumulated a great number of accounts with various companies. An individual, for instance, may have accounts with a local exchange carrier, a long distance provider, an Internet service provider, a wireless phone carrier, an electric company, a natural gas provider, a financial aid company, one or more credit card companies, retailer credit cards, automobile financiers, and a mortgage company. Of course, individuals are not the only entity to have accounts since companies also have accounts with other companies and also must maintain accounts with individuals and/or other companies. Financial accounts are therefore ubiquitous.

Managing accounts held by a company can be a complex task and require sophisticated processing systems. These processing systems are essential and track all debits and credits associated with each account. At periodic intervals, for instance monthly, the processing systems generate billing statements which are then provided to each account holder. The processing systems update balances as payments are received and also monitor new charges to the accounts. Some of the more demanding processing systems are perhaps those associated with credit card accounts. In addition to payment information, these systems often require minimum payments, calculate average daily balances, add interest charges, and impose late penalties. Further, to provide incentives to make a purchase, the credit card accounts may offer a period of time when no payments are due or when no interest accrues. Moreover, the processing systems also manage charges to the accounts, such as by receiving authorizations for charges from retailers and posting cleared charges to the accounts.

Conventional approaches to implementing processing systems involve use of mainframe computers programmed typically in COBOL. Most essential functions are performed in batch mode and the data is stored using indexed files. Also, as is typical with mainframe systems, the screens are in 3270 mode whereby data is output to and read from specific locations on the screen.

These conventional processing systems have several limitations. For one, as discussed above, most of the essential functions are performed in batch mode. Batch processing involves reading every single account and updating each account with new transactions. Batch processing is considered efficient since all updates are performed at a time when the demand for processing power is low, such as during the night.

Traditional posting algorithms involve sorting by account number all transactions that have arrived since the last run of the batch program and then all of the master records are sorted into account number order. The posting algorithm next performs a "sequential sweep" in which the account master records are read, processed, and updated in order. For each account master, the relevant control records are read and then each transaction on the account is read and processed. For example, if the transaction is a payment, relevant counters and balances are updated. After processing, all of the transactions are archived. If relevant, transactions such as interest and fees are generated, applied to the account, and archived. Next, actions based on the passage of time are executed, for example, accrued interest is calculated and applied and, if the account cycles, statement information is calculated and generated. A wide variety of operational reports may also be generated during this sequential sweep.

The batch operation was implemented in order to address concerns for efficiency. The batch mode of operation necessarily requires that data be stored for a period of time before the accounts are updated. As a result, the account information that may be available from a company is likely out-dated. On-line businesses and consumers, on the other hand, are placing demands on companies to have up-to-the-minute information on their accounts. Companies that have global operations are confronted with additional delays and are faced with increased demands for more up-to-date information.

Another limitation of conventional processing systems is that control hierarchies are inextricably built into the code. In today's system, for example, each account has a number of credit plans each of which may have one or more transactions posted to it. While this is reasonable for consumer credit, in the commercial credit market each transaction is an invoice and on the invoice are many line items, each of which may have different credit terms. In addition to the control hierarchies, many other aspects of the conventional processing systems are hard coded. For instance, many of the rules regarding the imposition of late charges, interest, and minimum payments are rigid rules coded into the system.

Because much of the functionality of conventional processing systems is built into the code, it is rather difficult to make any change to the system. A change to the processing system typically involves making a change to the source code, which is an extremely complex, time-consuming, and error-prone process. In addition to revising the code, any change to the program also entails re-compiling the code as well as testing and de-bugging the code. It is therefore difficult, laborious, and expensive to make changes to the conventional processing system.

Another limitation of the conventional processing system is that it is rather complex. Whenever additional functionality is desired in the processing system, additional code is added to the program to implement this desire to functionality. Over time, many processing systems have accumulated numerous layers of code with each layer representing another version. In fact, some processing systems have over 6 million lines of code. As a result, the logic in the code has an arcane set of rules and conditions that together produce the desired functionality. The core posting logic, for instance, is famously difficult to understand with successive changes only multiplying the complexity. A consequence of this complex logic is that only those who have intimate knowledge of the system are capable of performing the required changes to the system. Thus, a great deal of effort and institutional knowledge is necessary in order to modify the code of conventional processing systems.

Unfortunately, there is considerable pressure to make modifications to processing systems. This pressure is especially prevalent with retailers who offer convenient financing terms in order to entice a purchase of their goods. Retailers, for instance, commonly provide initial periods during which customers need not make any payments and/or no interest accrues. Other incentives that may be offered include a discount of the purchase price for those customers that opens an account. These special financing terms are examples of ways in which processing systems need to evolve and be modified in order to allow its users to remain competitive. This continual need to offer special terms translates into a desire to have processing systems that can be easily and quickly modified or updated. A need therefore exists for processing systems that can be quickly and easily modified in response to competitive pressures.

SUMMARY OF THE INVENTION

The present invention addresses the problems described above by providing systems and methods for managing accounts. According to a first aspect of the invention, the systems and methods according to the preferred embodiment of the invention are particularly useful in managing financial account. Events, such as an authorization request or a transaction, are assigned priorities so that more time-sensitive events are processed before other events. For instance, authorization requests are assigned a high priority and are processed before other transactions. As a result, a process of posting transactions to accounts can occur at a low priority, in the background. With the invention, posting need not occur in batch mode but instead transactions can be posted in real-time whenever they are received. By avoiding batch processing, processing according to the invention reduces the number of Input/Output (I/O) operations that are needed whereby the overall processing of the accounts becomes more efficient.

According to another aspect of the invention, systems and methods for managing accounts involve receiving events, such as authorizations or other transactions, and converting those events into messages. Rules are invoked when an event is received and also when other rules are invoked. After all rules are executed, the accounts are updated to reflect the occurrence of the event. For instance, if the account is a credit card account and the transaction is a charge, rules may involve the posting of the charge to the account, the calculation of interest, the calculation of any minimum fees, the tolling of balances, such as year-to-date interest charged, etc. Advantageously, with the invention, rules their parameters stored in a repository so that the rules can be easily changed without requiring any access to the source code. The invention therefore allows users to add new modifications or updates to processing systems easily and quickly. For many changes, users do not need any access to the source code but instead implement the changes by altering definitions or lookup tables stored in the repository.

Accordingly, an object of the present invention is to provide systems and methods for providing real-time account information.

Another object of the present invention is to provide systems and methods for managing accounts with improved efficiency.

A further object of the present invention is to provide systems and methods for managing accounts that can be updated more easily.

A still further object of the present invention is to provide systems and methods for managing accounts that avoid batch processing.

Yet another object of the present invention is to provide systems and methods for providing parameter-based approaches to managing accounts.

Another object of the present invention is to provide systems and methods for managing accounts that are scaleable.

A further object of the present invention is to provide systems and methods for managing accounts that enable user-defined rules.

A still further object of the present invention is to provide systems and methods for managing accounts that separate the definition of rules from the methods of implementing the rules.

Other objects, features, and advantages of the present invention will become apparent with respect to the remainder of this document.

BRIEF DESCRIPTION OF THE DRAWINGS

The accompanying drawings, which are incorporated in and form a part of the specification, illustrate preferred embodiments of the present invention and, together with the description, disclose the principles of the invention. In the drawings.

DETAILED DESCRIPTION

Reference will now be made in detail to preferred embodiments of the invention, non-limiting examples of which are illustrated in the accompanying drawings.

I. Overview

The invention can be applied to systems and methods for managing a wide variety of accounts, which are typically financial in nature. These systems typically involve accounts grouped into hierarchies for control and reporting purposes. The accounts maintain a wide variety of control and balance information and are used to track initial outflows with later paybacks (e.g., loans, revolving credit), initial inflows with later payouts (e.g., annuities), or a combination (e.g., checking account with interest-bearing balance, credit card acquiring). The invention can therefore be applied to both systems in which interest is calculated and either paid or collected. With the invention, systems can be devised that assess or pay a wide variety of fees and discounts. Debit and credit transactions can be received and generated for the account;

there can be a wide variety of transaction types, each with different rule-controlled behaviors and affecting different balances. Statements can be generated periodically or regularly, in report or on-line format. As should be apparent, systems and methods according to the invention are not limited in the types of accounts that are managed.

The systems are unusually flexible in that they can be adapted to traditional product categories and can be easily and quickly customized for the end-user. The end-user can easily define the balances, control parameters and tables and rules for a particular product. While this definition is very important to the eventual users of the product, the fact that it can be done very quickly and altered at any time transforms the speed with which institutions can define, build and deploy financial products, thus altering the competitive landscape. Furthermore, as such products are actually built, a growing library of rules and parameter definitions can be drawn on, which shrinks even further the time and effort required to build a new financial product.

The systems according to the invention can operate as stand-alone systems or can interact with other systems. For instance, for a small credit card issuing system, systems of the invention can be integrated with customer service and authorizations systems. On the other hand, the invention may be designed as an enhanced replacement of an existing posting module, in which case it would be a stand-alone system.

References will be made to a posting system throughout this document in order to provide an exemplary application of the invention. It should be understood that the invention can be applied to other aspects of a processing system, to the entire system, as well as to other types of systems or methods.

Figure 1:
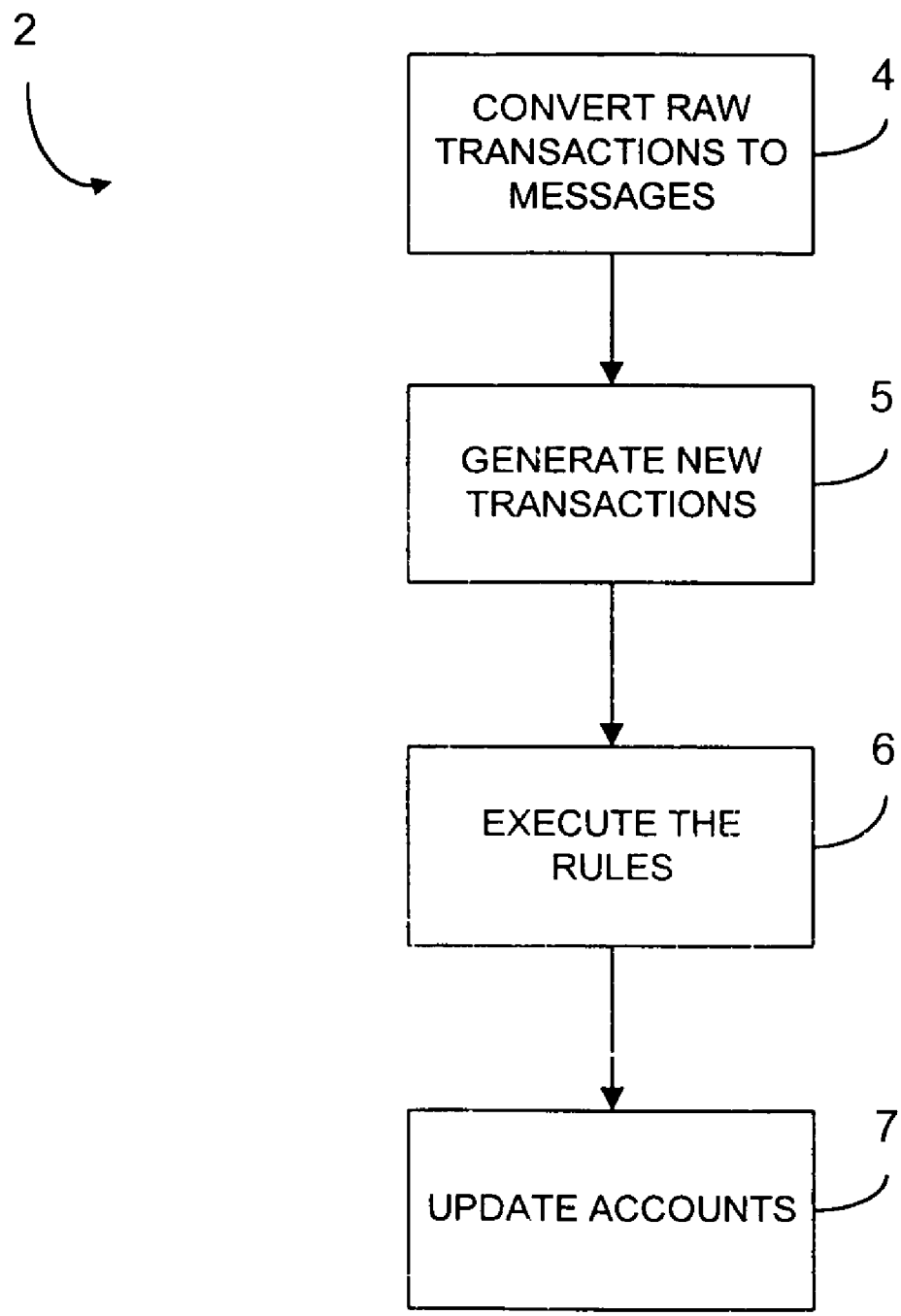
FIG. 1 is a flow chart of a method of managing accounts according to a preferred embodiment of the invention.

A preferred method 2 of managing an account in real-time is depicted in FIG. 1. The method 2 begins at 4 by converting raw transactions into messages. The precise form or content of the raw transactions varies with the application of the invention but some examples include both transactions received in real-time, such as an authorization request from a merchant, or transactions received in batch-mode. Next at 5, the method 2 may involve, but not necessarily, generating any new transactions based on the raw transactions. After the transactions have been converted into messages, at 6 the rules defined by the system are executed. Again, as with the transactions, the precise rules will vary with the application of the invention. As explained below, some of the rules may relate to posting a transaction, projecting an account, etc. After all rules have been executed, the accounts are updated at 7.

II. Processing Systems and Methodology

A. Glossary

A Glossary of terms is provided below in order to give some familiarity to terms used throughout this document. These terms are not to be strictly limited to the description in the Glossary but should be given their broadest interpretation. In other words, the descriptions in the Glossary are only examples and do not preclude the possibility of other definitions or descriptions of these terms. Significantly, while the Glossary also specifies or summarizes an approach of the systems and methods toward the terms, the systems and methods should not be limited to these exemplary approaches.

Hierarchy: The number of hierarchy levels is not determined. The hierarchy may be edited at any time, with new level inserted and old ones removed. All of the parameters can be set at all levels of the hierarchy.

Account master vs. control record: Since all the parameters can be set at all levels, there is no longer a meaningful distinction between an account master and a control record. A control record simply describes a table entry that does not have a direct account, while an account master has all the parameters, and also has an account.

Account template: An account record without an account may be thought of as an account template, because it defines parameters that many accounts (those under it) have. Setting the parameters for such an account template uses the same form and screens as setting parameters directly on an account.

Uses of hierarchy: Hierarchy is used basically to pass parameters down, to roll balances up, and to denote breaks in reports. Parameters shared by many members of a hierarchy are set at the highest reasonable level and passed down; exceptions are handled by overriding at the lower levels. Balances summarizing activity of members below a certain level of the hierarchy are maintained at each level.

Parent relationships: Each account record may have a parent. This is another account record that is directly above it in the hierarchy. The account receives parameters from its parent and contributes to balances in its parent.

Multiple parents: Generally, an account has multiple children and a single parent. It always receives control parameters from one parent. However, it is often useful to place an account into multiple categories for reporting and balance purposes. Therefore, an account can be assigned multiple "secondary" parents. However, secondary parents only receive information from their children; they do not pass information to them via inheritance.

Accounts without parents: An account without a parent is the root (highest) node in a hierarchy. There is no limit to the number of such root nodes.

Account types: Many different account types may be defined. Account types may be defined in an inheritance hierarchy to ease the definition process. When an actual account is created, it is created according to one of the account type definitions. When it is placed in a hierarchy (given a parent), any type of account may be used as its parent. The account takes its field definitions from its account type definition, but it takes inherited values from its containment or hierarchical parent, to which it also contributes balances.

Rules: One or more rules may be associated with an account. Rules are normally associated with parent accounts, and given to the children via inheritance. New rules can be added at the child level. Rules have parameters, both individual and references to tables. These values are also subject to inheritance.

Editing accounts: An account has a base representation as a form, which can also be switched to a grid in the usual way. It has a standard set of buttons, which enable the usual operations, including lookup. The account hierarchy is displayed in explorer mode. All accounts without parents form the highest level (left-most) objects in the tree, with children being indented underneath the tree. The form/grid occupies the right hand pane.

Unique data values: Some fields in an account are always set for accounts and unique to the account. Examples are account ID. The value entered conforms to the restrictions set for the value of the field in general, possibly as further restricted for that row and/or for that user.

Simple data inheritance: A field may be set to enable inheritance. The field will have as its value the value of the corresponding field in its parent. This is normally used for general control parameters of the kind that might have been set in an ORG or LOGO.

Inheritance override: With permission, a user may override the value of an inherited field. The value entered conforms to the restrictions set for the value of the field in general, possibly as further restricted for that row and/or for that user.

Simple balances: A field may be defined to be the sum of the corresponding fields in child messages.

Tiers and lookup tables: There is a standard format for lookup tables (LUT). These are applied to defining the possible values of a single parameter, and to complex things like defining filters with include/exclude ranges and tiers. When a LUT is inherited, it is possible (with permission) to override its contents item by item, adding items or (more frequently) deleting or changing them.

Security: All dbb-based security applies to posting parameters. The dbb security and other aspects of dbb are generally described in related patent applications. This enables CRUD (create, read, update, delete) permission by users and groups over fields and groups of fields. In a table, it applies to all rows of the table.

Row-level data field security: In addition to normal dbb security, CRUD security for users and groups can be applied to a particular row of a table, e.g., account master. CRUD security inherits down to children.

Row-level security: CRUD security applies to the ability to create and edit security, e.g. who can give a certain group read or update permission on a field. This security also inherits down to children.

Restrictions: Normal dbb-based restrictions apply to posting parameters. This restricts the values fields can have, regardless of the row and regardless of the users performing the change.

Row-level restrictions: Field values can be further constrained on a per-field, per-row basis. For example, a user may have update permission on a credit limit field, but the restriction sets the maximum and minimum values the field may have. Restrictions inherit down unless overridden.

Security on restrictions: Restrictions in effect are strictly enforced. CRUD security applies to control who can see and alter the restrictions that are in effect on a field.

Entering transactions: While transactions normally enter the system without human intervention, a facility is provided to create any transaction and submit it to the system for posting, as though it had arrived from the outside. The audit trail for the transaction includes complete information about its source.

Editing transactions: A transaction has a base representation as a form, which can also be switched to a grid in the usual way, for viewing multiple transactions at once. It has a standard set of buttons, which enable the usual operations, including lookup. Given an account, it is possible to navigate to and view in this way the associated transactions. It is also possible to view transactions across accounts.

B. User Interface

Some of main components of the user interface are description below.

1. Record Entering and Editing

A large part of any end-user's normal work will be taken up by navigating to a type of record, entering a new one, locating an existing one, and/or updating an existing one. The user need not be aware whether the information in question is "control" type information, or real, low-level data. The screens and user interface provide a number of important features which are described in one or more of the related patent applications. These features include multi-lingual interface; user extensible text of all kinds (labels, titles, help, tool tips, etc.); complete security control per user and per screen control and/or group, for create, read, update and delete; fields that cannot be read are invisible; full suite of native controls, such as date, combo box, checkbox, frames, tabs, etc.; and comprehensive edit checks on field entry, with look-up tables, state tables, crossfield edits, multi-lingual error messages.

The user interface also provides standard RSM (result set manager) button set, providing for QBE search, selection and refinement of results, VCR-style navigation among results, insert, update, delete, form/grid mode switch. The user interface also has built-in navigation facilities, to enable a user viewing a panel to navigate to related panels by hitting a button. Navigation works for walking a hierarchy (go to parent, go to children) as well as going to panels not related by hierarchy. Additionally, built-in general workflow facility exists to provide for case creation, assignment, routing, rules-based branching, and tracking. In addition to built-in workflow, the user interface has built-in Wizard Workflow facility, which provides for scripting and just-in-time training for all user modules. Other features of the user interface include facilities for users to make changes to screen arrangement, security, text, etc., without affecting source code. Preferably, the user interface works on native Windows and over Web browser equally well, given the differences in the environments. The screens of the user interface provide users with the ability to create, search for, view and alter all the data in the system, including accounts, supporting tables, rules, and transactions.

2. Record Entering and Editing Enhancements of Temporal Tables

Some of the tables that are part of posting are temporal, meaning that each record has a field that contains the date/time at which the record will start to be effective, and a field which contains the date/time at which the record stops being effective. The start effectiveness field value should never be null, but there should always be a record that was effective before the first transaction entered into the system. If the end effectiveness field value is null, the record is effective into the indefinite future.

All the records in a temporal file are preferably "linked" so that the earliest date is in a starting effectiveness field. The date in the ending effectiveness field of that record exactly matches the starting effectiveness date of another record. Ending effectiveness dates should always be later than starting effectiveness dates. The latest date should be in the starting effectiveness field of a record whose ending effectiveness date is null. Therefore, only one record in the table should have a null effectiveness date field.

Most records of this kind are not actually edited. However, the one record which has a null ending effective date may need to have its ending effective date set, and a new record inserted with the desired new values. The starting date of the new record is equal to the new ending date of the old record and the ending date of the new record is null. All dates concerned are most likely in the future, since otherwise events that have already taken place may be affected. When entering a new record, the default starting date is the date the change was made. However, it should be easy for the user to select a date in the future when the change would be effective. This would be a common procedure, because normally policies are decided on in advance of when they are made effective. If multiple records with starting dates in the future exist, the records can be edited, such as by editing their starting and ending dates.

The RSM provides special support to records of this kind. If an attempt is made to update a record of this kind, an insert takes place, and the ending effective date of the original record is altered. The user can then enter the date/time of the change. The system enforces putting the null into the ending date of the new record, if appropriate.

Editing records of this kind is normally a relatively rare event; once a day would typically be a lot. Therefore, an implementation strategy that brought many or all of the records in the table into memory is reasonable.

3. Rule Parameter Editing

Rules have most of the parameters in posting. Most rule parameters are not edited at the individual account level, but at a parent level. Thus, when a rule parameter is changed, the date of the change needs to be recorded as a parameter change transaction in the parent account in which the change was made. The user is given the option to set the date of the change in the future, so that users are not forced to physically enter changes on the day on which they are to take effect, but are free to enter them at any time.

Once a change is made to a rule parameter, the change is migrated down to its descendants. The method of migration is up to the developer. Some common choices are (1) active push-down, so that all affected accounts are brought into memory and updated (both with the parameter change and a transaction recording the event of the change); (2) on-demand pull-down, so that whenever an account is read, its ancestors are also, and any required updating applied before anything else is done; (3) a combination, pushing down in the background, and maintaining a scheme so that you know for any account whether an update is required. It is very important that parameters that are expected to change with any frequency are put in a temporal table referenced by the rule, instead of as a direct parameter in the rule itself. The table is referenced on each execution of the rule, assuring that the rule always has the latest data. This makes the issue of migrating rule parameter changes down a relatively infrequent issue.

A rule can refer to data in a table and the data in the table may change. Any such table should be a temporal table, so that the rules engine can make time-specific inquiries of the table, according to the date for which it is making calculations. Cases can certainly be constructed in which a change to a temporal table resulted in a change to the forward projection of an account, and perhaps even to the next action date. However, this is currently expected to be a rare exception.

The systems allow the rule designer to determine whether the main intelligence and control parameters are in individual parameters of the account, parameters of a rule, tables, or a combination. Each of these methods makes sense for some situations. For example, the cycle an account belongs to is a direct parameter of the account; a table contains the date in each month and year for each cycle; and parameters that control whether to generate statement under various circumstances are parameters of the rule that causes statements to be generated.

C. Lookup Tables

Lookup tables (LUT's) are used for a variety of purposes. For example, a LUT is used to name each legal payment method type. LUT's are also an important part of rules, and may be referenced from within rules. Because of this, it is important to allow users to define a LUT in standard format, and also to define a new LUT by inheriting the values from an existing LUT. Some main components of a simple LUT include the code value to store in the database (code), the code of the language in which the description is written (language), and the description of the code in a particular language (description).

Codes that are in simple LUT's are used to build a more complex entity, a "compound" LUT, which are used to define include/exclude sets and tiering. Some main components of a compound LUT include (1) temporality, inheritance and security controls; (2) operator—whether to include or exclude the item(s) in this row; (3) the code, or the starting code of a range, to be included or excluded, which is defined in a simple LUT; (4) end code—if null, the start code is the only code, if not null, the end of a range; (5) priority value—this is an ordering code, it is not explicitly entered as a number by the user, but used to persist the ordering of the rows when that has been set by the user; and (6) return value—the value (if any) to return if the input code is in the range. The simple LUT that is associated with a compound LUT is defined in the message type component.

When a LUT is defined, it is also given a visualization and a base panel to enable editing. The system takes care of building new LUT's when a rule is defined that needs it. The system also takes care of enabling LUT's to inherit from each other. Functions are provided to enable rules to refer to simple and compound LUT's as part of their operations. A tier LUT is similar to a compound LUT, except that the calling functions are different. The basic compound LUT returns whether the input code should be accepted based on the table values. A tier LUT also enables return of a value depending on the row in which a match is made.

D. Rules

Rules are "logic modules" and control parameters that determine the behavior of an engine, such as a billing engine. Rules are object-oriented in that they encapsulate data and actions, can inherit from each other, and adapt themselves to their context. Rules are preferably defined in as small a "granularity" as possible in order to maximize their flexibility of application. Inheritance is used as much as possible in their definition to increase uniformity for users, and to minimize the effort of making widespread changes and enhancements to the rules.

A posting algorithm according to a preferred embodiment of the invention is hard-coded and efficient in its operations, which are completely independent of particular parameters, charges, discounts, interest, etc. The specific behavior of an application of the posting engine is defined in the rules. The posting engine contains all operations common to maintaining accounts, balances, debit and credit transactions on accounts, interest, reversals, etc.

In general, a rule is a data element group (DEG) that contains parameters and descriptive text about the rule. It enables the rule to be displayed, and it enables parameters to be entered. A rule can also be an expression block, which specifies the actions that are taken by the rule or parameters and logic that control when and where to apply the rule. This may include an expression, whose result says whether the rule should be applied.

All rules inherit from a special DEG or some new data structure which contains a DEG. The DEG contains some DE's that are common to all rules, e.g. starting and ending effectiveness. A rule has a multi-lingual description (label) and help. Even if there are no parameters in the rule, it can be displayed in a group through its inheritance.

A rule hierarchy preferably has rule templates. The top of the hierarchy is an inheritance tree of rule templates which are normal rules that are not actually applied against any particular account, but used to manage families of rules and to keep their definitions consistent. Each such rule template defines parameters, a rule expression, and a form definition. The rule hierarchy also has rule definitions that inherit from templates, and formally are identical to them, but definitions are used directly for instances. The rule hierarchy also has a rule instance which includes a reference to a rule definition. Inheritance is not relevant. The instance contains values for each of the parameters in the rule definition, including any parameter tables.

DE's may be added to a rule's DEG. Each DE is a variable available to the rule. While most DE's are parameters that are displayed to the user and available for entry, DE's may be used in any way by the rule designer. For example, a DE could display something calculated to the operator, or it could be hidden and used for intermediate results. Similarly, the DE's in a rule can be visual in nature, used for grouping the parameters.

All rules inherit from a master rule template, which includes things that all rules have to have. All rules have, at minimum, a starting effective date (default past infinite) and an ending effective date (default future infinite). Effectiveness dates match to the effective date of the transactions and accounts to which they are applied. Rules are maintained long past their ending effectiveness date so that they may correctly re-create the past state of an account.

Rules contain a DE that provides an index into a multi-lingual text explanation table. The text provides an explanation of the rule. The explanation is provided for the purpose of explaining the rule on statements. This explanation is completely different from the help text that may be associated with the rule's DEG or individual DE's. The help text is for the purpose of helping someone who is applying the rule or who wants to understand the rule's parameters whereas the explanation text describes a transaction that is generated by the rule.

Rules may depend on variables that are maintained with the account, typically balances and counts. For example, it may be desired to limit late charges to a certain maximum amount per calendar year. The rule would maintain the maximum amount. However, the account maintains the total amount of late charges in the calendar year. Even though the rule depends on this variable, because it is associated with the account, it is defined outside the rule with the account. The logic to maintain this balance is contained in the definitions of the balance variable.

A rule may need to reference information in a lookup table (LUT). If so, functions are available to perform the reference from within the rule expression. In this case, the data in the LUT becomes part of the parameters for the rule. Depending on the decision of the rule designer, the LUT can be incorporated into the DEG with the rest of the parameters of the rule, if any, or it can be on a separate panel to which the user navigates from the main panel for the rule.

E. Parameters, Balances, and Temporality

Values in accounts can move along three dimensions. In a first direction, "down," control parameters in accounts and rules move from parents to children via inheritance, recursively, perhaps with override as controlled by security. In an "up" direction, balances and status in accounts move from children to parents via reverse inheritance, recursively, being aggregated along the way. A third direction, "out" (in time), control parameters, balances and status in accounts are projected ahead in time.

The ability to manage this movement with the invention provides significant advantages. One of these advantages is that the normal user need not be aware of any of the movements at a detailed level. The user knows that accounts are set up as templates and balances appear as expected, but no special knowledge beyond common sense is required. Additionally, the expert who adds new parameters or rules to the system is aware of which values need to be moved in what ways, but needs not be concerned with the mechanics of the movement. Users and experts should maintain the idea that all this propagation takes place instantly. In fact, it does not take place instantly, but none of their actions influences this, so they can ignore it. There are some control parameters available to a posting administrator that control the details of the movement. These parameters essentially prioritize the order in which various of the updates take place. Increasingly sophisticated algorithms are built into posting that handle the data movements and assure that the user's view of the account and transaction database is as synchronous as it needs to be.

One basic strategy used for the movement is to save a record of the changes that have to be made to the database in a single DBMS record in order to commit a low-level change as quickly as possible and then apply the changes at a low priority, in the background. This provides excellent, consistent response time to real-time changes, while allowing the consequences of those changes to be applied in the background. Another basic strategy is to aggregate many changes to an account parent and apply changes originating from many children in a single database operation. As another strategy, when a record is brought into memory for some reason, the system applies all the changes that have accumulated for that record prior to updating it. A further strategy is to actively "push down" inheritable changes to children if those changes may make the next action date be sooner; otherwise, the changes should be applied at the next action date, or when a transaction arrives, whichever comes first.

F. Balances

Balances are a special kind of parameter field. Rather than directly controlling operations and responses, balances measure work that has gone through the system. Balances are calculated after the fact from the detailed data, and ideally are, except that balances based on recent events often also provide decisive input on how to respond to new events. Therefore, there is no way to avoid calculating many balances in real-time.

Most balances are counts or sums, where the inputs can be positive or negative. They are typically based on values or events that come from other records. For a posting system, there are really only two kinds of records: transactions and accounts. Balances are in the account record, and they summarize information in transactions, or in lower-level accounts. Some balances grow forever, while other balances are periodic in that they count or sum data from a known period of time. Some balances are primary and are usually tied directly to particular kinds of transactions. Other balances are derivative, in that their input is derived from other balances.

Instead of associating logic with transactions that come in, and adding them to relevant balances, a balance says what kind of data comprises it. This makes it possible to have cascading balances. A change that was made to a primary balance cascades into various derivative balances. An exception to this rule is the projection, in which rules add primary values to balances in the projection lines.

A field that is a balance field preferably has the following properties which are maintained with each instance of the field: date—date/time for which the value of the balance is calculated; period—the cycle on which this balance is reset (day, week, month, cycle, year, other); message source—the messages from which the source of this balance comes, which can be itself or is typically child messages of the same type, or messages of another type (e.g. transactions); data elements—the data elements which this balance summarizes and can be from other messages or from the same message as the balance; and type—sum of values or sum of occurrences.

Balances may also need to be projected into the future and have adjustments applied to them. In this, each balance is actually be an array, with a value for each day. In addition to the array itself, the system maintains the date of the first value in the array, and the date at which each value in the array had been initialized to zero. This is required to handle the upward propagation of contributors to a balance, which have also calculated future values.

G. Security

CRUDE permissions are applied to data elements (DE's) and message types (MT's). As such, they control whether members of a group can perform operations on any instance of the DE or MT. In the case of the DE, security on a DE is really column level security, since it applies to the field in all rows. The security defined here goes beyond this security, and is in addition to it. These new security types can be inherited. The inheritance is defined by the primary parent of each row (if any). Security that applies to a particular message is inherited by all the message's children, and so on recursively, unless and until overridden. The ability to override inherited values is itself controlled by security. The ability to override security is a separate subject, and is discussed in more detail below.

One type of security is message, which is security on a single message (row, record) in a message store (table, file). Security pertains both to access to the data in the message and to the security rights associated with the message. Field is another type of security and is security on a single field within a particular message. Security pertains both to access to the data in the field, and to the security rights associated with the field. User security is on the user component and it controls which users are able to control which other users' security rights. This defines generic rights of groups of users over other groups of users. These rights are refined by message and field level security.

Message level security takes the general CRUDE concepts and applies them to individual messages in a message store (rows in a DBMS table). With regard to message level security, "C" stands for can create children of this message, "R" for can see (read) this message, "U" for can update the message, subject to field security, "D" for can delete the message, and "E" is not used.

All security rights for a message are by default inherited by all children of the message. The security rights for a message and/or its children can be viewed and altered according to the security rights of the actor. With regard to message security, "C" stands for can add users and groups to the message's security, as controlled by the actor's security over the users and groups in general, "R" for can view user security rights for this message, but can only see those users for which the actor has read permission in general, "U" for can change the security rights of users and groups who are already explicitly mentioned with the security for the message, limited by general update permission, "D" for can remove users from the security list of this message, limited by general delete permission, and "E" is not used.

A purpose of message level security is to control access to particular account and control information. Message level of security enables a processor to have a single database of account information, and provide the customers for whom they are processing access to their own accounts and no other. It also enables any institution, processor or otherwise, to establish various account template and control information for itself, controlled by itself, and to create children of those templates and control information which can be freely altered by designated individuals outside the institution, with limits as set by the original institution. This process can be repeated in a chain from one institution to the next. This security also allows an institution to grant rights to a corporation, which enables the corporation to set up new accounts, issue credit to departments and individuals, etc., using the institution's system and within limits strictly set by the institution. This would apply equally to access directly via Windows or via the Internet with Web browsers.

With regard to message security, "C" stands for can override the inherited value of a field, "R" for can see (read) the field, "U" can update the field if it has a value, but not if its value was inherited, "D" for can delete an overridden value, restoring the inherited value of the field, and "E" is not used.

To determine whether a user can perform an action, the user must have security to do it at each level of security control. The most restrictive security controls the outcome. In order to determine whether a particular user can override the inherited value of a field, for example, the user must have: (1) update permission on the column (i.e., for the data element in the message type), to enable the user to make changes to the field for any message; (2) update permission on the message (row), to enable the user to make changes to fields in this message; and (3) create permission on the field in the message so that security can be inherited for the row from above. All three of these permissions must be present for the operation to be permitted. For example, the user's group could have been given the field-level permissions (#1 and #3) at the highest account, but they are only effective on those accounts (messages) for which actual update permission (#2) was given.

H. Restrictions

Normal dbb restrictions are independent of users. They restrict the values that can be placed into fields, regardless of the source. Restrictions also apply to all messages of a type.

Posting parameter control requires that restrictions be defined that are particular to members of a particular user group. In this way, for example, certain users who do have permission to update a field can be restricted in the values they can enter. By definition, per-user restrictions are more restrictive than general restrictions. For example, perhaps the general restriction on the credit limit field is $100,000, but a particular user who has the right to change people's credit limits is limited to setting values less than $20,000.

Posting parameter control also requires that restrictions be defined that are particular to certain messages (rows). For example, a corporation is given an actual credit limit of $80,000, but at the same time a restriction is made which limited that corporation to a $100,000 credit limit.

A goal of providing row-level restrictions is met in most cases by additional parameters. In addition to the credit limit parameter, a new parameter that is defined is max credit limit. A generic restriction is placed on the credit limit that requires that it be less than the max credit field in the same message. This more limited feature makes sense to users and would probably handle most practical cases, but requires database changes whenever a change to the formula (as opposed to the value) has to be made.

I. Account Inheritance

Inheritance applies at multiple levels of this system. Generally speaking, inheritance relations serve to pass control parameters to their children and to pass balances and other performance information from the child (detail) level to the parent (group) level.

Account control presents difficult problems for inheritance. Take the case of an account whose prime parent is a kind of Gold Visa card. The main parent has most of the rules that control the account. However, it is required to enforce interest rate limits and certain terms depending on the state of residence of the card holder, the state in which the store of purchase resides, or the state of the issuer. There are even rules to be enforced about which of these conditions is in force.

One approach is to have all the parameters "flat," and to handle this kind of situation via multiple inheritance. In other words, each account record has multiple parents. The main parent controls most of its parameters. A secondary parent controls a subset of the parameters, as determined by a priority value. However, there are number of control situations which are too complex to be handled by this kind of scheme. Furthermore, parameters now primarily reside directly in rules, or in tables that are referenced by rules. The rules can define arbitrary conditions under which the parameters apply, including the kind of examples mentioned above. Therefore, multiple inheritance is preferably not used for passing down account control information.

While multiple inheritance is preferably not used for control information, there are a number of situations in which multiple inheritance (and thus multiple hierarchies) makes sense for passing balance information up. For example, consider a large corporation that wants to track expenses on a corporate card. The organization wants to track all expenses at a particular location, regardless of the job classification or project involved. But it is also reasonable to track expenses by job category or type across locations, for example, human resources, engineering, sales, support, etc. A single individual account's main parent may be the division a person is in, but secondary parents may exist to help track expenses by job category and other reasons. This is a much simpler mechanism, and can provide great value to an organization. Another example is tracking all charges by a particular type of card as a main parent, but having secondary parents that track balances by credit plan type. This means that the lowest level account, thought of in today's system as a credit plan segment under an account, has the card account as its main parent, because that's where its control information comes from. However, it has a credit plan parent as well, whose only purpose is to track balances by credit plan.

So long as the core information is captured, this kind of information is also easily obtained by an OLAP tool running on a properly constructed star-schema data warehouse. If no action is taken directly as a result of such sums, OLAP is the best, most flexible way of obtaining the information. If, however, actions need to be taken as a result of the balances, e.g. deny authorization if certain sums are exceeded, then the hierarchies represented in the transaction system are the best solution.

III. Interfaces to and from Processing Systems

An example of the invention will now be described with reference to a processing system and, more specifically, to a posting engine. The posting engine is the heart of any financial system and normally requires a body of other modules around it to be complete. In general terms, these other modules include modules for performing the functions of (1) message handling and (2) customer care. While the invention will be described with reference to the posting engine, it should be understood that the invention can be applied to an entire processing system or to one or more of the individual modules or engines.

A. Message Handling

Message handling is primarily focused on receiving and/or sending transactions. Message handling systems perform the following activities: interact with sources or sinks of messages; enable users to find, view, update and create messages; have complete knowledge of messages and their edit checks, so that when one is read, updated or created, the system can assure correctness; transform messages in one format to another; route messages based on their content and local tables; and track statistics of message events, and maintain a complete audit trail. Depending on the particular message handling activity, there may be additional functions. For example, an authorizations module performs all general messaging functions, and in addition, decides whether to approve, reject or refer requests for purchase authorization. It generates a message in response to the request, and updates various counters in the relevant account record. The invention, as discussed above, can incorporate message handling and authorizations module.

B. Customer Care

A customer care system is built around the general ability to create, view, and update any of the data in the posting system, whether this is done in a call center on behalf of customers, or over the Web by the customers themselves. In addition, dbb includes other features relevant to customer care, most importantly the Wizard Workflow system, which enables a layer of rules-based scripting to be layered on top of the system's basic screens. This also includes basic queuing, in which all work is tracked in the form of cases, assigned to people, and tracked to resolution. Depending on the particular customer case activity, there may be additional required functions. For example, processing new applications requires an interface to credit bureaus and collections requires a promise-to-pay screen and tracking ability. Again, the invention can incorporate customer care and the processing of new applications.

IV. Accounts and Transactions

The embodiments disclosed below are consistent with certain features of the invention discussed above in other sections. The embodiments are provided to help clarify features of the invention and the systems and methods of the invention are not to be limited to these precise embodiments.

A. Account Contents

When not being processed, an account is a row in a DBMS table. When in memory, an account is a distinguished dbb-style message, with some additional data in support of message-level controls such as inheritance and security. In dbb, an account is defined as a message type (MT), with an attribute that says it is an account; this attribute enables the special features supported for accounts, such as message-level controls. Each account type must inherit from a system-level account MT, which includes a DEG (data elements group) containing the information dbb needs to implement inheritance, parent/child, the association of rule sets to accounts, etc. Among other things, this common data block enables an account of any type to be a child of an account of any other type.

In addition to this common DEG block that makes a MT an account, there is another DEG block that varies from account type to account type. This is the balances DEG. It includes all the balance DE's that are to be maintained with the account. This DEG is specially marked because it is by definition included in the definition of the projection record when that account is projected. It tells the posting engine what balances to calculate and maintain for that account.

The data in an account may be fixed (e.g. account number), a control parameter (e.g. grace period days), a measure (e.g. available credit), or a balance (e.g. interest billed not paid). Each of these fields is marked with one or more attributes to say which type it is. The type implies whether the value of the field is inheritable (control parameter). If it is a balance, attributes say the kind of balance it is.

System designers can define a large number of DE's that cover most of the kinds of fields that are needed in accounts. To the extent that this job is done effectively, it reduces the work of defining an account type to assembling pre-existing DE's. However, adding a small number of DE's is not a major task.

It is important that the definition of most of the fields determines their behavior. Balances, for example, include how they are to be calculated and to what other balances they contribute. When balances are rolled up, the system finds balances of a similar name and sums them up automatically.

It is desirable to have a relatively small number of account types. However, the system designer may design as many account types as needed. To the extent that account types share DE's, those DE's interact in common-sense ways: parameters inherit down and balances sum up. Thus, while it is expected that in most cases accounts of similar type are parents and children, accounts of dissimilar types are computed appropriately to the extent that they share field definitions. For example, it may be desired to make a different account type for cash plan than a main account.

Inheritance vs. containment: An Integrated Development Editor (IDE) is used to define DE's, which are then grouped into account type definitions. Account type definitions may inherit from each other, so that common elements of their definition are shared, and only the differences put into the children. When an account is actually created during operation, two pieces of information are supplied. The first piece of information is account type, which refers to which account definition from the repository should be used to define this account. Different account types have different parameters, balances, and rule collections. An account type may have an inheritance parent, from which it received many of these definitions. The second piece of information is account parent. Accounts are arranged in a hierarchy. Accounts have parents in the hierarchy from which they receive inherited parameters and to which they contribute balances. An account parent in the hierarchy is a containment parent. The containment parent of an account may be the same type as the account or it may be different. Inheritance parenthood has no impact on this at all.

Account hierarchy constraints: When account types are being defined, the possible hierarchical relations they have are also defined. Any particular account type may be a primary or secondary child. A primary child is mainly for control purposes while a secondary parent is mostly used for reporting balances up. Any particular account may also be an account of the same type as a child. This is a recursive structure. No limits are placed on how many times this may be repeated. The child may be a primary child or a secondary child. Further, any account may be an account of a different particular type as a child, primary or secondary. When combined, these simple relationships place all the defined account types into a type hierarchy. The type hierarchy controls how actual accounts are defined, and where in the hierarchy they are placed. When actual accounts are defined, the type hierarchy is used to define the parents and possible children.

Account hierarchy editing: One editor enables easy navigation, visualization and editing of the account type hierarchy and a related editor performs the same function for the account hierarchy. The account type hierarchy defines and constrains the possible relationships among actual accounts. The account type editor is used infrequently by a small number of highly specialized and knowledgeable people who establish account type hierarchies. This editor preferably implements the following functions: view all available account types; for any type, view ancestors and descendants, primary and secondary; set or change an ending effectiveness date for any member or relationship in the hierarchy, or starting effectiveness date, if that date is still in the future; add a relationship between account types, with starting and optional ending effectiveness dates; and picture a hierarchy graphically, possibly by exporting information to an appropriate graphical editor.

The editor is preferably not isolated, but enables smooth movement between editing the account hierarchy and performs other operations on account type definitions, and perhaps also accounts. The editor can be used to set up a deep, rigid hierarchy, for example: processing organization, super organization, organization, master logo, logo, account family, account, plan. It could also be used to set up flexible, recursive hierarchies, or a hierarchy that mixed recursion and fixed elements.

B. Transaction Contents

For purposes of the posting algorithm, a transaction preferably includes at least the following fields: transaction ID (Txn ID), posted date (DT), effective DT, Txn type, adjustment type, reference transaction, status, rule ID, source currency, destination currency, and amount. The Txn ID is a system-wide unique identifier of the transaction. This id applies to transactions that are stored in the archive and transactions that are stored with each account. The posted DT is the date/time the transaction was posted. The effective DT is the date/time the transaction is effective.

For example, a paper-based purchase may be effective days prior to posting. The Txn type is the type of transaction and is one of an extensible table of types. There are both monetary and non-monetary transactions. Any kind of change of state (e.g., new interest rate) is also stored as a transaction. Generated transactions are distinguished from non-generated ones. The adjustment type controls how adjustments to this transaction are to be handled. The code is normally set when the transaction is generated and not later altered. There is a flag that says whether this transaction has been adjusted. The reference transaction is the Txn ID of the transaction to which this transaction is related. Normal use is when this transaction is derived from the reference transaction. A reversal has the ID of what it is reversing, and a reversing transaction has the ID of what reversed it.

There is also a flag on a transaction that says whether derived transactions are related to it. For status, a transaction is "new" when just inserted, "posted" when it has been projected successfully, "reversed" when another transaction has reversed it, "statemented" when it has appeared on a statement, or "non-statemented" when it was considered for a statement but rejected. These last two status values may be combined with the previous ones. The rule ID is an identifier of the rule (if any) that caused this transaction to be generated. The source currency type and amount relate to the type and amount of the transaction in the currency in which it took place. The destination currency type and amount relate to the type and amount of the transaction in the currency of this account.

A main use of having the rule ID in the transaction is to be able to explain the origin of the transaction. The rule has a multi-lingual explanation field in it, which is used to generate text explaining the transaction for the statement. Sometimes a transaction is generated by the posting algorithm itself; this happens when there is a mix-match between a calculation and a re-calculation (see below), and an adjustment transaction is generated. In order to provide an explanation for such a case, "system" rules exist whose only purpose is to provide the explanation. The "system" rule is not actually executed, but it provides a unique identifier and text.

Changes of system state are only recorded as transactions if they are "direct" (not in tables) parameters to the account, whether set explicitly for that account or inherited. The controls that most often change in a system are contained in temporal look-up tables, which provide the same information in a different format.

V. Rules

A rule definition is logically the same thing as a message type/store combination. Each rule instance is logically the same thing as a message (row) in the message store (table). Rules can be implemented this way. However, if they are, then assembling all the rules that apply to an account requires something like maintaining a cross table that has one entry for each account/rule combination and performing a read on potentially many tables to actually get the rules in. This structure might be desirable during prototype stage and for the persistent storage of the rules, since it is unlikely that new types would be created very often or that new instances would be added or edited very often. However, for production execution, all the rules relevant to an account have to be brought into memory along with the account. Therefore, having them in a conveniently and quickly loadable form is important. One approach is to serialize the internal (runtime) format of all the rules applicable to an account, to store the serialization in a field of a row of some new table, and to store the primary key of the rules row in a field of the account. Since most accounts are likely to receive their rules by inheritance from a parent account, there is not a large number of such rule collections; thousands is a large number. Therefore, the most-used rule sets are cached in memory, available for rapid access when an account that needed them arrived for processing.

A related approach is to have all the rules cached in memory all the time when performing posting. The lists of rule collections, which is nothing other than a list of rule id's, are also stored in memory. Each account is associated with a reference to the list-id. Given that central, server-type machines are used for posting purposes, this eases implementation and is not a burdensome requirement.

A. Rule Change Transactions

Rules can be changed according to several basic kinds of changes. One example is a change in the definition of the rule (changes to the statements, adding parameters to the rule definition). A second way is a change in the association of rules to accounts (a rule type is added to an account parent, changing the behavior of all accounts under it). A third way is a change in the value of parameters of a rule (someone calls up the form for late fee and changes the minimum amount that can be charged). Each of these changes are recorded and handled slightly differently. However, they all have the net effect that whatever was in effect at the time of a transaction applies to that transaction and that the new rule or parameter is applied only from its effective date on.

In all cases of making changes, the date/time at which the change was made is, by default, the date/time at which the old version ceases to be effective and the date/time at which the new version becomes effective. However, the user is always given the option to set the date/time at which the change becomes effective. Normally, the date/time is set by the user at some time in the future, such as at midnight.

When a rule definition changes, it is as though the old definition is "tied off." It is given an ending effective date, and cannot be applied to transactions after that date. The new definition is like a new rule, since it has new data and new meaning. Therefore, it has a new object ID. However, to ease tracking changes, the new rule has the same external name as the old one and the user can track the history of rule changes in the development environment.

Changing a rule association does not actually change any rule definitions, but it does make a change to the lists of rules and which accounts reference which lists. Again, old and new versions are maintained with change dates. At run time, whenever rules are referenced, the effective date of changes of this nature are honored. Internally, this is maintained as a list of transactions of the changes.

Changing a rule value is handled just like making a change to a parameter in an account. Each rule maintains a transaction list of parameter value changes, just like an account does. Each entry has the date/time of the change, the parameter that changed, the old value, and the new value.

Rules typically apply to many accounts. Instead of propagating rule change transactions of this kind to each account, they are maintained with the rules themselves. When an account is brought into memory and projected, the change transactions from the applicable rules and rule associations are brought into the projection. They are then applied in the correct order and at the correct time as the projection is brought through time.

B. Rules Development Environment

There are generally two distinct environments for using rules, development and use. In the development environment, programmers and business analysts define, create, test and deploy new rules and associated balances and parameters. Logically speaking, this corresponds to custom code development except that the ease and speed of development is greatly enhanced. However, the possibility of introducing severe errors also exists. In the use environment, users fill out parameter forms and tables to create new financial products, etc. This corresponds to entering and updating control records in one of today's systems.

To the extent that rules involve data elements and expressions, there is a good deal of overlap between a rules creator and editor and the dbb IDE. The full IDE is available to help define data elements and their attributes, along with restrictions, lookup tables, etc. However, a distinct rule component exists that contains the things that comprise it. This enables access to all the rules, editing and creation of them, making and breaking inheritance relationships among rule definitions and their attributes, just like for other components.

A distinct editor exists for creating and editing rule instances. This is really a kind of application, except that it is not application-specific. It allows the user to view the rule types that have been defined and the rule instances that are defined for a particular account (whether individual or group, like LOGO). It allows the user to edit or delete (i.e., set an ending effectiveness date) a rule instance for an account. It allows the user to add a new rule to an account by selecting from a list of available rule definitions. Once the user has selected the type of rule to add (e.g., a late fee), the user then gets a form that contains the parameters of the rule selected. The user can then enter the parameters as controlled by the attributes of the data elements on the form, thus with a full complement of help, multi-lingual labels, drop-down lists, field-level security, etc. When the user is done, the user can discard or save the work.

Previously, each account is controlled by all the parameters in its LOGO and ORG, and those parameters represent the logical equivalent of rules. In contrast, with the invention, a rule is associated with an account template and it is possible to fill out its parameters and have it be active; furthermore, rules do not have to have parameters and they may be defined to be mutually exclusive. For example, if the user sets up an account template for a retail card, the user does not associate with it any of the rules relevant to bank cards, and vice-versa. This has the benefit of not confusing the user with piles of parameters that are irrelevant.

The editor enables the user to associate rules with account types. Whenever an account of that type is created, the associated rules are added to the rules the account received from its parent. The editor is preferably a simple dbb application. A result set manager button box enables the user to navigate among a set of rules. One thing that makes it special is that, formally speaking, each rule instance is a message of a different type. When the user is done editing, the internal format of the rules are built and saved into the structures described above, preferably in addition to a simpler format that enables easy browsing and editing.

C. Account and Balance Development Environment

Account types, projection lines, the relation of rules to accounts, and balances are defined in a development environment. This environment is an extension of the existing dbb IDE which primarily includes new attributes, as defined in other sections of this document. For example, a DE has attributes for defining it as a balance and the periodicity of the balance. Each DE that is a balance has a list of DE's to which it contributes. For instance, a DE can be defined as a child of a balance DE, in which case it is also a balance DE and contributes to the same balances as the parent (unless overridden).

It is typical for a "base" balance to be defined as a LTD balance. Other balances are made as children of that balance with other period, e.g. MTD. By definition, when a DE (say, late charge) contributes to a balance (say, LTD service charge), that DE also contributes to all the children of that balance (say, MTD service charge). In operation, the system tracks of all these relationships. To the extent that the balances are present in an account, the relationships are maintained.

A MT has an attribute that declares it to be an account; it includes the system DEG that contains the account control information. The DE's in this DEG include a reference to the rule set that controls the account. Another attribute refers to the projection line definition, which includes the account definition.

For example, a generic service charge component balance DE is defined as contributing to the base service charge balance (LTD service charge). To create a new service charge, a child of the generic service charge component is created and label, help text and other attributes are defined appropriately. By inheritance, it contributes to all the service charge balances. To maintain balances for the new component, a new balance exists and has the inherited contributor for those balances that contribute to the new balance. Children of the new balance define new balance periods. The DE's are included in account type definitions by including it in the projection definition, which is itself included in the definition of an account type.

To make a new component effective, a new or existing transaction type must contribute to it. The transaction arrives from the outside, if it is new. The contribution is performed by a rule; once the "primary" DE has the value from the rule, all the balancing takes place automatically.

Because many types of accounts are preferably used, they may not all include the same balance DE's, although they all use DE definitions that are in the repository. Therefore, when they include a DE, all the balancing information about that DE is also included.

A balance DE that contributes, for instance, to four other balances does not need to include all four target balances. A balancing engine takes changes to the contributing DE and applies them to all relevant balances that are also in the account definition. It may be that balances A, B, and C are desired in one account-type, while balances B, C, and D are desired in another. The repository defines that the contributor contributes to A, B, C and D, and the engine acts accordingly. Similarly, an account definition may state that a target balance that has four contributors, but fewer than four of the contributors may be included in that account.

For balances to propagate up to parent accounts, the balance is included in both account definitions. When the accounts are of the same type, this is easy. An example of a more complex situation is the use of a special account type for cash accounts. Rather than including all the balances for both cash and credit, balances from both the cash and credit plans are included in the base account definition but only the balances that matched would sum from the child to the parent.

D. Browsing and Debugging

After a new rule is defined, the rule needs to be tested. The new rule is first attached to an account and any required parameters are entered. An account situation is then set up so that incoming test transactions cause the rule to be executed. The system then gives you the ability to run the posting engine on the test transactions.

The results can be examined by looking at the account after posting. However, in many cases, the results of the projection are reviewed to provide the projection after insertion of the new transactions and calculation. The projection is preferably viewed in a dbb-standard form/grid switch, with each line of the projection being a line in the grid. In this format, everything that is needed to know about the results of rule execution is available. Unexpected problems could be due to several things, among them, the rule was not invoked at all; the rule exited before the intended time; the rule was mix-coded; or the new rule somehow conflicted with an existing rule.

While debugging, special facilities exist to help find out what goes on during a projection. For any line in the projection, a list of the rules that were fired can be viewed in the order in which they were fired. "Firing" means only when the main expression body of the rule was executed, not including the expression that tests whether the rule should be executed. Thus, for any rule, the time when it was fired can be determined. With such a list, the data can be placed in context, for example, and see the rules that were fired before and after the one being studied. Preferably, the execution path through the rule is also viewed, including how the variables were resolved to values.

The above is accomplished by maintaining a complete audit trail of rule execution, and providing a search/view facility for it. The audit trail contains an entry for each firing of a rule, and maintains the identifier of the rule, the line on which it was fired, the field to which it was attached (if any), etc.

E. Rule Execution Details

1. When to Execute Rules

One or more of the DE's in every rule controls the circumstances under which the rule is applied. Some of the choices, some of which may be combined, include (1) on transaction insertion; (2) projection—on adjustment; (3) projection—every line, (4) projection—on value change; (5) projection—only once per line; (6) projection—only once per date; (7) projection—at last line of date; (8) projection—only once per line ever; (9) projection—only when line time is in the past; (10) on call; or (11) end of projection. Additional descriptions of these choices is provided below.

For on transaction insertion, the rule is applied when a transaction is applied to an account, prior to projection. A purpose of having a rule is to enable the transaction to be rejected, or more often, to direct the transaction to an account above or below the one to which it is being applied.

For projection on adjustment, when a transaction needs to be adjusted (its amount has changed, it is being removed, etc.), the rule is fired. The rule has access to a status code telling it what is being changed. For projection every line, the rule is applied on every line of the projection. If the projection operation generates more lines in the projection, which is expected often to be the case, the rules are applied to them as well. Rule application starts at the first line of the projection and proceeds to later lines, in order of effective date of transaction. For projection on value change, when this choice is made, another control DE is set that names the DE to which this rule is "attached." When the value of that field changes, this rule is executed. For projection only once per line, this choice may be combined with either of the previous two. It asserts that once a rule has been executed on a line, it may not be executed again.

For projection only once per date, this choice is like the previous one, only it applies when there is more than one transaction that have the same effective date. This says that once a rule has been executed for any line that has a given date, it may not be executed again for another line (or the same line) that has that date. For projection at last line of date, if there is more than one line for a given date, this kind of rule is executed only on the last line for that date. Priority and order may be used to control its execution relative to other rules on that line. For projection only once per line, ever, this is an additional choice; once this rule has been executed for a given line, it is not executed again for that line, even on future projections. This enables control that something, once done (like generate statements or transactions for the G/L), should not be done again. For projection only when line time is in the past, this is an additional choice and often combined with the previous one. A purpose of this choice is to prevent premature execution of rules that should only occur "now." If such a rule were executed while projecting into the future, it would be inappropriate.

For on call, this is a "subroutine" rule. It is only executed when explicitly called from within another rule. If a subroutine rule has no conditions, it is always executed when called. However, it may have conditions; if the conditions are not satisfied, the rule is not executed in spite of being called. This enables the rule builder to control the order of execution of rules. For end of projection, all rules of this type are executed after the projection has been performed. One of the purposes of rules of this type is to update values in the account for which the projection was performed. This is one of the main mechanisms for moving information in the projection to the associated account.

Generally speaking, attaching rules to values (fields) is to be preferred over attaching them to lines, simply because it reduces the number of rules to be executed in performing a projection. In addition to attachment, an expression can be defined for a rule to control whether the rule is relevant in a particular situation. The expression is fired in any situation to which the rule might be applicable. For example, if the rule is line-attached, the expression is fired to see if it applies to that particular line; however, if the rule is to be fired once per date and it has already been fired for that date, the rule cannot be fired, so it does not fire.

In principle, a purpose of the relevancy expression could be fulfilled by simply making the expression the first line of the rule, and exiting the rule if the expression is false. Separating out the expression in this way, however, makes it easy to determine which of the rules "really" fired, and therefore contributes to debugging.

In addition to all of the above, rules also have a priority field and an order field attached to them. Once the rules that are potentially applicable according to attachment have been selected, but before the relevancy expression has been executed, the order of execution of the rules is determined by these fields. Some rules need to be applied before other rules, and some rules need to be applied after other rules. The order field can be "first," "middle," or "last," and says which the rule cares about. Middle is the default and really means do not care. A priority that is blank is the lowest priority and means most towards the middle. A higher priority means more towards the first or last, according to the order field. For any set of rules with identical values for the priority and order fields, the order of execution for that set is non-deterministic.

2. Method of Applying the Rules

Figure 2A:
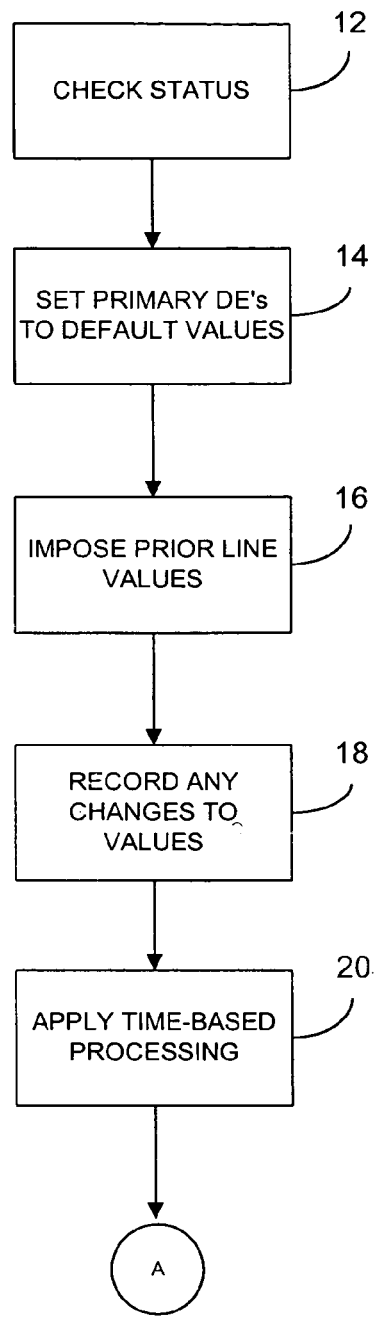
FIGS. 2(A) and 2(B) are flow charts of a preferred method of applying rules.
Figure 2B:
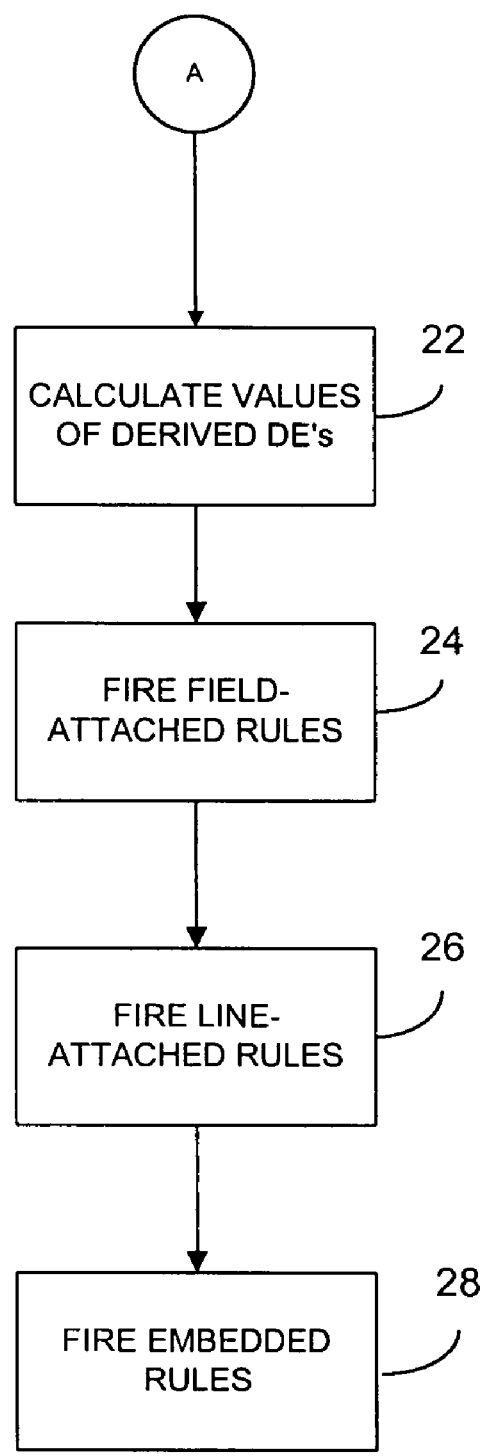

Projection rules are applied to each line of the projection, from the top (earliest) line to the last line. An exemplary method 10 for applying the rules is shown in FIGS. 2(A) and 2(B). At 12, the method 10 begins by checking the status of a transaction. If it has been reversed, skip processing of the line. At 14, all primary DE's are set to their default values. At 16, all parameters and balances are set equal to the values they had on the prior line. A copy is made, because the execution of rules on the line may cause some of the balances to be updated. Furthermore, after projection, projected daily balances have to be transferred to the account record, and this is how they are calculated. At 18, if the transaction is the kind that records a change of the value of a parameter, change the value of that parameter. Processing of this line is now complete. Next, time-based period processing is applied to all balances at 20. For example, if the balance is MTD and the month part of the effective date differs from that of the prior line, zero the balance. The occurrence of a cycle is declared by a transaction. Cycle-to-date balance processing takes place on the line of the cycle change transaction and is initiated by a "system" rule, which is a rule like any other, but always supplied with the system and security restricted against change.

At 22 with reference to FIG. 2(B), the values of any derived DE's are calculated. Normally, there is a set of derived DE's, each of which has the value or count of a particular transaction type. At least one of these normally ends up having a value set. At 24, rules that are attached to fields whose value has changed from the previous line are fired. As a result of any of these rules firing, other values in the line of the projection may be set. If rules are attached to any altered field, they are then also fired, and so on, until there are no more field-attached rules to be executed. Next, all line-attached rules are fired at 26. These are executed according to priority and order. The relevance condition of the rule is first executed; if it fails, the rule is not considered to have been executed. If it succeeds, the body of the rule is executed. At 28, whenever a rule causes a value in the line to change, fire any rule that may be attached to that field, and rules attached to fields that are changed by the first rule, etc., as before. If a line-attached rule causes a value to change, the system fires all the affected field-attached rules before proceeding to fire the remaining line-attached rules.

3. How to Execute Rules

Rules are attached to various things and events. When those things (e.g., encountering a new line in a projection) or events (e.g., a transaction is inserted into a projection) take place, the rules associated with that thing or event, for that account, are executed. When considering whether to execute a rule, the system checks to ensure that the rule is effective as of the effective date of the transaction (projection line) on which it is being executed. The conditional part of all the remaining rules is then executed. If the condition (e.g., is this line a transaction of a certain type) is not met, the rule is not considered to have been executed. If the condition is met, the system executes the rule. When a rule is executed, an expression engine is invoked on the expression part of the rule. During execution, a rule may cause changes to the projection, including inserting new transactions. After executing, the system proceeds to execute more rules for the particular thing or event. When there are no more relevant rules, rule execution for that thing or event is complete.

4. Rule Syntax and Variable References

The syntax for rules is same as for generic dbb expressions as described in related patent applications, except that there is a special context for expression execution and special ways of referencing variables. Roughly, the syntax follows the rules of C but could conform to javascript.

Expressions in rules frequently make unqualified references to variables (DE's). The expression engine resolves the ambiguity by attempting to find the DE in the following order: (1) the DE's that are part of the rule itself (the control parameters of the rule), (2) a DE in a table that is referenced in the parameter part of the rule, and (3) a DE in the current line of the projection. This includes explicit DE's and implicit ones, e.g., line status. The expression engine supports references to other DE's than the above-listed ones. The syntax used is preferably the same as for a pointer in C, such as, "handle->var." The cases include non-current lines of the same projection. For this case, the other line is identified by a function (e.g. Find transaction) and its address stored in a pointer (cursor), "line." The syntax is line->DE. Another case is previous projections of the same account. The system provides access to the previous projection in a pointer, "prevproj." The syntax is prevproj->DE, for the corresponding line of the previous projection. A further example of a case is lines in different accounts. These are identified by a function that searches for lines in non-current accounts. Internally, the pointer returned (cursor) identifies both the account and line of the non-current line. Therefore, the syntax is the same as for a non-current line, line->DE.

5. Function Calls and Rules

Nearly everything that can be done in a function can be done in a rule. However, if in general the expression part of rules is many pages of code long, the rules are hard to read and change. Each rule preferably performs a single function and is kept reasonably short (usually less than a page, and only sometimes a couple of pages). For example, instead of having a single rule that determines when a cycle takes place and performs everything that takes place in a cycle, one rule declares that a cycle has occurred (by generating a "cycle occurs" transaction), and each possible resultant of the cycle is expressed in an additional, separate rule.

Some or all of the contents of a rule can be translated into an internal system function, which can be called from the expression part of a rule. Rather than having repeating blocks of code in the expressions, they should be replaced by such a function. Whenever the function is not appropriate, the variant purpose can always be met by custom in-line code. However, in general, such translation should not be done for performance reasons, even though it is certainly the case that internal functions execute much more quickly than expressions in rules (compiled vs. interpreted). A primary purpose of rules is to make the operation of the system transparent and amenable to easy addition and change; having important parts of the system invisibly tucked away in compiled code functions runs counter to this purpose.

Since rules sometimes need access to common sub-functions, which themselves may need to change, the rules should not be made into compiled internal functions. Such functions are defined as a kind of rule, which is declared to be executed only when explicitly called from within another rule.

6. Derived Buckets and Balances

The derived buckets in the core calculation engine are the source of balances that are maintained in account records. In accounts, balances are maintained as vectors, with projected future values of the balance stored in the positions of the vector. When the calculation engine is done with its work, it scans the "spreadsheet" and moves relevant values to balance vectors in the account for which the calculation was performed. In the spreadsheet, derived buckets have the key characteristics of balances, which exactly match the characteristics of the account balances that they generate: date (given in the header of the line), period, type (sum of values or occurrences), and source.

There are many cases in which a particular value is added to many balances. In some cases, the balances represent the same kind of thing, but just tracked at a different periodicity. An example is a balance such as late fees tracked cycle to date, month to date, and year to date. In other cases, the balances represent sums of other balances. An example is service charges, which are the sum of late charges, over limit fees, membership fees, and others. The sums of balances can be recursive; for example, debits include service charges. It is also possible to have sums of balances that are tracked at different periods, for example total debits cycle to date, month to date, year to date, etc.

In order to systematize and automate these relationships, a rule exists for each such source field. The rule is attached to a field (the source field, e.g. late charge) and is fired when the value of the field to which it is attached changes. In the expression part of the rule, there is an assignment statement for each balance to which the source field contributes, e.g. MTD late charge. In most cases, a rule exists for each kind of transaction that occurs and, in the expression part of the rule, statements are in place that add the amount or count of the transaction to the relevant balances. However, only the "first level" balances are affected by this rule.

Each level of recursion (i.e., balance of balances) preferably has its own rule. The rule is always attached to the field that is added to balances so that it can be fired (executed)

when a change occurs. The expressions in the rule may look like the following:

LateChargeMTD+=LateCharge; LateChargeYTD+ =LateCharge; Etc.

7. "Distributing" the Transactions on a Line

Near the beginning of each line, there is often a transaction (defined elsewhere), much as it is received from the outside. There is a transaction type code, which is a member of a list that includes purchase, reversal, interest credit, interest debit, etc. The transaction also has an amount. For each type of transaction, a field is created on the line. The field contains the amount for a single transaction type. For example, a field only contains a value when the transaction is a purchase, another field only contains a value when the transaction is a service charge debit adjustment, etc. A field-attached rule is keyed to each of these fields, and fires off the balance-creating and other processing associated with the transaction.

The fields are populated by a single line-attached rule. When a new transaction is added, a field is added to the line, and a clause is added to the distribution rule. The expression part of the distribution rule can be represented by:

Switch (trancode) {
Case 1: purchase_amount tran_amount; break;
Case 2: return_amount=tran_amount; break;
Etc.}

8. Functions Available to Rules

The following functions are examples of some functions that are preferably provided for the rules to perform their function.

Find transaction: This is a simple version of a Select lines function described in greater detail below. The order of the parameters includes: forward, backward, start, and end. This controls the order of the search, from the current transaction into the future, from the current transaction into the past, from the earliest dated transaction into the future, or from the latest dated transaction into the past. The start date, if provided, is used as the starting point of a forwards or backwards search. The number argument says whether to find the first transaction that meets the criteria and then stop, or to find all transactions that meet the criteria. The test parameter is a conditional expression that is executed on each transaction. When the expression returns true, the transaction has been found. The conditional expression is expressed in symbolic form, as text. It can be analogized to the WHERE clause in an SQL statement. The operation function is intended to operate within a projection. The transactions are searched until there are no more, or the desired transaction has been found. The function's return value shows whether the search succeeded. The return value also is a handle for the found transaction and may be stored in a local variable. The handle may be used in expressions as a modifier of DE references in order to get or set values from/to the transaction. Cursor operations enable navigation within the set.

Generate transaction: This function has arguments of Effective date, Transaction code, and Amount. Generated transactions can also be either original or derived. Most generated transactions, e.g. interest or service charge, are original. But a transaction may be a derived one; for example, if a payment is made to an account, portions of the payment are distributed to the credit plans under the account. The payment itself is a non-generated, original payment and all the smaller payments applied to credit plans are derived from the original. The function also has parameters of before and after. Normally, when generating a transaction, processing is at a particular line of a projection and the transaction being generated is for the same day as the transaction. When this is the case, this parameter enables control of whether the transaction being generated comes after or before the current transaction. Additional parameters include this account or other account. In most cases, the transaction is generated to the same account in which the rule operates. However, particularly in generating derived transactions, the derived transaction may go into another account. The account may be named, but frequently is identified by a cursor resulting from a Select lines function call. The operation is intended to operate within a projection, to generate a transaction, and to place the transaction into the projection. Generated transactions are also sent to the external transaction audit file, just as though they had been received from the outside. If the transaction is derived, the new transaction has a reference to the original, and the original is marked as having derived transactions. When a change is made to an original transaction, this makes it possible to ripple the change to the derived transactions.

Move/copy transaction: This function has arguments of move or copy and a destination of up, down, any, or selection criteria. The function operates by moving or copying a transaction to another account, as specified by the direction and search criteria.

Update transaction: This function has an argument to specify the Operation code for update: (1) make source txn reverse destination txn or (2) change transaction status. Other arguments include source transaction id (default: the one on this line) and destination transaction id, if relevant (default: the one on this line). In operation, this function makes the changes in the transaction attributes to make the source reverse the destination; the reversed transaction now has "reversed" status. Any transactions generated from the reversed transaction are also reversed. The function also changes transaction status, e.g. to statemented.

Select lines: This function creates a set of projection lines from one or many accounts. The argument of accounts can specify (1) this account; (2) parent account; (3) named other account; (4) all child accounts; (5) all descendant accounts; or (6) all descendant leaf accounts. Another argument, account selection, has a WHERE clause that selects the desired accounts and is in addition to the previous argument. Options for the argument of projection selection include (1) all lines; (2) last line of specified date; (3) last line same date as today; (4) all transactions generated from current one; or (5) this projection or previous projection. A null indicates that just the account is selected, not the account projection. A sorting argument provides a list of DE's in the projection with ascend/descend on which to sort the selected items. The search argument has the same arguments as in find transaction. In operation, this function creates a set of accounts, or a set of projection lines from a selected set of accounts: The accounts must already exist; this operation simply creates a set referring to them. Set creation returns a cursor (handle) and cursor operations enable stepping among members of the set.

Cursor operations: This function enables rules to navigate among the members of a selected set. Arguments include operation type which specifies first, next, previous, last, or delete set. In operation, once a set is created, the first item is current. Variable references may be made to any DE in the projection line or account to which the cursor is set. In order to distinguish between true current projection line and the cursor's line, special syntax is introduced that includes the cursor. Any variable in the account with which the projection line is associated may be similarly referenced. The cursor may also be used to identify the account for other purposes, for example, generating transactions.

Create account: This function enables a rule to create a new account and has an ID argument to identify the collection of rules to be added to the account, account type. This function operates by creating a new child account, all of whose inheritable parameters inherit from the current account. The rule then sets parameters in the account as required. This function is used to create sub-accounts corresponding to credit plans.

Defer until: This function defers the execution of the named rule subroutine until a condition has been satisfied and has as its argument a date in the future, which can be calculated using the time calculation function. Another argument is a reference to a rule subroutine, which contains the statement(s) to be executed. In operation, if a date is given, nothing happens until the first projection line that is equal to or later than the date. The relevance function in the rule subroutine is executed in the normal way under the normal parameter and priority controls. When all conditions are met, the rule's body is executed. But the rule has been "spun off" by another rule, and is only executed once. The deferred rule may be elaborate or it may contain just a single line.

Time calculations: This function performs a variety of time calculations. Arguments of this function include a LUT in standard form that lists each date and provides the status for each of business day, weekend, holiday, etc. Other arguments include a code for the operation to be performed and one or two date variables. The function performs date arithmetic using the LUT (if provided). It can return the date that is X business days before or after a given date, etc.

Get values from LUT: This function enables rules to access parameters stored in tables. The arguments for this function are the name of the LUT and the search criteria for selecting rows. The search is similar to the where clause of a SELECT statement in SQL, at least in power if not syntax. Most searches are simple selections for equality, e.g., find the row in the cycle table whose cycle number=var1, whose month=var2, and whose year=var3. In a tier LUT, an additional selection variable is passed in, for example, the amount of principle. In operation, the function looks up the row(s) selected by the search criteria, makes that row "current," and enables its variables to be referenced in other statements. In a tier LUT, the values selected by the inputs are available.

VI. Cycles/Statements

Cycles are "declared" by a rule that generates a cycle (non-monetary) transaction. The cycle that any one particular account is in is determined by the rule. Depending on how the rule is defined, any variation on cycling can be defined, from traditional fixed cycles per month to completely variable, event-based cycles. For the traditional method, a parameter in the account declares the number of the cycle the account is in and a table provides the correspondence between cycle number and date. The indices on the table include cycle number, month, and year. The value looked up is the day of that month and year to run the cycle. The table is maintained by normal dbb techniques as explained in this document and in related patent applications. The rule is applied on every line of projection, once per date basis. The rule uses the cycle number of the account and the date of the line in the projection to look-up in the cycle table the date of that cycle this month. If the dates matched, a cycle transaction is generated. This can be implemented with one simple LUT and a rule whose expression is only a couple of lines long.

For commercial accounts, completely variable cycling can be achieved in anyway. A cycle type code is associated with the account and the rule for cycle has a switch statement based on cycle type. One possible rule is that a cycle should occur if X amount of time has passed since the last cycle or if a total balance of Y has been achieved. X and Y could be hard coded in the rule or they could be made parameters for the rule, available to be changed for each account.

Once a cycle is declared, various events may take place. The most popular events are likely to be taking accrued interest, applying it to the account, and generating a statement.

A. Applying Interest

Interest is applied to an account by executing a rule. The rule looks for a cycle transaction; i.e., it would have a relevancy expression that is true only if the current line is a cycle transaction. If there is no accrued interest, the rule exits without acting further. Accrued interest is calculated on a daily basis and is stored in balances that are maintained in the projection. The rule generates the transaction that actually applies the accrued interest to the account; in addition, the rule resets the accrued interest counters.

The interest transaction generating rule has order "last" to ensure that other normal processing is already complete and has a higher (more towards the end) priority than the interest calculating rule to assure that today's interest has been accrued before the interest transaction is generated.

B. Generating Statements

The statement process is initiated by a rule that looks for a cycle transaction. It then applies other criteria, for example is there a zero balance, with this other criteria being parameters to the rule. The statement generating rule has order "last" and has a priority higher (more towards the end) than the interest transaction generating rule to assure that the interest transaction for the cycle is generated before the statement for the cycle is produced.

One option, which is quite reasonable, is to generate statements in advance and just print them when the time came. If new transactions arrived after a statement was generated and before it was printed, the statement would simply be generated again and the new one would replace the old. Another strategy is to generate a statement on posting if the statement generation date is within X days of the current date. These parameters could be set up and changed at any time.

Statements are preferably just two tables, one with a row for each statement and another for the detail lines in the statement. Much of the information is in text format.

To generate messages with a statement, a LUT is associated with an account, most likely by inheritance. The LUT includes the transaction code and the multi-lingual message. A rule generates the message from the LUT as a transaction in the projection at cycle time.

Statement generation primarily comprises taking the information in the projection and copying it to a file or to rows, from which the information can easily be formatted and printed. Formatting is accomplished through any one of a wide range of available formatting programs, ranging from simple reporting packages like Crystal Reports to high-end statement formatters like M&I's CSF product.

The generation of the statement is kicked off by a rule, but most of the work of building the statement is in a function. This function takes the information in the projection and makes it available in a buffer. This is only selective in picking the starting and ending dates, which typically are the last statement date and the current statement transaction.

Routines put the buffer information into a flat file and into rows in a table, as described above. The formatting programs easily avoid including supplied pieces of information that they do not want to print.

Not all transactions are placed into the statement. When transactions are considered for statement inclusion by this function, each has its status updated. The status of each transaction becomes "included in statement" or "considered for statement but not included." By examining this status line, it is easy for following rules to tell whether the statement has been generated and whether any particular transaction appears on the statement.

To defer generation of the statement until after the cycle end, the statement generation rule can be of the "defer until" type.

C. G/L Generation

An activity recap account typically holds all the transactions that are intended for the general ledger. They accumulate in this account until it is time to summarize them and transfer them to the G/L. This process is handled using the basic mechanism of cycling and statement generation. Cycling, as determined by rules associated with the account, kicks off the statement generation process. The transactions are projected and the statement generator copies the relevant information to a statement table, just as for normal accounts. From there, the information is transformed and brought into an external system as required.

VII. Balances and Database Consistency

The following periods are supported for balances: DTD—Day to date; CTD—Cycle to date; MTD—month to date; YTD—year to date; and LTD—lifetime to date. In order to handle very short-lived times (like authorizations), timed balances are also supported. These maintain the balance of items back a given amount of time, e.g. 2 hours. A contributor to such a balance that has an effective date/time more than 2 hours previous is backed out of the balance.

The following types of balances are supported: A—amounts (e.g. dollar sum of purchases); C—counts (e.g. number of purchases); and V—value. Value is not additive and is not a balance. It is generally used to maintain the last occurrence of something, e.g., store number of last purchase.

The following list of balances are maintained in CMS. In CMS, some of the balances are only maintained at some of the "levels" and in some cases either count or amount is maintained, but not both. While this listing has more balances than are maintained in CMS, the point is not to leave any out. All the balances are maintained at a low level and all of them are summed up the hierarchy. Some examples of balances include Principal balance A; Current balance A; Debits A, C, DTD, CTD, MTD; User-generated debits C CTD; Purchases A, C, CTD, YTD, LTD; Cash A, C, CTD, YTD, LTD; Last purchase date V; Last debit date V; Last purchase store V; Last activity date V; Earned points A, CTD, YTD, LTD for each of 5 programs; Points adjusted A, CTD; Points balance A for each of 5 programs; FS amount A, C for each of 5 programs (the amount and count of transactions qualifying for frequent shopper points); Returns A, C, CTD, YTD, LTD; Credits A, C, DTD, CTD; Last credit date V; Interest BNP balance A; Interest A, YTD; Finance charges A, MTD; Service charge BNP balance A; Service charges A MTD, CTD; Cash advance service charge A MTD, CTD; Late charge BNP A; Late charge A CTD, YTD; Misc A CTD; Current late fee date V; and Prior late fee date V. These, of course, are just illustrative balances and many other balances exist.

A primary bucket (DE) exists for each transaction type, and thus for each logic module. The bucket has a value on a line on which a transaction of the given type occurs; the value is created by a derived expression associated with the DE. A field-associated rule exists for each such DE which adds the DE as appropriate to amount balances and increments count balances. A similar primary bucket exists for frequent shopper points, except that the points are calculated by a rule based on qualifying transactions. When points are placed in the bucket, they are then accumulated and counted in balances according to field-attached rules Each account record keeps a number of primary fields and derived balances. It contains columns that contain these values "as of" a particular date which date is also stored in a column. It also typically contains future values of the primary fields. Future values of derived balances need not be stored, since they can be calculated on demand from the primary fields. Accounts may be low-level type accounts, like for an individual, or group level type accounts, like the equivalent of a corporation account or a logo. In either case, they are updated only when they themselves are affected by an event, either directly or indirectly, by a change to an account below them. External programs access the data in the account database.

A. Access Via dbb

One situation, like in authorizations, is when the system retrieving the data is a dbb system. The dbb database access layer in the system reads in the account information in question. As part of its normal operation, it notices that this row is one that may need to be brought up to date. It checks to see if the date of last update in the row matches today's date. If it is, operation proceeds as usual. If the date of last update is in the past, then it is likely that some of the counters are out of date. In that case, the dbb system calls a standard function to bring the account up to date. This is a simple operation, since the values of all future primary balances are stored somewhere in the account record, such as in coded form in a blob or other large container. The standard function replaces the current balances (which are now out of date) with the ones pre-calculated for the current date and re-generates the derived balances from them. The row is only returned to the rest of the dbb system when this operation has taken place. It amounts to "just in time" updating of the information. The dbb system then continues with the original operation as though the account had always been up to date.

If the operation for which the account information is required is a simple inquiry, the response is correct. However, the operation may do something more substantial, such as authorize a purchase or post a payment. With the account information being up to date, the dbb system processes the new operation correctly. At the end of the operation, a new real-time posting takes place. In this case, the account is again projected into the future and new future primary balances are calculated and stored with the account row.

A somewhat more complicated case is if action on the account is scheduled for the day of the unanticipated event, but the account has not yet been retrieved and the action applied. If the action is scheduled for a later time on the same day as the unanticipated event, it simply proceeds as above. However, if the action is scheduled to take place earlier than the time of the unanticipated action, this means that the system has not yet worked on the account. This situation is handled in a straightforward way. First, the scheduled action takes place, which means that a standard posting procedure is executed. After this is complete, the newly arrived action is allowed to proceed, which likely results in a second real-time posting. The postings take place in the correct order and the second one leaves the account updated with the date/time of next scheduled activity set so that it is ready for unanticipated events.

B. Access Via SQL

Another situation is when the program accessing the data is using direct SQL, and not going through a dbb system, as might be the case with a report writer. The transaction system preferably does not have the task of maintaining historical information other than by generating an audit trail. So the task is to assure that, when the external program retrieves a row from the DBMS, the information in that row is current.

All tables that have updateable information like accounts are brought up to date before the SQL statement completes and returns rows to the calling program. This can be accomplished (if it is desirable) by placing a trigger on any table which has this characteristic. The trigger is fired by the request to read one or more rows from the table. The trigger calls the standard update program described in the previous section and results in updating the rows, which can then be returned to the calling program.

Access to dbb data by external programs should be confined to read-only and in may applications should be discouraged. Instead, general data access requirements should be satisfied from the dbb data warehouse, which is updated by the dbb system from the audit trail in near-real-time.

VIII. Scalability/Background

A. Asynchronous Database Operations

While posting itself is consuming of machine resources, database updates may be even more time consuming, particularly the upwards propagation of balances. Following is a process for optimizing the performance of this operation that provides smooth performance for interactive operations, and shifts to an asynchronous back-end processor actually applying the changes to the database.

For a particular begin-commit transaction, the system keeps in a context each record that has been read and all the updates and inserts that take place. Inserts are typically to log files and are automatically generated. The system also keeps track for each field that is updated whether the update is a true replacement operation or whether it is additive. Most balance propagations are additive; this information is available from the field itself.

In normal operation, the BEGIN call is made; then various records are read and updated; and then a COMMIT takes place. The dbb system meanwhile tracks the before and after state of all records in a history log.

With the invention, no BEGIN is made. Records are still read as required, but the vast majority of parent records are already in memory. Updates take place in memory, but no calls to the database are made to implement any changes. At the time when the COMMIT normally takes place, the information about the intended operations is written to a row in a special database table for later execution. Once the information about the changes is recorded in the database in this way, the changes are securely recorded, just not in the right place. Thus a single insert row operation replaces a potentially complex set of changes to many tables, reducing the load on the machine and providing uniform, predictable performance.

In more detail, the new operation proceeds as follows: BEGIN—Construct a coded form of all the records to be read and the changes to be applied; this is essentially a form of the local context and history table. The record should have an ascending primary key. Insert big fancy row into special table. COMMIT—a matching back-end operation completes the process and is preferably run on a different machine. It could be the same machine as the one on which the DBMS itself executes; if not, it should run on a machine with a fast, close connection to it. If possible, all database operations of the back-end operate at a lower priority than the front end, so that interactive performance is not compromised.

The back end process proceeds as follows: BEGIN—Read next row from special table. Delete the row you just read (if the transaction fails, the delete will be rolled back). Uncode all the information in the big fancy row just read. Apply all the changes. This means perform all the database operations performed had their execution not been deferred. In order to enable multiple back-end processors to operate simultaneously, actually perform addition on balance updates rather than substitution. Write out all the log file records to record the changes at an application level. COMMIT—in a further optimization, the operation of upwards propagation of balances itself is deferred to be back-end using the same process. This offers tremendous performance advantages, partly because the rows at the top of the hierarchy are "hot" spots using this technique, being subject to frequent updating. Putting it to the back-end makes a much larger part of the whole process asynchronous. It also enables multiple account updates to be read from the special table and processed simultaneously. As an example, suppose five purchases to different accounts in the same hierarchy are processed at once, perhaps because some pre-processing arranges this on purpose. This means that instead of the upper members of the hierarchy being read, locked, and updated five times, they are read and updated just once. The more frequently such things are processed at once, the greater the savings in time and processing. Thus, the total throughput can actually increase while the number of DBMS operations increases more slowly as the load grows.

In more detail, the steps are: BEGIN—read as many rows as are available from the special table, delete the rows, uncode all the updates, sort them by primary key of the record being updated, and read a row to be updated. Next, increment all balance fields by the sum of the updates, replace all value-type fields by the value of the most recent update, so long as the timestamp of the most recent update is later than the timestamp of the record, update the timestamp, and re-write the row doing the same for all rows to be updated and writing log records as required. COMMIT.

B. SMP and Multiple Machine Operation

Two levels of scaling are possible with the invention: 1) using multiple processors in a single box (SMP) or 2) using multiple boxes.

SMP is the simpler of the problems and produces tremendous scaling. A key for SMP is to store all the parent account and rules information in shared memory. It is not necessary to share the information for the account being processed; or the transactions for that account. Not sharing this information means that the vast majority of the processing takes place against local data, without the overhead of locking access to shared memory. However, all parent accounts are shared, so that inheritance changes and balance propagation is immediately available to the other processors performing similar operations. Regardless of whether the information is shared, updates are sent to be recorded to the DBMS as described above, after being applied to the in-memory copies.

Since the system is operating from in-memory copies of parent account data and rules, how are changes not made by posting placed into the in-memory copies? For example, an administrator could edit the rules and add a new one, or change a parameter in a parent account or a rule. After the administrator completes his change, it is written to the DBMS. How is the in-memory information updated to reflect the change? First, notice that typically some lead time exists for this, since changes are (and should be) made effective some time after they are actually recorded.

There are several possible ways to handle this. Probably the simplest involves taking advantage of the fact that all such changes will be made by dbb programs, and these can know which tables are sensitive to changes of this nature. A more real-time way to record the changes is to place them into a change log (which is generated in any case as part of the audit trail) and to send a message to the posting engine. When the posting engine is alerted that there are changes, it reads the log file and applies the changes to the in-memory copy of the information. Alternatively, it simply polls the log file on a periodic basis looking for changes that had been recorded; when it finds some, it would apply them.

The case with multiple boxes without shared memory is more complex. By separating the DBMS updates from the posting processing, a great deal of processing power is available for posting itself, and multiple posting engines can feed changes to the DBMS engine, so long as they do not conflict.

C. Examples of Scaling

The following description provides some examples on how posting may be scaled to handle increasing loads and provide increasing availability. At a first level, which is the simple case, all of the system may run on one machine. All support tables, which are read-only except for very occasional additions, are kept in memory, all DBMS operations are performed synchronously with locking, and no caching to account records is performed by dbb.

At a second level, all aspects of the system still run on one machine, but that machine has multiple processors. At least, the DBMS takes advantage of the multiple processors and preferably dbb does as well.

At a third level, which is mostly a configuration change, the DBMS runs on a separate machine. No source code changes should be required to accomplish this, but while elapsed time for any one request is likely to get a little slower, total throughput should increase. The stored procedures run on the DBMS server.

At the next level, the DBMS runs on a cluster. To implement this fourth level, some configuration changes would be required as well as possibly some changes at the DBMS API level. Today, Microsoft supports only two-machine clustering with a slow fail-over, while Oracle supports full table partitioning and multiple machine clustering with what is said to be fast fail-over. A system at this level would have fault tolerant DBMS, which is an essential part of any fully fault tolerant system. The clustering also enables massive growth of DBMS throughput and the disk subsystem is preferably a high-end RAID SAN.

At the fifth level, changes to the "top" of the account hierarchy are grouped and applied by the server. This enhances throughput by reducing disk I/O and minimizing lock conflict for frequently updated accounts. This is implemented by marking individual accounts as "cached" or not. Not caching is the normal case, typically for lower-level accounts, which are read into memory, updated synchronously to disk. If an account is cached, it is read into memory on reference and held there. Typically, several levels of the hierarchy are marked as cached. Updates to cached rows are made in memory, and written to disk with changes to all cached rows coded into a single "work" row. An asynchronous DBMS-server-resident process periodically reads such rows, combines their effect, and updates the DBMS rows. This works because the changes are largely additive.

The sixth level involves running posting on two machines. Any transaction can go to either machine and the top of the hierarchy is cached. Each machine's cached accounts gradually get out of synch with the DBMS, which always runs somewhat behind changes made in memory to the application machines. So long as the cached accounts only contain parameters and balances, and so long as the balances are not a key part of decision-making, this implementation works well. Periodically, each machine stops accepting new work and restarts when all old work is flushed out. This process brings its cached account records completely in synch with the DBMS, since the cache is refreshed from them. It is possible to perform this operation while running continuously, but this approach gets the job done and is simple.

At another level, the whole system runs in a more robust hardware environment. The main elements are: UPS for power; RAID for disk subsystem performance and reliability; dual-ported, high-speed LAN connection, such as 100 Mb ethernet switch, fault tolerant or duplexed; and rack-mounted, server-quality machines.

At yet another level, a Web server runs each machine that runs posting and provides Web support, either for browsers or requests coming from other machines via the Web. It is possible to make the Web servers a front-end layer in front of the posting machines. Requests coming in from the Web are distributed among the machines by a load-balancing switch, such as an F5 or Alteon. The machines themselves distribute the load to the posting machines using the dbb scaling code, which assures that the load is assigned to machines adaptively, in ever-adjusted proportion to their ability to handle the load.

At a higher level, if the transactions originate from a third party, the dbb scaling code runs on the third party machine so that it can handle the case of a posting machine failing and sending the work to an alternate machine in a way that is transparent to the calling application.

At the next level, posting runs on N machines and any transaction can go to any machine. One consideration for transaction distribution is load balancing and avoiding malfunctioning machines. An issue about cached rows being out of sync with the DBMS is more severe, but is handled in the same way, with the machines being taken down in round-robin fashion, only one machine at a time being taken out of service. The frequency of when the machines are taken out of service is a controllable parameter with, ideally, the control for this process being distributed so that the loss of no one machine causes it to fail. One way to do this is for each machine to control its own recycling, based on a control record in the DBMS.

At a further level, which is at a very high end, a cached account does not contain a real control variable, e.g., available credit. In order to increase throughput further, such accounts are cached, which requires transactions below that in the hierarchy to be directed to a particular machine.

Thus, with this approach, there should be effectively no limit to the number and power of posting application machines applied to transactions. Instead, the primary limit should be the DBMS.

IX. Row-Level Operations

Row-level operations (security of all kinds, restrictions, data inheritance, parent/child) require storing some information with each row in the database, since the information needs to be persisted and since the information is potentially as large as the database itself.

What is the format of this information when in memory? One approach is to leverage the dbb component structures, make a child MT for each message in memory, make the new MT have all the CRUDE information, restrictions, etc. in the usual format, and then by exploiting existing dbb capabilities, make them available on a per-record basis. This approach can be used to implement inheritance.

How do multi-record operations take place? These are primarily inheritance down and summing up. The first thing to note is that it is OK to have very large numbers of messages in memory at one time. For example, to run 1,000,000 accounts, in CMS there would be no more than about 1,000 hierarchical control records (org and logo), more likely 100's. Making more use of inheritance results in about 10,000 template records for the 1,000,000 accounts. If each template requires 10 KB, the memory requirement is 100 MB.

How are inheritance changes propagated? Changes to high level control records (account templates) that need to be pushed down for inheritance are very rare. It is a lot for each record change daily; it is more likely that once a record was set and in operation, changes take place weekly or monthly. Therefore, when a change is made that child records inherit from, all the child records are brought into memory as a background, low-priority task, the updates are applied, and they are written out to disk. A timestamp of the latest revision subject to inheritance exists in each template record and a similar timestamp of the latest revision is applied. The background task uses this along with a completion status field in the affecting parent to control the background updating task and to ensure that it runs to completion, even in the event of a hard crash. As a final check, when a child record is brought in, it is brought up to date if it is not already. It is quite possible for a single change to affect 100,000 or more records.

How is database integrity guaranteed with mass updates? When updating a record which has side effects (like inheritance or balance propagation), there are two choices: (1) update the record and all affected records in a single transaction or (2) update the record and write a record to a work queue table in one transaction, and then process the work queue and a group of affected records in a large number of subsequent transactions. The first method requires the synchronous updating of potentially millions of records and is impractical.

Why update a child record with changes it inherits from its parent until the child record is used? in this approach, when a record is brought in, inheritance is executed to ensure that all its inherited fields have up-to-date values. So long as no other systems access the data, updates are assumed to be applied before the data in the record is used. But then there would be work to be done, perhaps quite a bit of it, on the critical path of potentially a real-time process, e.g., an authorization. If the inherited value is changed from last time, there is additional work logging the change to the audit trail. Response time is improved if all such updates are already applied. So a key to this process is to ensure (1) when a record is referenced, all relevant updates are applied to it prior to any use of its data and (2) updates of records are applied strictly in the background at low priority, therefore only taking disk bandwidth and processor power when there is nothing more important to do.

How are changes propagated? This is a potentially horrible problem, because changes to an account may cause a dozen other records to be updated. First, since all the accounts in question are in memory, making the memory-based changes is no problem. There is not even a problem of memory locking since the changes are additive, the order in which they are made is not important. So the only real concern is assuring that the changes are recorded on disk.

One approach is to recognize that such balance updates take place as a result of posting, which is not tied to user interaction and takes place asynchronously in the background. Therefore, requiring the balance adjustments all to be applied as part of the posting transaction is not unreasonable. However, with many posting operations having to be balanced up to the same relatively small number of control records, there is a potentially difficult "hot spot" problem, which could severely degrade performance.

One solution is based on the recognition that the operations that are propagated up are nearly all additive-operations, sums and counts. This means that the exact order in which they are applied does not matter. As before, coded versions of the changes are made to a work queue and are processed in the background.

Where is control information stored? One obvious choice is to encode it in each column along with the data. This is not preferable, because having the data readable to normal DBMS access programs is a great benefit. Other main choices are 1) to encode the information in special columns in the same row of the same table; 2) to encode the information in the same columns but in a separate row of the same table; and 3) to encode the information in a separate table which has one row for each row in the original table. The second choice is tempting, but is not preferable because it places great constraints on the data type of the columns to be used for the encoded information. The first choice is acceptable since it cuts the number of open tables and keeps the number of total reads the same, at the cost of longer records. The third choice is also acceptable; it would give the greatest freedom for encoding the information and avoid pressing up against any column count limits, at the cost of doubling the number of rows read and open tables.

X. Rule Implementation

A. Reversals

When a transaction is first posted, an "on transaction insertion" rule is executed. This rule has a section in it for reversals. First, the rule executes a "find transaction" function. The arguments of the function ask for a single transaction to be found, searching backwards from the effective date of the reversal. If the search fails, the reversal transaction is rejected.

If the transaction to be reversed is found, the "reverse transaction" function is called. This updates the status of the original transaction to "reversed," makes the effective date the same as the reversed transaction, and places the id of the transactions into each of the other's reference transaction field. The reversing transaction is then inserted into the projection.

When the account is projected, the rules engine does not execute any rules for the reversed transaction. The rules executed for the reversal determine whether any other actions should be taken for the fact of the reversal, e.g. fees. The forward projection completely re-calculates all balances and anything else that results from the new state of the account. The general adjustment mechanism notices whenever a transaction is missing, added, or altered in the re-projection and generates an adjusting transaction as required.

It is possible for a cycle boundary to come between a transaction and its reversal. If it does, the customer will have seen the original transaction and all its consequences. If a purchase was reversed, interest may have been charged to the account that now must be taken away. If a payment was reversed, interest must be charged. It may even be possible that, had the reversal arrived prior to the cycle, a statement that was generated would not have been, or a statement that was not generated would have been. By the projection method, the system knows what had been done before and what has to be done now. If the event and its reversal do not span a cycle, there is no need to generate offsetting transactions, since nothing would have been communicated to the customer. This is all controlled by an "on adjustment" rule. The rule is told why it is being called: the transaction's amount is changed, a new transaction is being inserted, an old one deleted, a transaction that was effective is now being reversed, etc. The rule has access to the old projection and the new one being built. The rule decides what to do: whether to simply let the change take place, to generate an adjusting transaction, etc. In making this decision, the rule is guided by the "adjustment type" variable associated with the transaction.

In a typical application of the "on adjustment" rule, generated transactions that have not yet appeared on a statement are simply deleted. Generated transactions that had appeared on a statement would have new transactions generated to offset them. External transactions (e.g. purchase, payment) never simply disappear because of a reversal; the reversal itself is the new transaction that adjusted for the original one. However, any generated, derived transactions from an external one (e.g., distributing the payment to sub-accounts) might be discarded regardless of whether a statement had taken place.

B. Interest Calculation

In the calculation engine, should interest be calculated every day, or should a span of days when there is no transaction be spanned and the interest calculated for the period? Making a rule that calculates interest for a given number of days rather than for a single day is certainly not difficult with the invention. If a parameter changes during the period of days, there will be a transaction that records the change, so the system performs one calculation from the start of the period to the change date and then from the change date to the end of the period. Tables, however, can have change dates in them as well and these are not repeated as transactions in the accounts. Either the problem of allowing for such table-based parameter value changes are addressed directly by finding them and inserting nominal transactions on the dates at which they take place or the problem is avoided by calculating interest every single day.

Interest calculation is preferably performed by a single rule, preferably with subroutines. The rule is of the "last rule of last line of date" type, which means if there are several projection lines on the same date, this rule is invoked after all other rules and only on the final line for any given date. Interest calculation only updates balances. Other rules decide when to turn the interest that has accumulated in balances (accrued interest) into an actual interest transaction.

The routines that actually perform the interest arithmetic are preferably hard-coded in C++ functions. The interest routines do not perform any decision making; they just accept parameters, perform their calculations, and return the results. A key thing is the parameters they are given. Selecting the right parameters from the tables and control parameters associated with the account is the job of the interest rule.

The interest rule is only invoked on the last projection line for any given date. Priority and order fields are set so that interest calculation is performed after the normal processing for the transaction on that line. For example, if the transaction is a purchase, the purchase increases the balance and thus affects the amount of interest. Naturally, controls also make it possible to calculate the interest before the transactions of the day, if desired.

XI. Multiple Accounts

Some important operations involve multiple accounts, typically accounts "up" or "down" from the current one. For example, a payment may arrive for an account. The account may have multiple sub-accounts (credit plans) that contribute balances to the main account's balance. The payment therefore has to be distributed to the various sub-accounts. Particularly if the payment is not an exact payoff of the account balance, the order of applying the portions of the payment to the sub-accounts makes a real difference to the ongoing interest and fees.

There are an endless variety of conditions and rules for handling such situations. The control parameters for the rules are handled in the usual, with parameters in tables and/or in the rules themselves. Frequently, the basis of any decision that is made is in data that is in the accounts themselves, primarily of control parameters of the accounts (e.g. priority of credit plan) and balances of the accounts (e.g. current service charge balance). Therefore, there is a function that rules call that enables such account information (both account and balance, on the projection line) to be selected and ordered. The rule then accesses this information in any required way to make its decision. An example of how these situations may be handled is given in a section below on Payment processing (see Logo record—ARML) in one of the examples.

XII. Authorization/Messaging

Card environments have several quite different methods of operating for authorizing purchase transactions or withdrawals. These include single-message on-line, single-message off-line, dual-message on-line, and dual-message off-line. First, with regard to single-message on-line, on-line debit cards typically work this way. A single message requests the debit on-line. If the debit is accepted, it is immediately applied to the account. For single-message off-line, a single message requests the transaction on-line. If the debit is accepted, the acceptor updates the amounts available for debit/credit and saves the request. The debit is posted to the account later in the day, from the original transaction. Single-message credit card systems also operate this way. For dual-message on-line, one message requests the transaction. If authorized, the amount available is updated. Later, a corresponding clearing message in a different format is sent in batch mode. The amount cleared may be different than the amount authorized. Account information is updated from the clearing transaction and the amount available is also updated. For dual-message off-line, the transaction is not authorized, typically because the amount is below a set limit. However, the clearing transaction is sent to apply the transaction to the account.

The posting system described here operates effectively in any of the above modes. The system is real-time in that transactions are processed as they are received. If clearing transactions or off-line single message transactions are received in a large batch file, they are simply fed to the system and processed as though they had arrived individually in real-time.

Authorization processing could be completely independent of the posting engine. Whenever a transaction is posted, it updates the open-to-buy or available credit, as appropriate. This information is sent to the authorization front-end daily, or it could be available for reading in real-time. Regardless of any changes made by authorization to the OTB, posting re-calculates its proper value (not just add to or subtract from what was there), thus correcting for differences between amount authorized and amount cleared.

On the other hand, authorization processing could also be implemented as a part of posting. This would enable the power of the posting system with its hierarchies and rules to be applied to the authorization function. The authorization request message is accepted through normal network routes and brought into a workstep, using dbb facilities. Authorization messages are split off from all other types of messages and sent to a workstep of their own for processing. Dbb facilities assign higher priority to authorization requests than to other message types, to assure that all available resources are applied to processing outstanding authorizations. Other message types continue to be processed at lower priority.

Each incoming request for authorization is then immediately "posted," which means given to the posting engine for normal processing. The authorization request could be in any of the format listed above; different rule sets would assure that each type is processed appropriately. As an example, for dual-message on-line, each account has a sub-account (child account) solely to maintain authorizations on that account. The rule invoked by transaction insertion creates the sub-account if it did not already exist and directs the authorization to it. During projection, most of the rules in the system are not invoked, nothing having to do with interest, etc. Most of the balances normally in a projection are not maintained. However, balances pertaining to authorizations are maintained: total number of requests today, number outstanding, number approved, number rejected, total amount approved, etc.

The rule that actually made the authorization decision is invoked by one conditioned on new transactions (already processed ones are marked with status "posted"). The rule has available to it the current balances in the authorization projection, the authorization sub-account information, and the main account information. It can also access lookup tables like any other rule.

An authorization rule can implement any algorithm including, for example, maintaining multiple-currencies and making the decision based on the currency of the authorization request. If there are a group of accounts (e.g. a family or corporation), the response can be based on any combination of balances in the current account and other accounts. Different authorization rules are created for different families of accounts. Time limits are implemented, so that outstanding authorizations that have expired release the credit they had reserved; this is implemented in the balances of the account similar to accrued interest.

An authorization can arrive with a "force post" flag set. This situation arises in a store when the communications lines are down and sales continue to be made. When the communications lines are again available, the pending authorizations are all sent but with "force post" set, because they are not really requesting authorization but are announcing a sale that has actually been made. The rule first looks at this flag and, if set, approves the request regardless of any other rules that may be violated. The condition on invoking the other rules is set to "if not force post" to assure that they're not even invoked.

At the end, of course, the authorization rule decides to approve or deny the request. It stores this decision in the transaction and the information is then subject to balances, counts, etc. Just as important, an authorization response is generated into the projection like any other generated transaction.

A rule is associated with the authorization response and only fires when the response is new. The rule calls a function that sends the transaction to a queue to be formatted as required and put out onto the network. After processing, the transaction line status is changed to posted.

Similar processing applies to "pre-authorizations" e.g., at a gas station or hotel; authorization for a large amount is requested followed by an actual authorization for the realm amount. The pre-auth is posted and a response generated as above. Pre-auth amounts contribute to a time-based balance and expire after a given period of time. A rule that processes a full authorization when there are pre-auths searches for and links corresponding transactions.

When clearing transactions are received, they are posted at lower priority than authorizations. Authorizations continue to be received, processed, and responded to at the same time the clearing transactions are posted.

In a dual message environment, a first step in posting clearing transactions is to find the corresponding authorization, if any. At minimum, matching authorizations are discarded (just from the projection; all received transactions are permanently logged to disk). The rules initiate any desired action for mismatched transactions (a clearing with no authorization; clearing and authorization with different amounts, etc.). The clearing transaction is posted as described in the rest of this document.

XIII. Acquiring

Certain special issues are raised when attempting to apply this model to bank card acquiring. An acquirer has to perform actions that are fairly different than an issuer. For instance, acquirers tend to have relatively small numbers of accounts (merchants), but each account has dramatically higher transaction volume. Instead of sending statements and waiting for payment, the acquirer transfers money into the merchant's account relatively frequently. Instead of charging interest, the acquirer applies fees and discounts to the transaction amounts according to various rules, and that becomes the amount of the payment that is made to the merchant. Also, many different card types can be acquired for an account.

Following are some key technical points for building an acquiring system. Sub-accounts are built for each card type that has a different financial deal. When transactions came in on the main account, they are directed by a rule to the appropriate sub-account. When transactions are received in batch mode, which is normally the case in the US, they are applied to the account as a group. This means the projection is only done once, for the entire group. All transactions that are received are logged and archived outside the calculation engine. A purpose of maintaining transactions with the account is to ease the process of calculation. Therefore, a rule is fired at the end of day that replaces all individual transactions of a given type with a single group transaction. The new transaction has all relevant measures from the transactions it replaces to enable pricing.

XIV. Transaction Storage and Flow

When a transaction enters the system, it is immediately sent to a log for permanent storage, and perhaps given an internal ID as part of that process. There is only one copy in the DBMS of the actual transaction.

In addition to the "base" copy, there are other forms of the transaction. For instance, one form is a permanent "transaction in account" table. Depending on design and performance needs, this may be multiple physical tables, but it is treated as a single logical table. This may also include any number or even all of the actual transaction data fields, but this is for computational convenience only. There is a single record in this table for each instance of a transaction in an account. If a transaction is in four accounts, there are four records in this table, each with the universal internal ID of the transaction and the universal ID of the account. This record has a status field which enables the fact that the transaction is in an account to have been reversed, for example.

Another form is a transitory "account transaction blob." This is logically part of the account record. It is a subset of the fields and a subset of the transactions in the account in compressed format, stored with the account. A purpose of the "account transaction blob" is to speed the process of posting. Since new transactions are added to accounts by "posting" them, the posting process can decide when to add to and delete from the blob.

If a transaction is received in a batch, the transaction is posted to an "account" representing the batch. This creates the first "transaction in account" record for that transaction. In addition to calculating batch balances, the posting rules in the batch account copy and post the transaction to its proper real account. If the transaction successfully posts to an account, the transaction is added to the account, and preferably also to an activity recap account for that day. If the base account has secondary reporting-style parents, it is preferably also added to them. Thus, there is one copy of the transaction itself and perhaps a handful of "transaction in account" records, one for each account into which the transaction is entered.

XV. Preferred Posting Algorithm

A description will now be given of a preferred embodiment of the invention, namely a posting algorithm. For the purposes of this description, some commonly used terms will be defined. The terms are not limited to these conditions; instead the definitions are exemplary.

What is a transaction? A transaction is an event that takes place. A transaction may be received or generated. Monetary transactions include purchases, payments, fees and interest. Status transactions include entering delinquency, interest rate change, authorization request rejected.

What is an account? An account is a collection of data. Accounts are organized into a recursive inheritance hierarchy. The data in an account may be fixed (e.g. account number), a control parameter (e.g. grace period days), a measure (e.g. available credit), or a balance (e.g. interest billed not paid). Accounts also have processing rules that determine how they respond to transactions. Accounts are associated with collections of transactions.

What is an account projection? An account projection takes all available transactions and calculates the daily financial status of the account from the first transaction to some point in the future. It also generates and inserts new transactions (e.g. grace period ended, interest billed) as required by the account parameters and rules.

Figure 3A:
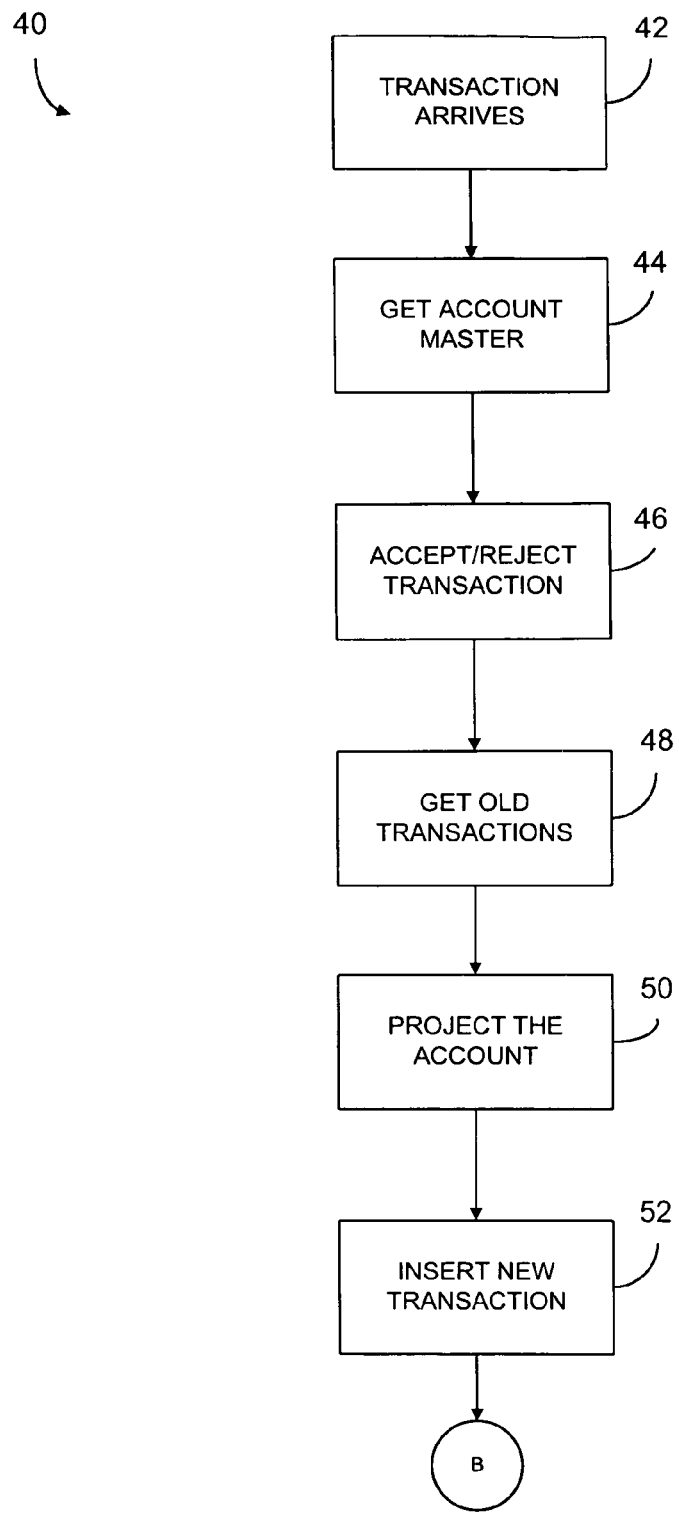
FIGS. 3(A) and 3(B) are flow charts of a method for posting an account.

An example of a preferred method 40 for posting will now be described with reference to FIGS. 3(A) and 3(B). At 42, a new transaction arrives. A new transaction may arrive real-time (e.g. authorization request), in batch (e.g. payment), or via user interaction (e.g. credit limit change). Depending on the nature of the transaction, there may be some initial processing. For an authorization request, the decision to accept or reject is made here; the results of this decision are passed on to posting. At 44, the account master is obtained. Nearly everything done with a transaction requires getting the account master; all the processing rules are associated with it. The account master may already be in memory due to prior processing (e.g. authorization). At 46, the transaction is accepted or rejected. Rules are applied to accept or reject the transaction. There may be no account for the transaction, the account status may call for rejecting all new transactions, etc. At 48, all the old transactions are obtained. The account master contains compressed versions of transactions back to an algorithmically determined point in time. These are fetched into memory.

At 50, the account is projected. This is a key operation and can be analogized as a spreadsheet with time advancing down the rows. The initial contents of the spreadsheet are the transactions. The first columns contain the transaction information and the later columns contain various balances. The rules and financial calculators operate with results in financial data being placed into columns and new transactions being generated and inserted into rows. The projection goes some number of days into the future. The inserted transactions include changes of status and condition. At 52, the new transaction is inserted. A copy is made of the projection (at least logically) and the new transaction is inserted into the "spreadsheet." It is inserted at the right row for its effective date. All transactions that were inserted for future dates are removed from the projection.

Figure 3B:
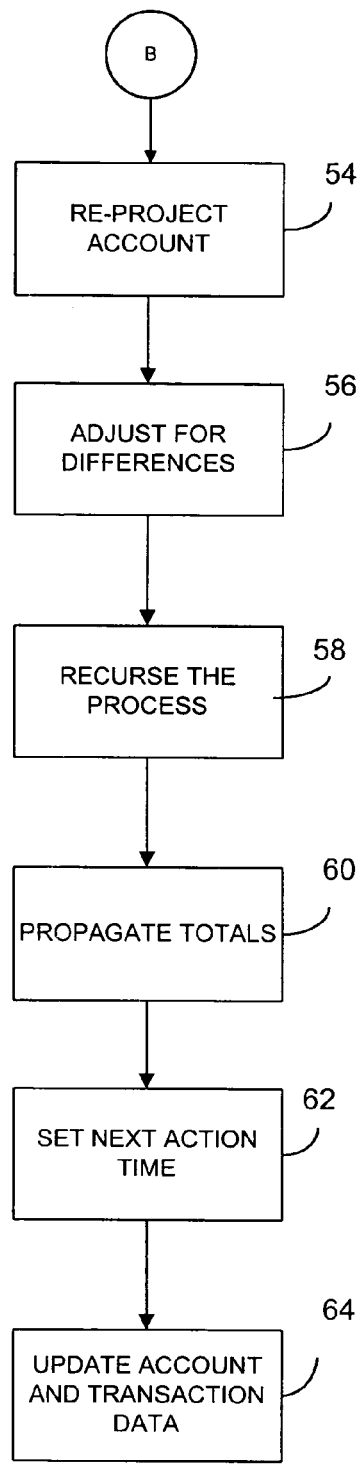

With reference to FIG. 3(B), at 54 the account is re-projected. The same projection is made only with the new transaction. Again, transactions are inserted as required by the rules. At 56, the system adjusts for differences. The two projections are compared starting from the earliest date of change. Whenever there is a difference of any kind, an automatic adjustment is made regardless of the reason for the difference. The adjustment may require inserting a new transaction, in which case the account will be projected again. At 58, the system recurses the process. Transactions may impact other accounts, parallel accounts, or subaccounts. For example, the new transaction may be a payment that is distributed among a number of payment plans, each of which is an account. In this case, the above process is applied to all affected accounts.

At 60, totals are propagated. Balances from the projection go to the account master. Changes to balances are applied to the various parents of the account master so that the future impact of things, like accrued interest due to this account, are applied to higher organizations. At 62, the next action time is set. By scanning forward in the projection, it is possible to determine the next point in time action will have to be initiated on the account, e.g. generate a statement assuming no transactions arrive in the meantime. If they do, this time is re-calculated at this stage of posting the new transaction. Next, at 64, the system updates account and transaction data. The new transactions and account information are stored in the database. Posting is then complete.

The posting method 40 performs a variety of functions. For one, the posting method 40 accepts a set of historical transactions and calculates the state of the account (principal and other balances, account status, etc.) as of a given date. The method 40 also applies all applicable rules to the transactions in the account, calculates primary and balance values, and generates transactions as appropriate. The posting method 40 calculates future balances, including enforcing cyclic balances (e.g. month to date) and calculates changes to generated transactions. The posting algorithm also maintains applicable parameters and changes to the parameters so that all calculations are performed with the parameters and rules that were applicable at the time, propagates balances to higher-level accounts, provides a generic engine that can be used for projecting payment schedules, pays-off amounts at various dates, and generally enforces all financial policies of the institution.

A. Projection Line Definition

The data structures for the projection engine can be analogized as a big spreadsheet, with columns for each data value of balance and a row for each transaction of any kind. The columns include a header, transaction, primary, derived, and control. The header column is for the date/time of the transaction and the effective date/time of the transaction. The Txn column is for information that describes the transaction and includes its unique id, the transaction code, the amount, the merchant, and the POS id. There may be additional fields for particular transactions, like hotel and airline. The primary column is for the primary "buckets" which have to be set directly from transactions. The derived column is for the derived "buckets" that can be calculated from the primary buckets and other considerations (like cycle boundaries). Most account balances fall in this category. The control column is for the control parameters that apply to the account. This includes all the rules and all the parameters of the rules.

The projection line is defined as a message type (MT), just like an account. Each projection line, by definition, contains the complete account definition for the account it is projecting. It also contains "standard" fields (DEG), which all projections include. Finally, it contains DE's specific to the type of account it projects.

Each account type also has a projection MT defined for it. The projection MT includes the account DEG and therefore has all the fields the account does. The account MT has an attribute that refers to the projection MT. This enables dbb systems to build the projection for any given account at run time. The standard fields in the account include a reference to the rules for that account. This enables the posting engine to add to the projection all the parameters of the rules that apply to any particular account.

B. Information Flow

Generally speaking, information flows from the detail in the transaction itself to primary buckets on the same "line" of the spreadsheet, to derived buckets on the same line, to derived buckets on following lines, sometimes then to information in newly generated transactions on a new line. Next, information flows to buckets in the lowest-level account associated with the transactions and then to higher level buckets and balances in higher level accounts associated the low level account. Because of this information flow, it is possible for the "deep" customizer (not required very often) to add to the transaction types and add and change the various buckets and calculation schemes.

The method 40 of posting shown in FIGS. 3(A) and 3(B) will now be described in greater detail.

C. Initiation of Posting

The calculation engine described here can be initiated at 42 in a number of ways. One of the more prominent ones is when a new transaction arrives, typically a purchase or payment. However, posting is also started at 42 when a "next action" date arrives and no external action has taken place in the meantime. Such a "next action" date may be generating a statement, for example. Posting may also be called to generate payment schedules, to calculate the amount required to pay off an account as of a given date, or other purposes.

The description below assumes a new transaction has arrived. However, the processing is nearly the same if no transaction has arrived; there are just some steps that may be skipped. Each account maintains a "next action" date field which is an indexed field. A background process that runs each day reads each account whose "next action" date field is the same as today and puts the account into posting. The result of this activity is determined by the rules in posting. In any case, a new "next action" date is set on the account.

D. A New Transaction Arrives

A new transaction arrives in any number of ways, batch, real-time or interactive. There may be any amount of processing applied to it. If it is a request for purchase, the decision is made whether to authorize the request outside the posting engine. The transaction is put into standard form.

Posting can handle one or many new transactions in a single processing pass. For single message purchase-authorizations, the vast majority of postings involve single transactions. However, for batch merchant clearing, transactions arrive in large numbers, already sorted by merchant. There is a large advantage in such situations to be able to post all the new transactions together, avoiding the considerable overhead of processing them singly.

E. Get the Account Master

Except for the most trivial of transaction processing operations, the account master is required at 44. Even in the case of authorizations, the system determines whether the account is "on us" or not.

F. Accept or Reject the Transaction

At 46, a decision to process the transaction is made. A prime example is authorizations. The result of whatever processing is relevant to the transaction is passed on to posting proper.

G. Get all the Old Transactions

The start of posting proper begins at 48. At this point, the transaction will likely be posted and, at this stage, the old transactions were not needed to make this decision. Now, however, all the old transactions that have been posted to this account are retrieved from a special storage place where all the transactions are kept in compact format. It is preferably redundant to the main DBMS storage place for posted transactions. Everything that cannot easily be re-calculated is preferably stored.

The information that is stored in this way includes balances, account parameter changes, ancestor account parameter changes, external transactions, a rule parameter, and other changes. The balances information is a copy of all the balances in the account record at one or more points in the past. There may be one copy in the fairly recent past (say, a week ago), before which date transactions are unlikely to be added or otherwise affected (say, by reversal). There may be another copy in the more distant past (say, a month or two ago), before which date changes of any kind are not permitted. The balance record is selected to be prior to the earliest affected transaction in the ones about to be processed. The balances selected are transferred automatically into the first line of the projection to be built.

The account parameter changes information is a record of changes (date/time, parameter id, before value, after value) to the parameters directly in the account record. They are placed as lines directly into the projection. The changes have to go back to the time of the earliest balance record. However, only changes from the time of the balance record actually used are copied into the projection.

The ancestor account parameter changes information is the same as account parameter changes, only ones made to the parent or other ancestor that affect this account by inheritance. Rather than copying all these change transactions into potentially millions of accounts, they are stored at the level at which they were made. The actual inheritance of the current parameter value is accomplished as part of account processing. The change transaction is copied into the projection at this time, but is not stored with the account.

As a result of this, inherited parameter changes are applied during projection just like ones made directly.

The external transactions information is a copy made for speed of execution of externally generated transactions. All these transactions are in the log file. Only transactions later than the time of the balance record actually used are copied into the projection. The generated transactions information receives the same treatment as external transactions.

The rule parameter and other changes are changes made to rules: either their definition, application, or their parameter values. In any case, there are change transactions for each such change stored with the rules, just as change transactions for inherited values are stored with ancestors. The change transactions are pulled in from the rules at the time of projection, just as changes are pulled in from ancestors.

H. Calculate (Project) the State of the Account

A primary purpose of projecting the account at 50 is to build a full account history and status prior to the new transaction's arrival. It is assumed that the amount of data calculated exceeds by several factors the amount of data stored. Projecting the account can be skipped if it proves in fact possible to re-create the history and state of the account completely by reading it in.

In any case, full calculated data is preferably stored and recalled for the first transaction, which is a no-operation transaction whose effective date is the first in the account. While the account on disk has current status information, this first transaction has the same information as of the start of the account. This makes it possible to apply status change transactions during account projection. As time goes on, old transactions that can no longer be affected by back-dated transactions are discarded from the account (but not from the audit trail). When this is done, a new "first" transaction is generated and stored as the seed for projections. This first transaction has values for all balances; it resembles all the balance information from the account itself at an earlier point in time.

A time/space tradeoff here is to store one set of balances as far back in time as a new back-dated transaction is ever be accepted or an existing transaction reversed, and another set of balances a small number of days back, far enough back to be earlier in time than the vast majority of back-dated or reversed transactions. During projection, it is only necessary to start from a point earlier than any affected transaction. Going farther back in time takes memory and computation, but adds no value.

The balances in the account are the same as the balances in the projection. The average case is expected to be that any new transaction is after the last update of the account. Therefore, the account balances are completely up to date, and neither of the stored historic balances have to be used. The projection starts from the last update date of the account using the balances in the account as of that date, inserts the new transaction, and projects forward. Therefore, in the average case, projection involves just a couple of lines and very little computing.

Figure 4A:
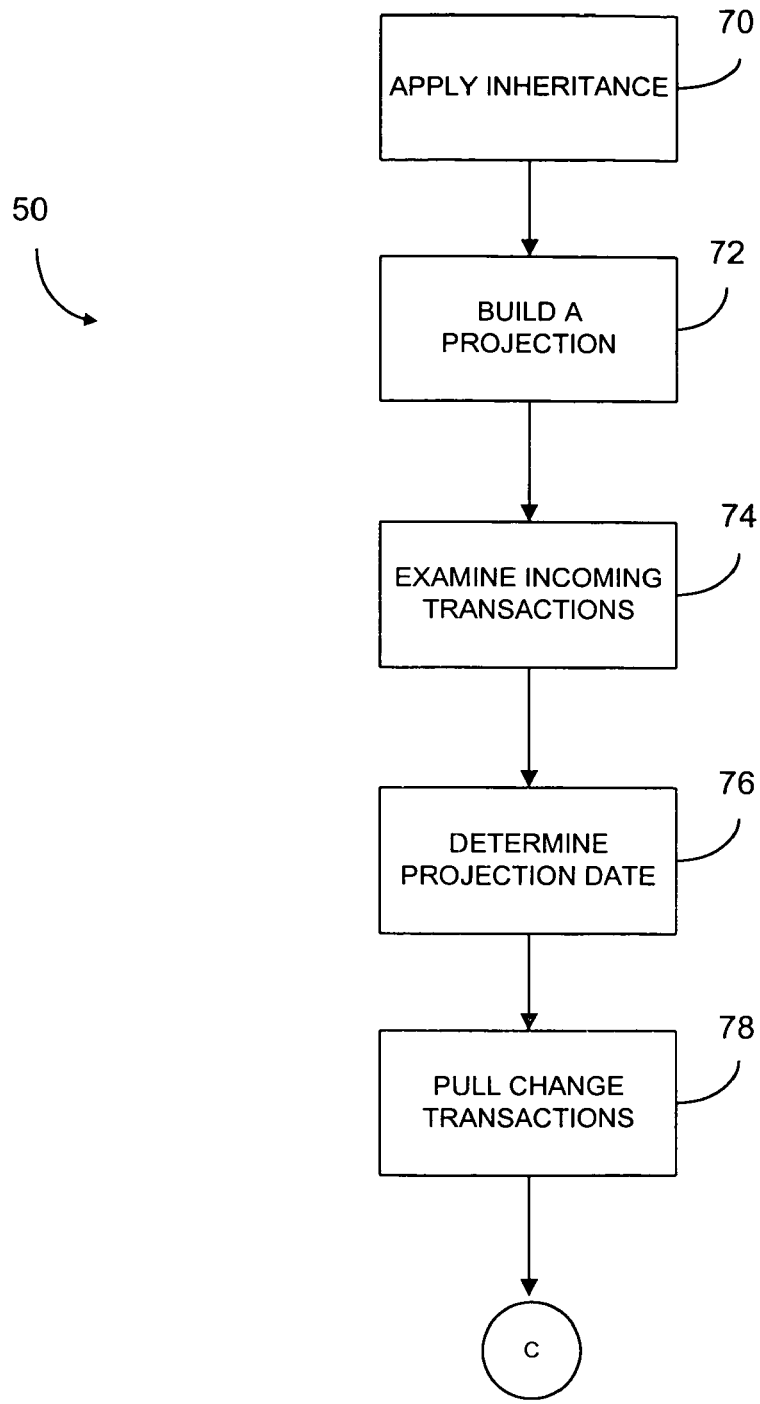
FIGS. 4(A) and 4(B) are flow charts of a method of projecting an account in the method of FIGS. 3(A) and 3(B).

A method 50 of setting up the projection will now be described in more detail with reference to FIGS. 4(A) and 4(B). First, at 72, inheritance is applied to the account, to assure that all its parameter values reflect changes inherited from ancestors. Next, at 72, a projection line is built for "now" using the parameter values and balances from the account record for this purpose. Also, all applicable rule parameter values are pulled into the line; these should already be up to date. The incoming transactions are then examined at 74 to determine which balance record to start from. If it is hard to tell this (e.g., there's a reversal but its date is not known without executing rules), the earliest balance is used as the starting date. Next, at 76, the date to which projection will be done is determined; this is a parameter to the routine and is the ending date. At 78, all change transactions that are between the starting and ending dates from rules, parents, and the account itself are pulled into the projection.

Figure 4B:
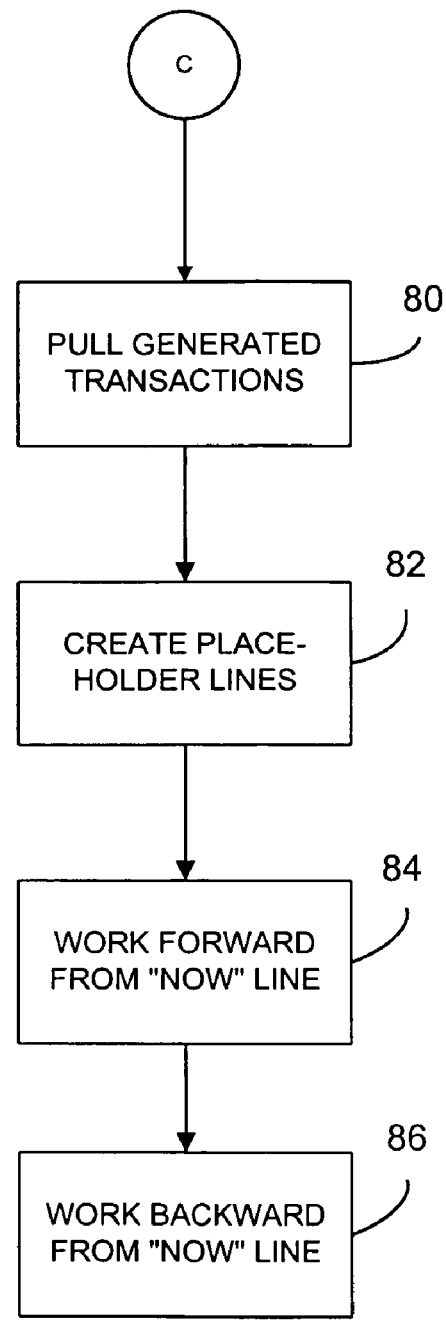

With reference to FIG. 4(B), at 80, all the external and stored generated transactions are pulled into the projection. Place-holder projection lines are created at 82 as required, probably one per date, to account for table-based parameter changes. Then, at 84, projecting proceeds by working forward from the "now" line to the end, changing projection line parameter values to reflect change transactions. At 86, projecting proceeds by working backward from the "now" line to the beginning, changing projection line parameter values to reflect change transactions (change the value in the line to the "before" value).

At this point, a complete projection has been made, with all parameter changes accounted for and balances correct for the starting point and "now," before applying the effects of any of the new transactions. A completely calculated starting balance projection line is derived which is used as a point to start projecting. However, none of the intermediate balances are calculated yet.

The parameters of this method 50 of projecting the account include the effective date up to which to bring the account, whether a new calculation is to be performed or whether new transactions are to be applied to an existing calculation, and whether the calculation is to be extended into the future, and if so, how far as determined by the system. The projection calculation engine, if required, takes a set of "raw" transactions (the transactions as they are stored) and converts them to a set of messages in internal format. The format of messages in the projection includes all the information in the stored transactions and also included many additional fields for maintaining balances, status values, etc. The projection engine also generates new transactions as required for projection purposes. For example, the projection engine generates a no-operation transaction for any day for which there is no external transaction so that balances can be maintained. Also, the projection engine generates no-operation transactions for all days in the future that are to be calculated. The projection engine further executes the rules and transfers balances from the projection to the account.

I. Insert the New Transaction

As stated above, the new transaction may be one or many transactions. All new transactions are inserted at 52 according to their effective date. The earliest effective date is stored and used as the starting point of the re-projection.

J. Re-Calculate the State of the Account

The first projection at 50 is only used as required to build internal data so that changes can be detected. When re-calculating at 54, each transaction and all its values are either confirmed or not. The changes could be a transaction that was present is gone. This may be a fee, the conditions for generating which have disappeared with the new transactions. The system marks the transaction for adjustment, probably reversing it. The changes could also be due to a new transaction. The newly inserted transactions, of course, are new. This would also be the normal case of a generated transaction. An existing transaction that has changes in primary values can be another change. Changes conditions due to the new transactions have caused a change and, as a result, both the old and new values are saved and the transaction marked for adjustment, probably an adjustment for the amount of change. A further change results from an existing transaction that has changes in balances. Changes to balances result from the projection of the new transaction and/or its consequences. In this case, the system marks the changes and saves old and new values. The process of re-projecting the account results in status values being attached to each line, and sometimes each column, indicating the changes.

When re-projecting at 54, the starting point does not necessarily have to be the beginning of the account. The starting point should be immediately before the earliest affected transaction. A backdated transaction goes back in time. A reversal may be dated today, but the date for these purposes is the date of the reversed transaction.

K. Adjust for Differences

The adjustment for differences at 56 is a main part of the posting algorithm that handles changes, side effects, and enables rules to be written in isolation from each other, without concern for side effects. However, in order to give users control over the adjustment process, a "system" rule is defined. In addition, "on adjustment" rules enable detailed control over the process.

As an example, a rule applies a discount of 25% when one or more purchases is made within a designated period of time and the sum of the purchases exceeds $100. A person makes a purchase of $120, qualifying for the discount. The rule fires and generates a credit transaction of $30. The rule preferably has a text field that is included in the transaction and on the statement to explain the credit. After the credit has been granted, the person returns one of the items in the purchase worth $30. The return is then referenced back to the original purchase. When the transactions are re-calculated, the rule generating the discount does not fire, because now only $90 of goods were purchased, failing to satisfy the condition of the rule. The credit is not generated. The original calculation "spreadsheet" has the $30 credit the re-calculated one does not. The system assumes that the new calculation is the correct one and that some condition changed to make the original $30 credit no longer applicable. It is important to realize that the algorithm does not need to know what generated the original credit or why it is no longer applicable; it doesn't matter. What matters is that the new calculation is the correct one. Therefore, a debit transaction equal to $30 is generated and is dated the same effective date as the credit in order to cancel it out. The rule controls the exact circumstances of this. For example, if the credit never appeared on a statement, the rule simply deletes the credit rather than generating an explicit debit.

The same principle of adjustment applies to the calculation of interest or anything else. Alternatively, in this particular example, the rule "fires" when the system cycles (generates a statement), so that only one credit is generated for all transactions in the month and a single credit on the statement sums up the month's discount. This can be accomplished just by making the cycle transaction be a condition of firing the discount rule. However, the adjustment principle still applies. Suppose the situation is the same, and the goods are returned after the statement went out. After re-calculating, the rule doesn't fire and again a debit is generated that wipes out the now-erroneous credit. Only, in this case, the debit appears on the next statement for the same net effect. The debit transaction includes a reference to the credit it was offsetting. Multi-lingual text from the rule corresponding to the adjustment explains the purpose of the debit.

When explicit adjustment transactions are generated; they are internally linked to the base transaction they are adjusting. During projection, the adjustment and the base transaction are merged for calculation purposes so that the adjusting transaction is not repeatedly generated.

L. Propagate Totals

Rules cause behaviors to take place, but the relationship between balances is built in to the system. Each DE can be a contributor to another DE, and the same DE may receive values that are contributed from yet other DE's. Primary DE's have values that are set by rules. Once those values have been set, they are propagated to other balances by a general mechanism built into the posting engine. The propagation takes place primarily within balances that are on the same line of a projection. However, after being moved to an account, those same changes propagate up to higher parent account levels.

M. Propagate Totals into the Future

Whenever an account is calculated, it is projected at 60 into the future a number of days. A typical number of days may be 20 to 30. The number should be chosen so that the account is projected to the date at which the account will next have to be processed (the next action time). There is no need to project each account the same number of days into the future. If an institution decides to make use of the future projection information, it may be necessary to have a minimum projection; however, the use made by posting is to avoid having to process an account in order to calculate group-level totals. The next section provides an alternative method for achieving this result.

When projecting into the future at 60, each bucket is calculated for each day. Therefore, each bucket becomes a vector that has as many elements as the number of days being projected. Group accounts store the vector for each bucket they maintain. Each such account stores with itself the last date/time it has been updated. One of its key operations is to change to the next day. The system tracks internally the official day. Whenever a group account is brought into memory, a check is made to see whether its bucket vector day of last maintenance is the same as the official current day. If not, each value in the vector is shifted to the appropriate earlier day. Zeros are placed in the empty buckets at the end, which is the last bucket that has a valid value. The system maintains on which day which element of the vector was first initialized, because this impacts the update routines.

When a group account is updated (has projection buckets propagated to it), the source account has two full sets of vectors: one with totals (i.e., the full value of the bucket as of this update) and one with deltas (i.e., the change in the value of the bucket since the last time the account was updated). When the account is propagated to the group account, a number of factors have to be considered. For instance, some factors include the date of the previous updating (and thus projection) of the source account, the length of the projection vector (the number of days into the future the account was projected and propagated) at the previous updating, the length of the current projection vector which may differ from the length of the prior one, and the length of the vector in the destination account. Other factors include for each element of the vector in the destination account, the date when it was initialized to zero and the minimum number of future-projected days that have been applied to parent accounts.

Prior to the propagation operation itself, the destination account date is brought up to date, so that each current vector starts at the same date.

For each element in the vector, a decision is made whether to add in the full amount or the delta amount. The full amount is added if the destination vector element was zeroed after the previous update date of the source account, i.e., the source had not previously been added to that element because it did not exist in the destination at the time. The full amount is also added for any element whose date puts it past the end of the prior update projection vector, i.e., this account had not previously been added to the element because it had not been calculated. In all other cases, the source account has already been added into the destination account element, therefore only the delta (change since last time) is added.

What if the absolute value or delta that should be applied is zero? The future-propagated values do not change. In this case, the dates are set to indicate propagation upwards, although no action occurs.

Just because there has been an action, the value of the projection does not necessarily change. In fact, given no input from the outside (e.g., newly arrived purchases or payments), the values of all variables can be projected indefinitely into the future. A primary significance of projection is to calculate in advance future values if nothing changes. However, there is a cost to store the projected values and (probably more important) there is a cost to propagate them. Therefore, projection should occur fairly far into the future and only propagate when necessary. A user-controlled system variable states the minimum number of future-projected days that may be applied to parent accounts. If, by the next action date, the number of future days already propagated falls below the minimum, propagation then occurs. Otherwise, the overhead of performing the propagation is avoided this time and the system waits until the next action time or later. If an account has monetary activity, the account is re-projected at that time. By projecting and propagating, accounts that have no activity are not touched. For a truly inactive account, statements are not generated and projections can be made far into the future so that, if it remains inactive, the account is touched rarely, say, every couple of months.

By using this projection method, group totals can be kept up to date without having to touch accounts that didn't change. If the account doesn't change, the impact it will have on the group totals each day in the future is known, therefore those can be calculated and applied now. If, due to some event, the totals change, the new values are calculated as well as the change from the old values. Whenever a future total in the group account already had the source account added in, it is "corrected" by adding the change. Whenever it had not had the source account added in, it is simply added in the account's contribution. With this approach, all individual and group accounts are kept completely up to date, while still touching them only when there is a change.

Projection beyond the current date has a substantial cost in terms of storage, account updating and computing. The main balances that are projected is accrued interest, since this changes on a daily basis, while everything else changes on a cycle basis. If the institution can do without accurate daily totals of accrued interest, then totals only have to be propagated on a monthly basis, at great savings of programming and compute effort.

N. Set Next Action Time

At 62, there is a default action determined by the system for when the next account should be processed, in the absence of outside activities. However, it is mostly like that next action is set by a rule initiated at the end of projection. This rule applies arbitrarily complex conditions to determine when next processing takes place. The rule can search for when a certain transaction occurs in the projection, e.g., the next cycle date. Naturally, the correctness of this rule is essential to the proper operation of the system; therefore, it should be set under tight security.

If the institution has no need of future projected balances, a tremendous amount of computing time and disk space can be saved. In any case, a preferred method for avoiding the whole business of future projection will now be described. When an account is set up, its next action date is set to be tomorrow, end of day. When the next action time arrives, the next action processing engine gets the account and projects it. This brings all balances forward to today, and rolls them up. The next action date is set to the end of the following day. If external activity takes place for the account, it continues to be brought in once a day, updated, and scheduled for work again the following day. At some point, a rule may fire to bring the inactive account to someone's attention, send the customer a letter, etc. If a transaction comes in and is processed, the account is brought up to date and balances propagated. The next action date is reset to the following day.

O. Update Account and Transaction Data

No matter what else happens in an account, at the end of projection at 64, the values for today are migrated from the relevant row of the projection into the account and the account is time stamped for the update. The balance parameters in the projection should exactly match corresponding parameters in the account, because the account definition is part of the projection line definition. The values of balances from the "now" line of the projection can therefore logically be moved to corresponding balances in the account. However, the balances cannot simply be moved in the fields in the account. A process of migrating the changes up the hierarchy of parents is initiated, even if none of those balances is being projected into the future. Other sections of this document cover the process of balance propagation. In brief, the changes are first applied to all the parents in memory and then serialized to an audit file, from which they are applied to the DBMS copies of the parents. This process is completely automatic and driven by the data and the definitions.

Transactions received externally are probably already stored in permanent database archive. Newly generated transactions that, at first, appear only in the projection are also archived to the same or a similar database log. Finally, the transactions (including the new ones) and some of the balance records are restored in compact format with the account itself, so that they are ready for the next projection operation.

A description will now be given on a process of re-compacting the transactions and balances. First, before projecting, at least one past balance and all the externally generated and change transactions dated later than the oldest stored balance up to the present are stored. After projecting, balance lines at least for each date on which there is a transaction and preferably each day are created. Balance lines are large so the number of lines stored is preferably kept to a minimum. For instance, only the following balance lines are stored: one in the recent past old enough so that it provides a suitable starting point for most projections, and one old enough so that it is guaranteed older than any legal new transaction. These are parameters to the code and are expressed as days back from the present. If it were ever required for special reasons to project an account from its beginning, it would always be possible to read the old transactions from the DBMS log and populate the projection from them. The dates of the balance line from where the projection started can be ignored; lots of lines can be chosen for storing. To pick the recent balance line, the earliest balance line in the projection equal or earlier to the recent date parameter is selected, or the earliest balance line, whichever is later (the earliest balance line may not be as old as the calculated recent date if the account is new). The same test is used to pick the old starting balance line, only using the appropriate other parameter. When the account is fewer days old than the number of days to the recent balance, the same balance line is selected. Next, the system compresses and stores only the two selected balance lines and all the transactions between the earlier of the two dates and the present. The other balance lines and transactions are discarded (just from the compressed copy).

XVI. Preferred Components and Attributes

All information about processing days, holidays, months, cycles, quarters, etc. is expressed in entries in tables. Everything having to do with periods and calendar is based on the table. Much of the table is initialized as a system standard table. However, customers can add new periods and calendar entities. Logically, each such entity is a separate table, but the physical implementation is to share tables.

For each day, the calendar table provides the following information: ID of the period type, absolute day number (julian day), day of the week, day of the month, day of the year, week of the month, week of the year, month of the year, and quarter of the year. Also, the calendar table provides information for each period or the day of the period and the sequential number of this period. Periods have identifiers and names given in a separate table and come in two parts. For example, there is a cycle period and some number (say, 10) subcycles. The combination of the two parts uniquely identifies the period, for example, cycle 5. The code that relates to periods (for example, periodic accounts and aging DE's) knows about these tables and uses them for its information about periods. The tables are temporal in that they have starting and ending effectiveness dates.

A. Balance Contribution and Aging

DE's are defined in the repository as balances and other DE's in the repository as contributing to those balances. The preferred repository should have as comprehensive as possible a set of such balances. It doesn't have to be the "right" set of balances, because there probably is no such thing. The balances can be contradictory and overlapping in meaning. The idea is to define as large a fraction as possible of all the balances any application may want in advance.

Typically, there is a "base" DE for a particular balance, for example late charge. Inheritance children of this base DE are then created whose only difference is that it is a balance for a particular period, for example month-to-date (MTD) or year-to-date (YTD). All the typical periods are defined in advance in the repository.

All the contributing relationships among sets of related balances are defined in advance in the repository, completely independent of their use in any one application. For example, service charges are defined as a "base" DE, with children defined for each of the various periods. The late charge base DE is defined as contributing by addition to the service charge base DE. The contributor is defined by default as a multiple contributor to the target and all its descendants. Since this attribute is defined with the base DE of the contributor, it is inherited by all the periods of late charge; therefore, they all contribute to service charge and all its descendants, as appropriate.

A DE that is not a balance can be a contributor to a DE that is a balance. For example, the non-balance transaction amount contributes to the balance of total authorization requests today.

A method of balance contribution is among balances in a single record, typically an account. This can cascade to multiple levels of contribution. Another method is when accounts have parents; balances in the child can contribute to balances in the parent. The preference is to contribute rather than copy, since one parent may have many children each with the same kind of balance to contribute. Typically, a balance is marked as contributing to a similar balance (or child of balance) in a parent. A parent account can have the same or different definition as a child. In either case, a match is made of balance DE's and the contributing worked out as required. The added twist when going from child to parent is that a balance DE in a child contributes to the same DE in the parent, always by addition. Attributes enable the control of whether balances are summed up to parents.

Balances are normally considered as being sums of amounts. However, some balances are sums of counts, for example, number of authorizations today. In addition to those two, sometimes it is desirable to know what was the last of something, or the highest or lowest of something. That is when balance by value is used. This copies a value from the original source of the balance, either unconditionally (in the case of last) or conditionally (in the case of highest or lowest).

Added to the idea of contribution is the idea of period. This simply means that, at certain defined points in time, for example monthly, the balance is reset to zero and then goes on accumulating like before. This gives balances, for example purchases today, week to date, month to date, cycle to date, quarter to date, year to date, etc. Each record in the system has a defined "as of" date, the date to which the record has been brought current. When the record is brought into memory, it is brought up to the current date. If the current date is later than the "as of" date stored in the record (account), balance processing is applied. Any balance DE that has "crossed" a period boundary between the two dates is zeroed. All the periods are defined in tables. The tables can define periods that are regular and conform to common sense (like months) or can define any arbitrary period, for example "retail" months and quarters, which all have even number of weeks in the months and weeks in the quarters.

The concept of aging is further added to the above. This simply means that, just before a period balance is brought to zero, the value is copied to an "aged" balance which holds the value for the period just past. For example, a monthly balance always holds the value of the purchases month-to-date. At the end of the month, the DE is set to zero. If an aging DE depends on the MTD purchases, the value is copied to the aging DE just before the MTD is set to zero. The aging DE then holds the purchases for the prior month. If a second DE is defined as aging and dependent on the first aging DE, then just before the first aging DE is set to zero at the end of the next month (not because it is aging, but because it is periodic), its value is copied to the second DE. The second aging DE holds the value of the next-prior month's purchases so that if today is month 0, the second aging DE holds the value of purchases for the month −2. An "aging chain" of this kind is built as long as desired. The standard repository has long such chains defined. Preferably, a very long chain is defined for "balance billed-not-paid," going back at least 6 months.

The previous DE in an aging chain can replace the next. However, at the end of a chain, there are two choices, either the values "fall out of" the last bucket into nothing or they accumulate. Balance BNP is an example. The first item in the chain is marked >30, but actually means greater than 30 and less than 60. This continues to >150 with the last frequently being >180. If the last item really means (and this would be unusual) >180 and <210, then it is defined the same as the other members of the chain. If, however, it really means >180, then values simply accumulate endlessly in the last bucket. The attribute for aged/base relationship enables the system definer to say whether the DE in the chain actually empties or whether it accumulates forever.

Finally, simple balance and aging as defined here may be insufficient to cover some situations. In these situations, the expression covering contribution is used. The expression can make balance contribution be based on anything at all.

B. DE Component Additions for Balance Contribution and Aging

"Is balance" is a checkbox that is checked if this DE is a balance. A DE is a balance if its purpose is to accumulate things from other DE's, ultimately from transactions. A "propagate to parent" is a checkbox that is checked if a balance in a given row (account) should contribute to a balance of the same type (DE) in a primary or secondary parent. This would normally be the case. If the DE does not exist in the parent, nothing is done and there is no error. A "balance type" is list and has values of (1) amount, (2) count, or (3) value. An amount balance accumulates values, often currency. A count balance accumulates a count of instances. A value has a single value and may be replaced e.g. date of most recent payment.

A "balance period" is a list of all the balance period types supported by the system, e.g., cycle to date, month to date, day to date. An "aged balance" is a checkbox that is subject to aging. All DE's involved in an aging chain have this attribute. Positive additions are applied to the first DE in a chain. Negative additions roll up from the end. An age change treatment is a list that relates to how changes are applied to an aging chain. The normal treatment is that positive additions (like purchases) applied to the start of the chain are simply added and negative additions (like payments) applied to the start of the chain are instead applied to the aging buckets from the end to the start.

A "period of aging" is a list and is a selection of one of the defined periods. This is used as the period for aging this DE. The last DE in an aging chain is normally LTD, lifetime to date. An "aging base" DE is a reference and is the balance on which the aging of this DE is based. The first (source) DE in an aging chain does not have a reference. An "aged/base relationship" is a list stating either (1) the base DE balance replaces this value when the period changes or (2) the base DE balance is added to this value when the period changes.

A "contributes to balance" is a checkbox and this DE contributes to at least one balance. This DE may be but does not need to be a balance. Any DE to which this DE contributes must be a balance. If this box is checked, there is a collection of the following attributes. A "DE" is a reference to the DE to which this DE contributes. A "contribution type" is a list related to how the source DE contributes to the destination DE. The choices' include: (1) add source to destination; (2) subtract source from destination; (3) replace destination with source; (4) if source is greater than destination, replace destination with source; and (5) if source is less than destination, replace destination with source.

A "level type" is a list relating to on what levels the target balance may be found. The choices include (1) on this level (same account) only; (2) parent account only; or (3) closest ancestor. A "multiple contribution" is a list determining how the source DE should contribute to (1) the specific target DE alone; (2) the target and all its children by inheritance; or (3) the target and all its descendants. In each of these cases, if the target or other parent is not found but a relevant child or descendent is, then that child or descendent is still made a target. A "control expression" is an expression. If there is an expression, it is evaluated for each source/target pair. If the expression is true, the contribution is made; otherwise it is not.

C. Changes to Aging Chains

When aging chains contain monetary amounts, it is important to update them in the correct way. The following table illustrates an example of the desired behavior.

| Cycle | 1 | 2 | 2 | 2 |
|---|---|---|---|---|
| Event | — | — | purch 75 | pay 155 |
| Total amount due | 250 | 250 | 325 | 170 |
| Total past due | 200 | 250 | 250 | 95 |
| Current due | 50 | 0 | 75 | 75 |
| Past due | 50 | 50 | 50 | 50 |
| P.D. 30–59 | 50 | 50 | 50 | 45 |
| P.D. 60–89 | 50 | 50 | 50 | 0 |
| P.D. 90–119 | 50 | 50 | 50 | 0 |
| P.D. 120+ | 0 | 50 | 50 | 0 |

Reading down cycle 1, purchases for 50 have been made in each of the last 5 cycles, for a total amount due of 250. The 5 past due DE's are in a chain that starts with current due. In addition, all the past dues contribute to the Total past due balance. Total past due contributes to Total amount due, as does Current due. The second column represents aging the first column. Balances ripple down the chain, starting at the end and ending with the first in the chain (Current due) getting 0. Later in the cycle, a purchase of 75 is made which is added to Current due, which then contributes the addition to Total amount due.

The tricky part is shown in the last column, when a payment is received. The payment "wants" to add into Current due, just like the purchase did. However, because the payment is a negative (would reduce the value), it is treated differently and is moved to the end of the chain. If the value in the bucket is less than the amount being applied, the bucket is made zero, the amount is reduced by the amount in the bucket, and the process proceeds to the next bucket in the chain. If the value in the bucket is greater than or equal to the amount, then it is reduced by the amount and the process stops. In this example, there is a payment of 155. It is reduced to 105 by the last bucket, to 55 by the 90–119 bucket, and to 5 by the next. The 5 is then subtracted from the 50 in the 30–59 bucket, and the process ends. The 45 and 50 past due amounts contribute to the balance of 95 in Total past due, and the difference of 155 reduces the Total amount due to 170.

D. Account Periods

An account is a periodic account or it is a perpetual account. A perpetual account has no time limits of any kind and it accepts transactions (the rules associated with the account permitting) of any date. A purpose of a periodic account is to control or summarize the processing and accumulation of transactions during a given period of time. The period of time may be any period defined in the period tables. The period always has exact starting and ending date/times. A standard flag says whether an account is periodic. If it is, a standard DE defines the period. While a periodic account may be created for a particular period, it is more typical to create a "family" of periodic accounts, identical in structure, covering a successive range of periods and created as required to hold transactions that fall into new periods. Since accounts have create dates and can have ending effectiveness dates, it is useful to think of a perpetual account as being a non-replicating periodic account with a single, very long period.

E. Periodic Account Uses

Periodic accounts are used for a wide variety of purposes, both transactional and reporting. For transactional purposes, periodic accounts are used, for example for balancing. One daily periodic account (activity recap) contains all transactions that have been posted on a day, regardless of the customer account or its hierarchy. Another daily account is a secondary parent of all the customer accounts in the normal hierarchy. The starting balance of the customer accounts, adjusted by the credits and debits sum in the activity recap, must equal the ending balance of the customer accounts. Once all the side effects of all posted transactions have been executed, the system is always in balance on a real-time basis.

An exemplary hierarchy for transactions processed is transaction-batch-files-bdays. The top of this hierarchy is a daily periodic account that holds the totals for all transactions processed in a day. The transactions are then posted into another hierarchy, which is transaction-acct/plan-logo-org. The top of this hierarchy has a daily periodic account, say pdays, as a secondary parent. Each of bdays and pdays has another daily periodic account type as a secondary parent, say baldays. All relevant information from pdays and bdays is pulled up to it. A field in that account says whether the system is balanced for that day, by having as its derived value the relevant computation from the batch hierarchy and from the posted hierarchy.

Periodic accounts are also used for a variety of reporting purposes. Many periodic reporting needs are met by periodic balances that age. However, this method only works for as many DE's as are defined in the aging sequence. If you want an indefinite number of previous periods, a periodic account is used. An example of a normal primary customer hierarchy is transaction-plan-account-logo-org, going from bottom up. However, this hierarchy does not give any totals by other useful measures. For example, it is frequently desired to group transactions across accounts, first by transaction code and type. One useful hierarchy is transaction-transaction code-transaction type-store-plan. Another one is transaction code-transaction type-logo. By making these accounts periodic, running totals of purchases can be kept by store by plan on a daily basis going back as long as required.

Virtually any arrangement of transactions for reporting purposes can be accomplished by data warehousing methods. Indeed, the information generated is fed into a warehouse and other measures, sums and selections are made. However, some of this information is used not just for analysis purposes but for operational purposes, such as reporting to a general ledger. Frequently, rules are based on the information in these summary records. Furthermore, the information is subject to revision as much as a couple of months back, by means of reversals and other such transactions. By having the base reporting hierarchies as an integral part of the transaction system, the information in them is completely in synch, to the penny. Therefore, the power of periodic accounts should be confined to fundamental operational purposes, and a copy of the data in a warehouse should be used for free-ranging analysis purposes.

F. Periodic Account Operation

A periodic account is like a perpetual account, only just for that subset of the perpetual account's transactions that cover a particular period. A periodic account can be purposely and individually created to cover a particular arbitrary period, but it is more typical for the periodic account to be "replicating." In this case, a flag says whether the account is the replicating template for the set of periodic accounts, or whether it is an account that has been replicated from the replicating template. An account can be perpetual and a replicating template at the same time. The replicating template contains the identifier of the period class to be used, e.g., monthly. The replicated account contains, in addition, the identifier of the particular period it covers, e.g. January 1999, in terms of starting and ending date/times. With this exception, a replicated account is always an exact copy of the replicating template. Each such account shares an external account number (e.g., the account number as the customer sees it), while each has its own system-wide unique internal ID. Replicating accounts are created by the system as required from the template.

When a transaction is added to an account, it is generally done by matching the account number of the transaction to the account number of the account. If there is a perpetual account, the transaction is added to it, regardless of whether it is also a generating template. Transactions are not added to generating templates that are not perpetual. If there is a generating template for the account, the system sees if there is already a replicated account for the period into which the transaction falls. If so, the system posts the transaction to it. If not, the system creates a replicated account that spans the period into which the transaction falls, and then posts the transaction. For reasonably active periodic accounts, the vast majority of the time (except for the first), the required periodic account already exists and is normally the one for the most recent period.

To create a new periodic account, the system creates the account; copies all relevant values from the previous period and/or from the template account; sets the new period start and end dates; and applies aging to the account.

Depending on the use of the account, it may be reasonable to post according to posting date, receipt date or effective date. Receipt date is the date/time on the batch in which the transaction was received, or that was stamped on the transaction when it arrived in real time. Posting date is the date/time the posting process takes place, which is not the system date but a nominal time set by the system. Effective date is carried in the transaction itself, which is typically when the transaction originally took place and may be several days in the past. The account has a DE that determines the date to use in selecting a replicated account.

A periodic account may contain both periodic and non-periodic DE's. A DE that is periodic may have the same period or a different period than the period of the account. In addition, periodic DE's may be placed into an aging chain. A daily account could have a DE that is a balance of purchases, periodic for that day. It may also have an aged daily balance of purchases (yesterday's purchases), which would have the same value as the previous account's daily balance. A daily account could also have a weekly balance of purchases. Each time a new daily account is created, the value from the previous account is copied over. The balance is always for the week up to and including that day, so that while day 3's balance starts the same as day 2's, it becomes larger with the posting of the very first transaction to day 3.

When a transaction arrives for posting to a period that is not the latest period, special handling is required. It still has to be posted to its proper period, but the changes in the period are rolled forward to later periods, particularly when aging is involved. For example, suppose there is a daily period account. Day 11 and day 12 exist, day 11 is in week 1, day 12 is in week 2, and both are in the same month. The new transaction is applied to day 11 day-to-date (dtd), day 12 dtd previous day, day 11 wtd, day 12 wtd previous, day 11 mtd, and day 12 mtd.

A periodic account may have parents, primary and secondary, just like any other account. The account parents may be perpetual or periodic. Periodic parents are created just like low-level periodic accounts, when a transaction arrives for the period in question. For example, batches are run into daily period accounts, one account for each source of batches (a batch source could be a merchant, for example). The merchant daily accounts have a perpetual account parent for the merchant and the merchant daily accounts also have an all-merchants daily account parent. An account exists for M1 D1, M1 D2, and so on, for each day. Similarly, accounts exist for M2 D1, M2 D2, etc. All the M1 Dx daily accounts share a M1 parent perpetual account, one for each merchant. All the Mx Dy accounts share a Dy parent daily account, one for each day, which holds balances for all the merchants for that day.

A new merchant has their account set up by a human or program. When the first transaction arrives for that merchant, the relevant daily account child for the merchant is created and the transaction placed in it. The child automatically has the shared daily parent. When the first transaction arrives for any merchant on a given day, in addition to creating the daily periodic account for that merchant, the daily cross-merchant account is also automatically created. The fact that merchant daily accounts have the cross-merchant daily parent is expressed in the periodic template account, which is defined as part of the account type hierarchy. In other words, creating replicated period accounts works for parents just like it does for direct transaction owning accounts, except that the initiating event is normally a balance that needs to be propagated up to the account rather than a transaction posted to it.

When parent accounts do not have the identical period of child accounts, special attention has to be paid to balance propagation to assure that the balances are correct. When sending a balance change up to parents, the effective date of the transaction that caused the change is carried along to assure that the change is only applied to balances that cover the transaction date.

G. Organization of Data Elements

Much of the functionality in posting depends on taking advantage of data elements (DE's) and groups of DE's (DEG's) that are used in multiple places. For instance, to make the presence of certain DE's required in some of the DEG's, an account has a system-supplied absolute identifier. To require an identify between DEG's, a DEG is shared between archived transactions and transactions as used in projection. There is broad freedom to define a DEG, but the system must know the purpose of that DEG. The system must know what are the balances in an account, so that it knows what to use in the projection. A purpose of some DE's must be identified to the system so that the system knows that a certain DE refers to the current account's main parent, and that another DE refers to a secondary parent.

The system enforces these requirements where they exist, and responds appropriately to the commonalties when they exist. Following is a partial listing of requirements.

| Name | Type | Meaning |
| --- | --- | --- |
| Ctxn | DEG | Core transaction DE's are defined and are part of a transaction regardless of context. E.g., effective date, type, amount. |
| Artxn | MT | Archive transaction and includes Ctxn. This permanently stores a transaction on disk and includes all external information. |
| Ahdr | DEG | Account header. The information required to make a record an account. |

One of the main elements of building a system is to select from and assemble the elements from a large set of types DE's and DEG's. The system editor helps assure that this is done correctly.

H. Event Handling and Block Codes

In Vision and in conventional systems, block codes are defined at two levels. First, a variety of codes are defined that mean something to human beings associated with overall states, of the account, for example, charged off. Then each block code is associated with a variety of low-level actions to take place should that block code be set, e.g., allow no purchases to be posted to the account. The set of possible low-level actions is typically fixed, while the grouping of low-level actions into block codes is defined in tables. In contrast, a purpose of systems according to the invention is to enable an operator to "declare" something to the system (e.g. lost card) and to have the system respond in appropriate ways, as determined by the administrators.

In the posting engine, provision is made for operators to declare that things have happened and for the system to respond appropriately in an entirely new and more generalized manner. This new ability is based on the general workflow and event tracking system of dbb which is described in related patent applications. The following description provides some main features of the new ability.

For one, an extensible, user-defined set of external events are defined. These have unique codes to identify them, multi-lingual descriptions, source code, and priorities. They are similar in principle to transactions. Different subsets of the global list of external events are defined for various members of the account hierarchy, with the permitted list being inherited down unless overridden. External events include card lost, card stolen, bankruptcy report, or any other piece of information related to the account that may arrive from any source, machine or human.

External events are received and processed from any source, including network, flat file, etc. User screens are defined to enable users to select from a list of events (some that only a CSR can declare, others that customers coming in over the Web can self-declare).

All events, whether external or internally generated, go into a master universal event tracking file. This file is indexed at least by event type, priority, account, source and date/time. It is accessible to the posting rules engine, workflow rules, and human users. Typically, events are viewed for an account in reverse chronological order, perhaps selected by priority. In addition, the most recent events above a given priority are kept in the account master and aged as new ones are added. In degenerate form, these are the equivalent of the block codes.

A newly arrived event is given both to the rules engine for the relevant account, in case there are any rules that fire based on the event, or in case the presence of the event would affect the processing of future transactions. The newly arrived event also initiates a workflow, just like a fraud alert message or other external alert. The event initiates a "case," which is then placed into the case management system and starts down a user-defined workflow. The workflow may vary according to the account family; workflow definitions are attached to accounts and passed down to children just like event declarations.

Once the event is matched to the correct workflow, it is processed just like any other case. The processing may involve any mixture of non-interactive and interactive worksteps. There may be any number of rule-controlled branches coming out from any workstep. Thus the workflow can decide whether it can handle the event without further input, or whether there should be further user interaction. All the core processing flags (e.g. authorize no purchases, do not reissue, etc.) in the account are available to the workflow for read and update. Significantly, the workflow makes its decisions including the full context of recent events; so that the system responds differently to the third report of a lost card in a month than the first report. Similarly, the system can respond differently to a bankruptcy report on a high-value customer than to a low-value one, etc.

XVII. Other Embodiments

A. Logic Modules and Balances

When transactions are posted to credit plans in VisionPlus, a logic module corresponding to the transaction is invoked. Logic modules include some tests for whether the transaction should be accepted or rejected; increments various summary counters; adds or subtracts the transaction amount to/from various balances; and performs occasional functions unique to each logic module.

For example, for membership fees, here's how balances are kept in CMS 2.5

| Membership fee balances | Plan | Account | Logo |
|---|---|---|---|
| BNP | Y | N | N |
| Current balance | Y | Y | N |
| MTD service ch | N | Y | N |
| CTD memb fees | N | Y | N |
| CTD Debits | Y | N | N |
| MTD debits | Y | N | N |
| Today debits | N | N | Y |

The following table shows the same information for Overlimit fees. Notice the differences to the previous table.

Overlimit fee balances Plan Account Logo

| Overlimit fee balances | Plan | Account | Logo |
|---|---|---|---|
| BNP | Y | N | N |
| YTD ovl fees | N | Y | N |
| Current balance | Y | Y | N |
| MTD service ch | N | Y | N |
| CTD ovl fees | N | Y | N |
| CTD misc fees | Y | N | N |
| CTD Debits | Y | N | N |
| MTD debits | Y | N | N |
| Today debits | N | N | Y |

The balances that are maintained vary depending on whether the balance is maintained at the plan, account, or logo. Some of the balances are open-ended (e.g. current balance), while others are cyclic (e.g. logo debits today). In VisionPlus, storage and computing power were conserved by maintaining only balances that were known to be required, at the cost of considerable programming effort. In the new systems according to the invention, a principle is to use storage and computing power to save programming effort. Therefore, balances that should be kept are defined in general and the system assures that they are maintained. Base balances (all maintained at the lowest—"plan"—level) include service charge BNP, CTD, MTD; service charge count; Late charge BNP, CTD; and Membership fee BNP. Derived balances (all maintained at the lowest—"plan"—level) include Current balance=service charge amt+; and Debits (CTD, MTD)=service charge (CTD, MTD)+.

All of this kind of information is maintained as discussed above with reference to balances.

B. Field Security—ARFS

This transaction enables per-user and per-ORG field access control for certain of the fields in account base segment, customer name and address, and account embossing records. Its function is performed and generalized by dbb security, as enhanced by the requirements in this document.

C. Processing Control Table—ARMF

A purpose of this table is to provide a level of indirection between the accounts in a LOGO and selected records from each of the following tables: account control, service charge/fee, insurance, and interest. The indirection is no longer required because accounts can now be recursive, and the information in these four tables associated with an account at any level. Another purpose served by this transaction is to enable transitions from one table to another to take place at a specified point in the future. This function is performed by the generic starting/ending effective date feature of dbb messages.

D. Logo Record—ARML

A payment arrives for an account. The account may have multiple credit plans. Each plan has a balance that is comprised of 11 components (interest, service charge, late fees, etc.). Which component of which plan is the order of payment? If there is an under payment, this determines what does not get paid. If there is an overpayment, what principal balances are paid down? These parameters enable considerable control over these questions.

Figure 5:
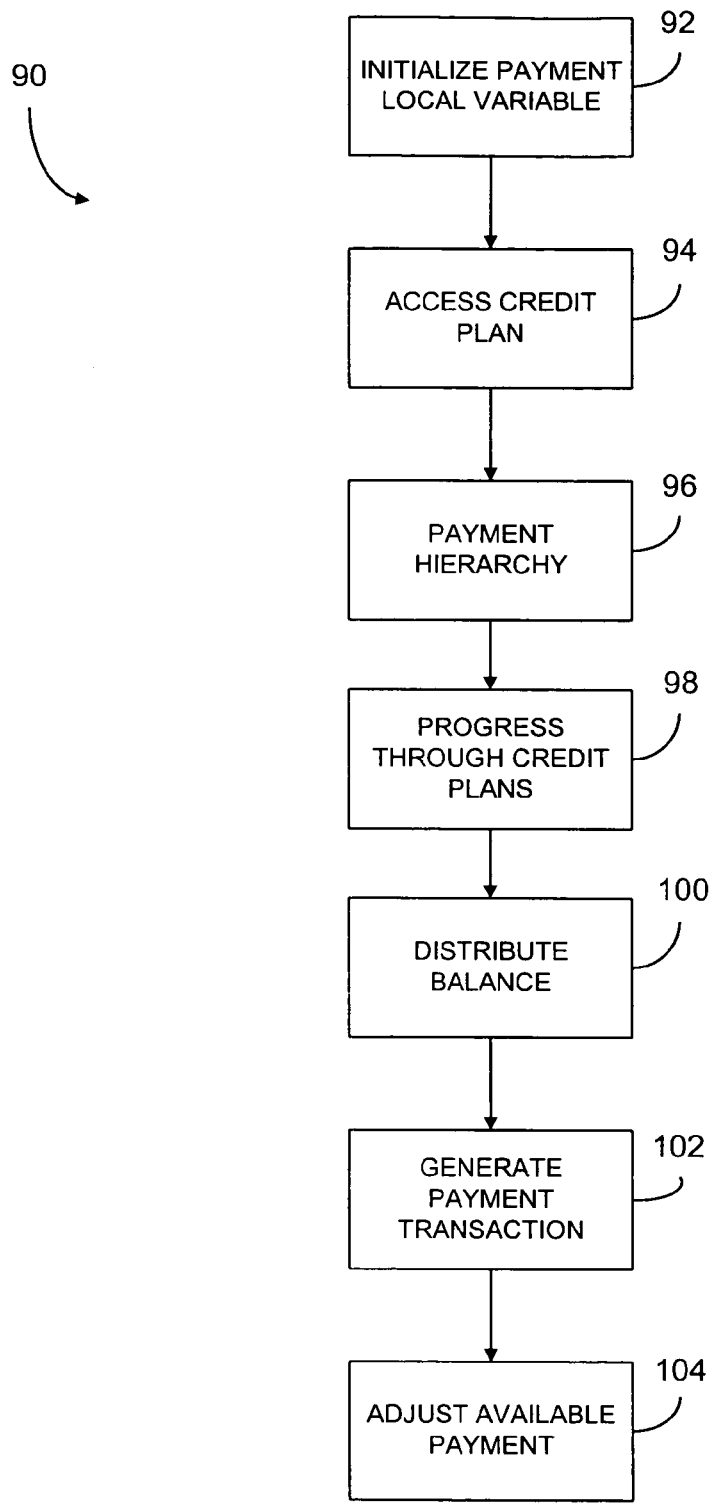
FIG. 5 is a method of processing a received payment according to a preferred embodiment of the invention.

The operation controlled by these parameters has the result of generating one or more derived payment transactions in the credit plan accounts. The rule that implements this functionality may have similar control parameters to the one in Vision, but it may be simpler just to hard-code the payment application method in the rule itself, since there are likely to be a small number of payment application methods and they are likely to change very infrequently. A method 90 for executing the rules will now be described with reference to FIG. 5. The method 90 begins at 92 with initializing a local variable containing the payment amount that has not yet been distributed. Next, at 94, the system calls the select lines function to get access to the credit plan information. The function sorts the plan information in plan priority order. Depending on parameters, the system at 96 sets an outer loop to perform the following many times. This loop goes through the payment hierarchy, if the option is to apply payments to a BNP component across all plans. This loop is not required if payments are applied to all balances within one plan before going on to the next plan. At 98, the system, using the cursor functions, loops through all the credit plans, from first to last (this will be priority order). At 100, the balance to distribute against is selected. If multiple components are applied to, this may be an inner loop. Then, at 102, the system generates a derived payment transaction against the credit plan. The amount is the lesser of the amount available for distribution and the amount of the balance. A derived transaction is generated for each balance type; the transaction type indicates the type of balance being paid. At 104, the systems adjusts the variable containing the payment available for distribution. If it is zero, processing breaks out of the loops and ends. Otherwise, processing proceeds to take the next loop.

One option is to apply payment to principle in a pro-rata fashion across all plans, regardless of plan priority, after all BNP components have been paid. This can be implemented in the rule by testing if the condition applies; then summing all principle across all the plans (using the cursor to get to the various plans). Then using the sum and the amount available to calculate the pro-rata amount, processing proceeds to loop through the plans again applying it.

There are special cases of payment processing that could be accommodated by rule changes within this general framework. One example is when the payment is made by automatic debit against a checking account. In this case, the rule described above is adequate. Another example is when the payment is by a paper check that has to be processed in the usual way and the funds do not clear for some number of days, in which case the check might bounce. There is a desire to prevent someone from taking advantage of the increased available (but fictitious) credit after the check has been deposited, and before it has actually cleared. The effective date of the check could be set later to give it time to clear, although regulations may require that no interest be charged upon receipt of the check. This is an interesting example, but it is also an example of the general problem of handling novel conditions and combinations of functionality.

A solution to this particular requirement is to process the payment in the normal way, but to defer altering the available credit (open-to-buy) for some fixed number of days or until a particular event (check cleared, funds available) is posted. If the payment does bounce, it is handled similarly to the "reversal of payment" discussion.

A mechanism for implementing this is the "defer until" function that can be called from any rule. This enables any sequence of steps in a rule to have their execution deferred until some condition (a conditional expression and/or the passage of time) has been met. In this case, the updating of the available credit is deferred until the designated number of business days has passed, or until some other condition takes place. Then the available credit balance is updated exactly as it normally would be, only later than the effective date of the payment transaction. Any expression or operation can be deferred in this way.

E. Reversal of Payment

Figure 6:
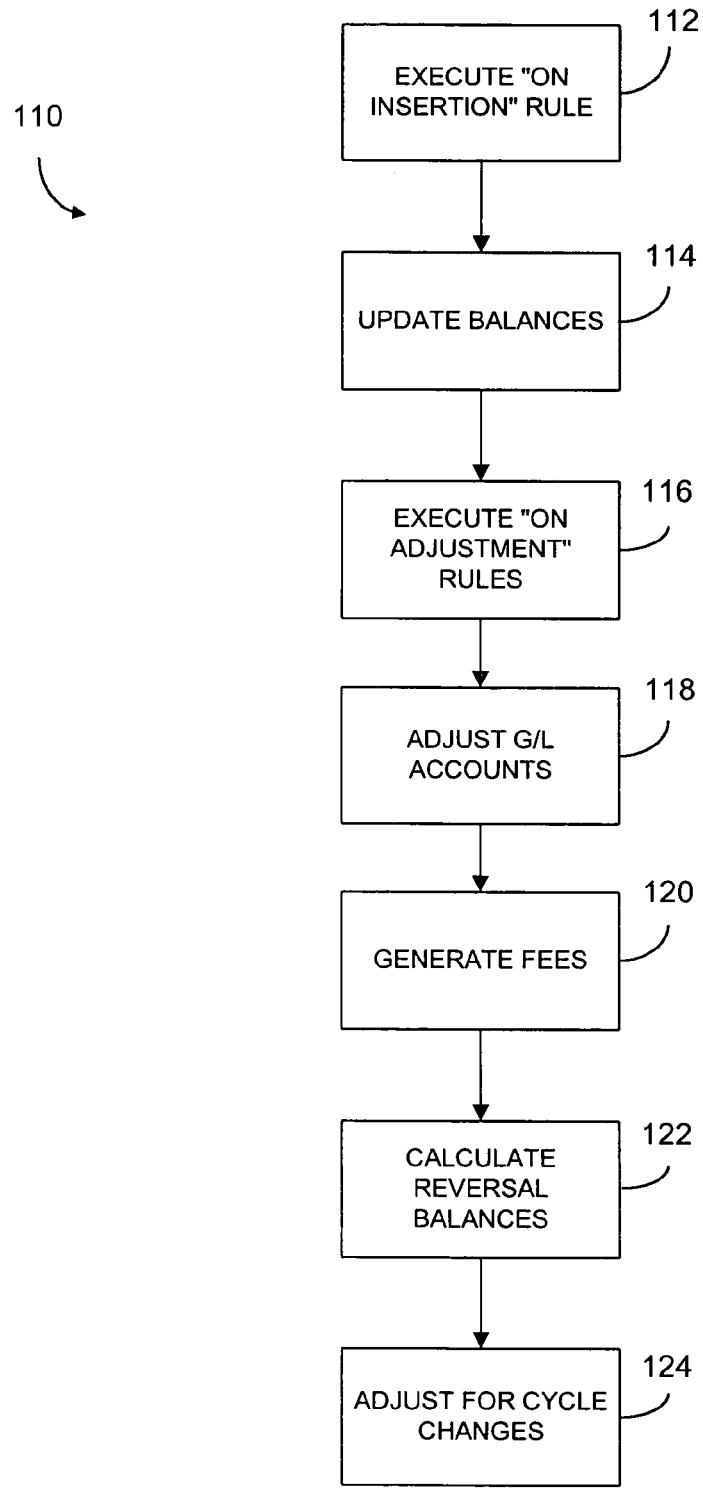
FIG. 6 is an example of a method for reversing a payment.

An example of a method 110 of reversing a payment will now be described with reference to FIG. 6. When a payment reversal arrives, an "on insertion" rule fires at 112 when the reversal is first inserted into the projection. The rule first determines that the transaction is going to the proper account. Then it goes into processing based on the type of transaction. Because the transaction is a reversal, the rule finds the payment being reversed using the "find transaction" function. The "update transaction" function then joins the two transactions in the reversal, and marks the original transaction as reversed. It also finds all transaction generated from the original (this data has been stored with the original when the generation was done), and marks them for deletion. If any of them are in other accounts, those accounts must also be re-projected. This is the end of this rule During projection, the payment in the main account has already been marked as reversed. Therefore, no rules are fired for it. It is as though the payment had not arrived. Similarly, the generated payment transactions are marked for deletion; no rules are fired for them, and it is as though they never existed. All the other transactions are processed by rules in the normal way and balances are updated at 114 as usual, coming to new answers than before.

During projection, whenever a transaction is encountered (other than a newly inserted one) that is different in the new projection than in the original projection (i.e., before the new transactions were inserted), any relevant "on adjustment" rules are invoked at 116. These apply to the reversed payment (it changed from being "posted" to "reversed") and any transactions generated from the payment, distributing parts of the payment to various plans (they changed from "posted" to "deleted").

If the payments have been copied to G/L accounts, they now must be adjusted at 118. A variation on the rule that copies payments to G/L accounts is invoked by the "on adjustment" event, and sends adjusting transactions to the appropriate G/L accounts.

Any fee to be charged for the reversed payment (e.g. insufficient funds fee) is generated at 120 by a rule attached to the payment reversal transaction.

Any balances that changed as a result of the reversal are calculated at 122 during the normal course of projection, including changes to parent balances and all balance components. Similarly, all the interest calculations yield new results, because the balances on which they are based have now changed.

If the payment took place before a cycle and the reversal after, the amount of interest charged on the statement (if any) may have changed. The interest is represented as a generated transaction. Due to the payment, it may be that no interest has been charged but now is, or it may be that interest had been charged but now it is a different amount. In either case, an "on adjustment" rule is invoked at 124 for the new or altered interest transaction. This generates an interest adjustment transaction for the amount of the difference between the interest now due and the amount previously due, if any. Internally, the original interest transaction and the adjustment are linked, so that future projections do not continually attempt to generate the adjustment. If the payment was to a parent and the account has multiple credit plans, this adjustment process takes place in each of the plans.

F. Organization Record—ARMO

Most statements are generated with the "demand" option set, which means they are generated on the same day the cycle ends. With the "call cycle" option, the statements are actually generated on some day later than the end of the cycle. A purpose of this is to give slow-arriving transactions time to arrive and to be processed. This can be accomplished by "freezing" the account and warehousing all transactions dated after the end of the cycle that arrive between the cycle end and statement generation, while still processing transactions dated before the cycle end. Everything is calculated as though the statement really were generated on the cycle date.

With the invention, cycling, statement calculation, and statement generation are completely separate operations. A rule can easily be written to invoke statement generation at any time, which does not have to be the end of the period for which the statement is generated. All the transactions are in the projection, and the balances are calculated for the cycle date. If transactions arrive after the cycle but are dated before, they are inserted in the projection at the right place; re-projection causes all the proper balances to be calculated and transactions to be generated.

G. Frequent Shopper Program—ARMV

This transaction provides the control table for frequent shopper programs. It controls the conditions under which points are granted and removed, and the method of calculating the points. Most of the fields are devoted to lists of items to be applied against transactions, which either includes or excludes the transaction from generating points. The types of items include merchant category code in transaction, merchant org, store number, SKU, department of purchase, buyer's state of residence, buyer's card's logo, and credit plan to which purchase is applied.

Each of these items are retained, but represented as a compound LUT in standard format. In CMS, subsets of the capabilities of the compound LUT are made available for the various item types. For example, only individual checks are permitted against stores, not ranges. New lists of things can be added to check the transaction against and new parameters can be added to feed into new expression rules.

The points to be granted are controlled by a percentage or amount or by transaction tiers, according to a parameter. This can be handled by a more complex combined rule or by a couple of simpler rules, either of which would be activated for an account. Transaction tiers are expressed using a tiered LUT. The minimum amount of a transaction on which points can be granted is a parameter in the rule that calculates the points. The points granted are interesting in that they are assigned by transaction code, for up to 10 transaction codes. This can be accomplished with an array of rules and the rule to use is selected based on the transaction code. Extra points are granted to transactions by a separate set of rules. The tests are organized differently. In addition, there are beginning/ending effective dates for the extra points. Therefore, additional points is preferably made a separate rule. Similarly, first usage points could be handled as a separate rule, or as an extra parameter to the general points awarding rule. A balance is maintained with the account, saying whether the first-use points had already been awarded.

H. Rate Index Table—ARRM and ARHM

A basic function of these panels is retained with the invention, since they store index rates (like prime) on which interest rates are based. The rate table is mapped as two tables. The first table is a standard LUT (lookup table) of index values and language codes with multi-lingual descriptions. A purpose of this table is to define the indices but it does not contain values. The second table is a temporal table of index values and contains the following columns:

| key | arbitrary unique key for this row |
|---|---|
| index | rate index from LUT |
| Status | Status of this entry; unverified or verified |
| start | starting effectiveness date for this rate |
| end | ending effectiveness date for this rate |
| Next | key of next sequential rate (if helpful) |
| Rate | rate for this index in effect during the time period |

As usual, a little LUT would be established for the status field.

In CMS, ARRM is used to enter rates and ARHM (usually with different security) is used to verify rates. After a rate has been verified, CMS batch makes the status of the rate current on the day it becomes effective. This last status is not required.

One panel is created to edit index values and one set of user permissions is established to enable creating and editing table values. The status for any such table is always set to entered; the user is not able to create or update the status field. A second set of user permissions can update the status field and users with these permissions perform the verification function.

To verify all unverified records, the operator enters the panel and performs QBE to find all records whose status is unverified. The operator takes the resulting set and steps through them, verifying and/or fixing the rates, and changing the status to verified as appropriate.

I. Service Charge/Fee Table—ARVM

This transaction turns into a collection of rule templates and rules, one for each service charge to determine whether and when it should be assessed and a second for each service charge to actually calculate the amount of the charge and generate it. Today, the charge parameters are related to the accounts in a logo via the processing control table (PCT); with the invention the PCT is preferably no longer used. Instead, the rules associated with each charge that can be applied to an account are associated with that account or one of its ancestors (via inheritance). If the charge can never be applied, there is no need to attach the rule to the account. Attaching the rule says that the charge could be applied; the rule provides the mechanism for actually applying the charge and calculating the amount of the charge.

The parameters that control assessing and measuring the various fees have a great deal of overlap, which are accounted for in the rules using inheritance.

The parameters used in several of the fees include the minimum fee that can be assessed (Minfee), the maximum fee that can be assessed (Maxfee), the maximum fees that can be assessed in a single calendar year (Max ytd), the percent of the balance that is charged; the balance used varies among the fees (Percent), the amount to charge (Fee), and whether to charge (1) the fee alone; (2) the percentage alone; (3) the sum; (4) greater of; or (5) lesser of the fee and the percentage (Action). Note that these parameters all concern how much to charge. Other parameters here, in the LOGO record, or hard-coded logic control the decision to charge the fee.

These parameters are put into a template service charge/fee rule, along with the corresponding rule expression. This looks something like this:

| Scytd | service charge assessed year to date |
|---|---|
| Sc | proposed service charge |
| Base | the amount (balance) on which the service charge is based |
| Service charge rule expression | if (scytd + min > maxytd) exit( );<br>switch action {<br>case 1: sc = fee;<br>case 2: sc = percent * base;<br>case 3: sc = fee + percent * base;<br>case 4: sc = max(fee, percent * base);<br>case 5: sc = min(fee, percent*base); }<br>sc = max(min(sc, maxfee), minfee);<br>gentxn(today, tid=6c, se); |

The rule is essentially a miniature program block, the result of which may be calling a function that generates a transaction for the current account. Having a rule available in this format enables one to discover and perhaps change many behaviors. For instance, if the service charges year to date are $95.25, the maximum year to date charges are $100 and the minimum service charge is $5, that last $4.75 will never be billed due to the first line of the rule. The way the rule is written, the next to last line states that if the amount of the fee calculated is $1.75 and the minimum fee is $2, $2 will be charged. Another reasonable interpretation of "minimum fee" is that, if the fee as calculated falls below the minimum, no fee is charged.

The general service charges (ARVM) are service charges that are assessed based on the occurrence of other transaction codes. With rules, there is no limit to the number of such charges that could be made.

In addition, today, the method of calculating the fee is very simple. The parameters include a transaction code for which a service fee is to be charged (TC), a method code for dollars or amount (Method), the dollars or percentage to be charged (Rate1), the number of transactions in a cycle that can be charged at Rate1 (Limit), the dollars or percentage for all other transactions in the cycle (Rate2), the minimum fee that can be assessed (Minfee); and the maximum fee that can be assessed (Maxfee).

To make this simple for users, instead of having a unique parameter table, a generic one is inherited. This means that, instead of method and rate, there are fields for fee and amount. A parameter like action is then included, which provides various options for combining the percentage and the fixed amount.

One way of thinking about the rules-based method of charging fees is it makes all fees resemble transaction code service charge, in that the basis of the service charge is entered into a screen. One difference is that the ARVM service charges are very simple, just based on the occurrence of a transaction, not something more complicated like late fee. Another similarity is that, with the rules method, the preferred method is to make one rule to declare that a fee should be charged by generating a transaction and another to actually charge it. Of course, the second rule could decide not to charge the fee after all based on the execution of its rule.

J. Zip, State, and Area Code—ARZM and ARUM

These transactions enable entry and update of tables that validate state against zip code (ARZM) and state against area code (ARUM). The tables are then used to validate entry of customer account information. With the invention, the flexibility of dbb is used to define the tables and screens to handle international requirements. Instead of being used just for validation, the data is used to present choices to users, in the form of combo boxes. Finally, instead of using rough-grained data like this, which is entered by the user organization, the system relies upon complete data files provided by postal services that map each zip code to city and state. For example, the user is able to enter zip code first, and the system fills in the city and state, and in most cases, the area code.

XVIII. Performance

A description will now be given of an exemplary performance capability of the systems. With one million accounts and with the ability to handle one transaction per account per day, the worst case number of transactions would be 100,000 transactions per hour. Using a value of 4,000 seconds per hour in order to arrive at a whole number quotient, the load would be 25 transactions per second. If only one transaction is posted per processor per second and at four processors per machine, six machines would be needed. If there were 5 DBMS transactions per financial transaction, there would be a 125 TPS DBMS requirement. If each account needed 10 KB of storage, the total storage requirement would be 10 GB. If an additional 1 KB of total storage was required per transaction, then the total storage requirement would be 1 GB/day for the transactions. In reality, the system can get more than one transaction posted per processor and the continuous load posited is both very high and unlikely to be continuous. The systems of the invention are therefore designed to work well with sharp spikes in load, and to "catch up" with the lower priority updating tasks in the load valleys.

Scaling can be demonstrated with multiple posting machines with a separate DBMS server. The basis posting application starts with a loading of single-message authorization requests with the response to the request given in real time. If the request is granted, posting proceeds at a lower priority. Many accounts are used, say 100,000, and each account has children for authorizations and monetary. Several corporate hierarchies are used, from 2 to 7 levels deep, and several more levels above the corporation for the financial institution. These hierarchies are cached.

One result of such an implementation is that posting can be shown to run on a single machine, and just as effectively on a large cluster of machines. Also, posting distributes the load, and uses the power of the available machines. The system also responds gracefully to demand spikes, continuing to respond quickly to real-time requests, while deferring but processing even more efficiently lower priority tasks. The invention is highly scaleable; machines can be added or dropped while the system is running; added machines are utilized, and dropped machines cause no trouble. The invention is also fault tolerant; machines can die unexpectedly and abruptly but the system responds just as though the machine had been purposely dropped, and no work is lost. The normal configuration of machines should be more than sufficient to handle a normal load and the system should respond gracefully when it is overloaded for a period of time.

As an example of a desired testing procedure, a controlled load is placed on a group of machines. The machine that is the source of the load displays what it is doing and at the end, such as a minute, reports are run graphically showing the results. The transactions to be posted are ready for use, e.g. read from a file. A simple dashboard allows for control of the load, e.g. 5 TPS for 3 seconds, then 30 TPS for 1 second, then 5 TPS for 9 seconds, etc. The system preferably is run over the Web and in multiple languages, such as using a dbb RSM.

To simulate a continuous load of 5 TPS, the system is configured for at least 50% more, may be double. A load of 5 TPS is placed on a 10 TPS configuration and the throughput and response are graphed time over time, which shows 5 TPS throughput and sub-second response time. The longest time to complete posting and hierarchy updating is also graphed, which is under 2 seconds. A big load spike is then created, such as 20 transactions in a single second with the load returning back to 5 TPS. The graph continues to show sub-second response time, the throughput will leap up to about 10 TPS and stay there for a few seconds, and then tail back down to 5 TPS. The longest complete update wait extends to 4–6 seconds, and then goes back to normal.

A series of big spikes, including one which sustains 20 TPS for 5 seconds, is then created. The response time stays sub-second, throughput stays pegged around 10 TPS for an extended period, and the longest complete wait is a little longer than the length of time the throughput is pegged at capacity, approximately one minute. The longest complete wait, however, will rapidly shrink back to normal.

Next, one or two machines are added while a test is being run. Even though the machines are added during run-time, the basic behavior of the system remains as described above.

After a delay after the new machines are added, the total throughput goes up linearly, and the longest wait gets shorter.

As another variation, some of the machines are single processors and some are multiple processors. The results of this testing graphically show that the total work is roughly proportional to the capacity of the machine, with bigger machines getting more work done. Thus, even with at least one machine being a cheap single-processor machine that still has lots of memory, that processor can also be a part of a posting configuration, to great cost advantage.

Under administrative control and while a test is in progress, a machine is taken out of the system. With the machine being taken out, the behavior of the system goes back to what it was before. Finally, as the climax of the testing: any or all of the above tests are re-run and a machine is killed during the process. The machine is preferably killed by violently, such as by pulling the plug or disconnecting it from the LAN. If 5 machines are used and when one dies, the throughput almost immediately drops to 8 TPS and the response time lengthens to a couple of seconds for a couple of seconds. Then, everything is as before, except with 8 instead of 10, and the times that get longer will get even longer. Despite the abrupt removal of machines, nothing is dropped and the totals display show that all the transactions that were submitted to the system were in fact processed and are in the top hierarchy totals.

The testing can also show how with one parameter setting, the throughput improves, the ability to access upper members of the account hierarchy and the backlog from peaks is cleared more quickly, at the cost of somewhat more delayed and infrequent updating of the upper members of the hierarchy. Similarly, with another parameter setting, the relationship can be reversed. This is a key feature that enables continued rapid response and excellent throughput under overload conditions, while actually increasing the total throughput under those circumstances. The invention achieves super-linear scaling. Normally, merely linear scaling is a goal that can never be achieved and gets farther away the more you add machines or increase the load.

XIX. CONCLUSION

Conventional posting programs follow the same basic pattern. The posting program is run exactly once a day and all the transactions that have arrived since the previous run of the program are sorted into account number order. Next, a sequential sweep is performed by sorting all the account master records into account number order, if they are not already, and in the main loop reading, processing, and updating the account master records in order. For each account master, the relevant control records are read if they are not already in memory and then each transaction on the account is read and processed. For example, if the transaction is a payment, relevant counters and balances are updated. After processing, transactions are archived. If relevant, transactions such as interest and fees are generated, applied to the account, and archived. Actions based on the passage of time are executed. For example, accrued interest is calculated and applied. If the account cycles, statement information is calculated and generated. A wide variety of operational reports are generated during the sequential sweep.

The invention provides a number of advantages over this conventional approach to posting. For instance, whereas conventional posting is run exactly once a day, the invention can be executed whenever a transaction arrives or an anticipated date arrives. Conventional posting processes all transactions on all accounts while the invention can process a single transaction and its account. Further, the invention need not run in batch mode, typically at night, but instead runs in real-time as transactions arrive. With batch processing, the financial status of entities is calculated once a day whereas with the invention balances are updated continuously, as transactions that affect them are processed. The invention provides improved efficiency since rather than reading and updating every account every day, as is typical with conventional processing, the invention reads and updates accounts only when there is activity on the account. The conventional posting brings each account current as of today whereas the invention calculates the past and projects the future state of the account, and the next date at which action should take place. Conventional posting processes only newly arrived transactions whereas the invention reads in recent past transactions and uses them to simplify account calculation. The inactive account concept is important for efficiency with conventional posting but is not treated specially and does not impact efficiency with the invention. Moreover, hierarchy is built into the code for conventional posting but, in contrast with the invention, is user configurable, including multiple hierarchy to any depth. System operations for conventional posting are determined by control parameters and code and important modifications require source code changes. On the other hand, with the invention, system operations are controlled by rules and their parameters and most modifications can be accomplished without access to source code.

The traditional algorithm involves a tremendous amount of I/O, only some of which is proportional to the number of transactions processed. A purchase transaction is received and placed in a file for processing. The file is sorted. All the account masters are read and re-written every day, whether or not they have activity. In contrast, the invention accommodates the modern on-line, real-time world. In this world, most purchase activity is authorized and cleared in a single real-time transaction. When the transaction arrives for authorization, the account master is read and updated for that purpose. When a positive response is given to the authorization, the purchase transaction is immediately posted; all the data required for this purpose is already in memory.

Posting is a time-consuming process and, in some circumstances, it should not slow down truly real-time operations, such as authorizations and customer service. In this case, the account master is updated to reflect the authorization and the posting process takes place in the background, at a lower priority than the more time-sensitive tasks. In a worst-case scenario, there may be a queue of hundreds of transactions being processed relatively slowly due to scarce machine resources. However, in a properly configured system, such a back-up passes quickly, and the net result is that the queued transactions is still posted within minutes of arrival. This amounts to a very efficient use of machine resources; posting takes place continuously, all day long, using resources only when the system would otherwise have been idle. And even when there is a queue of transactions awaiting posting, the I/O required to fetch the account master is still likely to be served out of memory cache, and thus not increase the total amount of physical I/O.

The preferred system performs real-time requests in real time. An example of a real-time request is a customer swiping his card at a merchant or asking for account information via his browser. The actual posting of the resulting transaction to the account is done right after, at a lower priority, and updating the hierarchy with the results is done right after that, at a yet lower priority. By assigning priorities, all the updating can be performed right away if the machines have a moderate load of real-time requests to process. If the machines are burdened with requests, the updating is done as soon as things slow down, in priority order.

In a batch system, the balances are always known by the next day. With the invention, the balances are at least known by the next day. When run on a properly configured system, such as one large enough to get a day's worth of work done in a day, the system would never be worse than the traditional batch system. In fact, under normal circumstances, the posting and the updating of the balances will occur within seconds of the transaction's arrival, which is quite a bit better than 24 hours.

The preferred method of real-time posting is also quite a bit more efficient than the normal batch system, which does not do posting during the day. During the day, the system according to the invention is naturally configured to handle peak on-line loads, with the result that there is frequently excess capacity. The system uses that excess capacity to post the work that has arrived, but will delegate posting to second place to the needs of real, interactive users.

The systems according to the invention can run on clusters of inexpensive, commodity processors, which have much lower cost per unit of computing power than the mainframes used by traditional posting machines. With the invention, the system can be configured so that it is very rare that the posting and balancing fall much behind the interactive transactions, and still be much less expensive than the behemoths traditional systems that run batch jobs. Even with inexpensive and limited configurations which are so overloaded that most of the posting work ends up getting deferred to the evening hours, the invention is still completely automatic and is no worse than today's systems with their rigid batch windows, and is dramatically less expensive.

The systems according to the invention are also highly fault tolerant. Part of the real-time job includes recording the transaction that needs to be posted to the DBMS. If the system crashes, the data is still in the DBMS, and the first available machine processes the transaction to completion. Similarly, after posting, the relevant hierarchy updates are recorded in the DBMS, and processed later. The capabilities of the DBMS are used to assure that, while work may be deferred, nothing is left undone, even in the worst cases of a crash.

The invention need not be run on run expensive machines, such as Tandem or Stratus machines, to achieve fault tolerance. The ability to run fault tolerance is not dictated by the machine but rather can be accomplished by executing methods of the invention on loosely coupled clusters. Systems according to the invention can run posting in real time, have as much throughput as needed just by adding machines, have a multi-lingual, multi-currency, Web interface, have extremely application flexibility, and have automatic fault recovery using PC-class machines.

The forgoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

I claim:

1. A computer-implemented method performed for a financial institution having system resources for posting transactions to accounts, comprising:
    a) receiving at a computerized system transactions related to a plurality of accounts;
    b) in response to receiving the transactions, the computerized system:
        b1) assigning a lower priority to any of the received transactions that are ready for posting relative to any of the received transactions that are of a second type of transactions;
        b2) processing, with the system resources, the second type of transactions into transactions that are ready for posting at a higher priority than the ready-for-posting transactions; and
        b3) posting the ready-for-posting transactions, including the second type of transactions that are processed into ready-for-posting messages, in real time to the accounts when the system resources are available;
    c) wherein the posting step is interspersable with the processing of the second type of transactions; and
    d) wherein the postings of the ready-for-posting transaction comprises:
        d1) at a first instance, identifying any of the ready-for-posting transactions that are related to a first one of the accounts and have an effective transaction date within a predetermined first time period;
        d2) first calculating a first new balance for the first account based on the ready-for-posting transactions identified at the first instance;
        d3) at a second instance subsequent to the first instance, identifying a first new one of the ready-for-posting transactions that is related to the first account and also has an effecting transaction date within the predetermined first time period;
        d4) second calculating a second new balance for the first account by re-calculating the first new balance with the first new ready-for-posting message included in the re-calculating; and
        d5) generating an automatic adjustment, based on the effective transaction date of the first new ready-for-posting message relative to the effective transaction dates of the ready-for-posting transactions identified at the first instance, when there is a difference between the first and second calculating;
        d6) first updating the first account based on the first calculating the second calculating, and the automatic adjustment by updating a plurality of existing balances associated with the first account by at least:
            d61) updating a first one of the existing balances based on the first calculating, the second calculating, and the automatic adjustment; and
            d62) updating a second one of the existing balances based on a contribution of the updated first balance; and
            d63) updating a third one of the existing balances based on a contribution of the updated second existing balance and
        d7) scheduling a next action on the first account by:
            d71) performing in real time the next action on the first account upon identifying a second new ready-for-posting transaction that is related to the first account, wherein the second new ready-for-posting transaction is identified prior to an expiration of a predetermined second time period subsequent to the first updating; and d72) performing in real time the next action on the first account upon the expiration of the predetermined second time period subsequent to the first updating, wherein the expiration is reached prior to the second new ready-for-posting transaction being identified;

d8) repeating the scheduling the next updating of the first account for updates of the first account subsequent to the second updating.

2. The computer-implemented method as set forth in claim 1, wherein the second type of transactions comprise an authorization request.

3. The computer-implemented method as set forth in claim 1, wherein the ready-for-posting transactions are approved charges to the accounts.

4. The computer-implemented method as set forth in claim 1, wherein the accounts comprise credit accounts.

5. The computer-implemented method as set forth in claim 1, wherein the receiving of the transactions at the computerized system comprises receiving the transactions at a plurality of times throughout a day.

6. The computer-implemented method as set forth in claim 1, wherein the receiving of the transactions at the computerized system comprises receiving a group of the transactions at one time.

7. The computer-implemented method as set forth in claim 1, wherein the automatic adjustment comprises a calculated interest for the first account.

8. The computer-implemented method as set forth in claim 1, wherein the automatic adjustment comprises a calculated fee for the first account.

9. The computer-implemented method as set forth in claim 1, wherein the receiving at the computerized system comprises receiving at the computerize system of the financial institution.

10. The computer-implemented method as set forth in claim 1, wherein the receiving at the computerized system comprises receiving at the computerized system the transactions on behalf of the financial institution.

11. The computer-implemented method of claim 1, wherein the generating an automatic adjustment comprises: issuing a fee or a credit as a third new ready-for-posting transaction to cover the difference.

12. The computer-implemented method of claim 1, wherein the next action is a statement generation.

13. The computer-implemented method of claim 1, wherein the next action is a letter generation.

14. The computer-implemented method of claim 1, wherein
the plurality of accounts comprises a group account and one or more detail accounts belonging to the group account, the first account is one or the detail accounts belonging to the group account; and
the posting of the ready-for-posting transactions further comprises propagating the first updating of the first account to the group account to also update the group account.

15. The computer-implemented method of claim 1, wherein the one first is a periodic account associated with a time period, and wherein the predetermined first time period is within the time period associated with the periodic account.

16. The computer-implemented method of claim 1, wherein one of the plurality of the accounts is a first periodic account associated with a first time period, and some other ones of the plurality of the accounts are created periodic accounts that are of the same type as the first periodic account but with time periods different from each other and the first time period.

17. A computer-implemented method performed for a financial institution having system resources for posting transactions to accounts, comprising:
a) receiving at a computerized system transactions related to a plurality of accounts;
b) in response to receiving the transactions, the computerized system:
b1) assigning a lower priority to any of the received transactions that are ready for posting relative to any of the received transactions that are of a second type of transactions;
b2) processing, with the system resources, the second type of transactions into transactions that are ready for posting at a higher priority than the ready-for-posting transactions; and
b3) posting the ready-for-posting transactions, including the second type of transactions that are processed into ready-for-posting messages, in real time to the accounts when the system resources are available;
c) wherein the posting step is interspersable with the processing of the second type of transactions; and
d) wherein the posting of the ready-for-posting transactions comprises:
d1) at a first instance, identifying any of the ready-for-posting transactions that are related to a first one of the accounts and have an effective transaction date within a predetermined first time period;
d2) first calculating a first new balance for the first account based on the ready-for-posting transactions identified at the first instance;
d3) at a second instance subsequent to the first instance, identifying a first new one of the ready-for-posting transactions that is related to the first account and also has an effective transaction date within the predetermined first time period;
d4) second calculating a second new balance for the first account by re-calculating the first new balance with the first new ready-for-posting message included in the re-calculating; and
d5) generating an automatic adjustment, based on the effective transaction date of the first new ready-for-posting message relative to the effective transaction dates of the ready-for-posting transactions identified at the first instance, when there is a difference between the first and second calculating;
d6) first updating the first account based on the first calculating, the second calculating and the automatic adjustment by setting up a data structure for an aging chain of balances for a plurality of existing balances associated with the first account for the computerized system to perform balance aging on the plurality of existing balances by at least:
d61) receiving a request to update a first one of the existing balances in the data structure;
d62) moving a first existing value representing the first one of the existing balances to a second one of the existing balances in response to the update request; and
d63) replacing the first existing value in the first existing balance with a value based on the first calculating, the second calculating, and the automatic adjustment in response to the update request; and d7) scheduling a next action on the first account by:
- d71) performing in real time the next action on the first account upon identifying a second new ready-for-posting transaction that is related to the first account, wherein the second new ready-for-posting transaction is identified prior to an expiration of a predetermined second time period subsequent to the first updating; and
- d72) performing in real time the next action on the first account upon the expiration of the predetermined second time period subsequent to the first updating, wherein the expiration is reached prior to the second new-ready-for-posting transaction being identified;

d8) repeating the scheduling the next updating of the first account for updates of the first account subsequent to the second updating.

18. The computer-implemented method of claim 17, wherein the balancing aging on the plurality of existing balances associated with the first account further includes:
moving a second existing value representing the second existing balance to a third one of the existing balances prior to the moving of the first existing value from the first existing balance to the second existing balance.

* * * * *